United States Patent
Jalal et al.

(10) Patent No.: US 10,910,634 B2
(45) Date of Patent: Feb. 2, 2021

(54) ELECTROACTIVE IONIC LIQUIDS AND SURFACE-MODIFIED SUBSTRATES CONTAINING THEM

(71) Applicants: Centre National de la Recherche Scientifique (CNRS), Paris (FR); Universite Paris Diderot Paris 7, Paris (FR)

(72) Inventors: Ghilane Jalal, Juvisy sur Orge (FR); Gaëlle Trippe Allard, Palaiseau (FR); Van Bui Thi Tuyet, Ivry sur Seine (FR); Hyacinthe Randriamahazaka, Courdimanche (FR); Thuan Nguyen Pham Truong, Ivry sur Seine (FR)

(*) Notice: Subject to any disclaimer, the term of this patent is extended or adjusted under 35 U.S.C. 154(b) by 87 days.

(21) Appl. No.: 16/099,068

(22) PCT Filed: May 5, 2017

(86) PCT No.: PCT/EP2017/060829
§ 371 (c)(1),
(2) Date: Nov. 5, 2018

(87) PCT Pub. No.: WO2017/191317
PCT Pub. Date: Nov. 9, 2017

(65) Prior Publication Data
US 2019/0173078 A1    Jun. 6, 2019

(30) Foreign Application Priority Data
May 6, 2016   (WO) .................. PCT/IB2016/000750

(51) Int. Cl.
*H01M 4/137*    (2010.01)
*H01G 11/48*    (2013.01)
(Continued)

(52) U.S. Cl.
CPC ............. *H01M 4/137* (2013.01); *C08L 85/00* (2013.01); *H01B 1/122* (2013.01); *H01G 11/48* (2013.01);
(Continued)

(58) Field of Classification Search
CPC ...... H01M 4/137; H01M 4/60; H01M 4/1399; H01M 4/608; H01B 1/122; C08L 85/00;
(Continued)

(56) References Cited

U.S. PATENT DOCUMENTS

| 2002/0009635 A1* | 1/2002 | Michot ................. C07C 317/12 429/188 |
| 2004/0021928 A1* | 2/2004 | Warner ................. C07C 311/48 359/265 |

FOREIGN PATENT DOCUMENTS

CN           101698660 A       4/2010

OTHER PUBLICATIONS

Bard, et al., "Electrochemical Methods: Fundamentals and Applications", Wiley, 1980, p. 522.
(Continued)

*Primary Examiner* — Gary D Harris
(74) *Attorney, Agent, or Firm* — Lerner, David, Littenberg, Krumholz & Mentlik, LLP

(57) ABSTRACT

The present invention relates an electro-active polymeric ionic liquid including imidazolium-based molecules, said imidazolium-based molecule comprising each at least: —one imidazolium moiety associated with a negatively-charged counter-ion, and —one reducible group selected from: Formula (IV), —an anthraquinone derivative of formula (IV): with $R_1$ representing a hydrogen atom or a $C_1$-$C_6$-alkyl group, —a viologen group, and —a metallocene reducible group such as a cobaltocene group.

16 Claims, 15 Drawing Sheets

(51) Int. Cl.
  H01B 1/12  (2006.01)
  H01M 4/60  (2006.01)
  H01M 4/1399  (2010.01)
  C08L 85/00  (2006.01)
  H01G 11/62  (2013.01)
  H01G 11/02  (2013.01)
  H01G 11/58  (2013.01)

(52) U.S. Cl.
  CPC ........... H01M 4/1399 (2013.01); H01M 4/60 (2013.01); H01M 4/608 (2013.01); C08L 2203/20 (2013.01); H01G 11/02 (2013.01); H01G 11/58 (2013.01); H01G 11/62 (2013.01); Y02E 60/13 (2013.01)

(58) Field of Classification Search
  CPC ..... C08L 2203/20; H01G 11/48; H01G 11/02; H01G 11/58; H01G 11/62; Y02E 60/13
  USPC ........................................................ 429/213
  See application file for complete search history.

(56) References Cited

OTHER PUBLICATIONS

Bouden, et al., "Electrochemical Immobilization of Rediox Active Molecule Based Ionic Liquid", Electrochemistry Communications, vol. 58, Sep. 2015, pp. 65-68.
Bui-Thi-Tuyet, et al., "Surface Functionalization of Ferrocene Based Ionic Liquid Onto Carbon Surface Using Stepwise Grafting", Journal of Electroanalytical Chemistry, vol. 713, Jan. 2014, pp. 28-31.
Burgess, et al., "Scanning Electrochemical Microscopy and Hydrodynamic Voltammetry Investigation of Charge Transfer Mechanisms on Redox Active Polymers", Journal of the Electrochemical Society, vol. 163, No. 4, Jan. 2016, pp. H3006-H3013.
Fabre and Hauquier, "Single-Component and Mixed Ferrocene-Terminated Alkyl Monolayers Covaltently Bound to Si(111) Surfaces", The Journal of Physical Chemistry B, vol. 110, No. 13, Apr. 2006, pp. 6848-6855.
Forgie, et al., "Electrochemical Characterisation of a Lithium-Ion Battery Electrolyte Based on Mixtures of Carbonates with a Ferrocene-Functionalised Imidazolium Electroactive Ionic Liquid", Physical Chemistry Chemical Physics, vol. 15, No. 20, Mar. 2013, pp. 7713-7721.
Gomez-Mingot, et al., "Oxidative Grafting of a Redox-Molecule-Based Ionic Liquid onto an Electrode Surface: Anion Exchange within a Layer", ChemElectroChem, vol. 1, No. 9, Sep. 2014, pp. 1467-1470.
Gong, et al., "Humidity Sensor Using Cross-Linked Copolymers Containing Viologen Moiety", Sensors and Actuators B: Chemical, vol. 73, No. 2-3, Mar. 2001, pp. 185-191.
International Search Report for PCT/EP2017/060829, dated Jun. 26, 2017.
Kim, et al., "Ferrocene Functional Polymer Brushes on Indium Tin Oxide via Surface-Initiated Atom Transfer Radical Polymerization", Langmuir, vol. 26, No. 3, Dec. 2009, pp. 2083-2092.
Kumar, et al., "Chromofluorescent Probes for Selective Detection of Fluoride and Acetate Ions", Organic Letters, vol. 10, No. 24, Nov. 2008, pp. 5549-5552.
Laviron, E., "General Expression of the Linear Potential Sweep Voltammogram in the Case of Diffusionless Electrochemical Systems", Journal of Electroanalytical Chemistry and Interfacial Electrochemistry, vol. 101, No. 1, Jul. 1979, pp. 19-28.
Park and Kazlauskas, "Improved Preparation and Use of Room-Temperature Ionic Liquids in Lipase-Catalyzed Enantio- and Regioselective Acylations", The Journal of Organic Chemistry, vol. 66, No. 25, Dec. 2001, pp. 8395-8401.

* cited by examiner

ELECTROACTIVE IONIC LIQUIDS AND SURFACE-MODIFIED SUBSTRATES CONTAINING THEM

CROSS-REFERENCE TO RELATED APPLICATIONS

The present application is a national phase entry under 35 U.S.C. § 371 of International Application No. PCT/EP2017/060829, filed May 5, 2017, which claims priority from PCT/IB2016/000750, filed May 6, 2016, all of which are incorporated herein by reference.

The present invention relates to electroactive ionic liquids and uses thereof, in particular for modifying the surface of a substrate, such as the current collector of an electrode, and use of said surface-modified substrates.

BACKGROUND ART

Ionic liquids constitute a class of materials with many promising applications in diverse fields. Ionic liquids (ILs) have several physico-chemical properties that make them extensively investigated including very low vapor pressure, large electrochemical window and high electrical conductivity. ILs have been proposed in several electrochemical applications including lithium ion batteries, fuel cells, and solar batteries.

The ionic liquid properties can be tailored by modifying the ions in their composition leading to the emergence of a large variety of ionic liquids. Moreover, the introduction of the functional group forms: "functionalized or task-specific ionic liquids" allows tuning their properties for a particular application. Recently, the research on ionic liquid-modified electrodes became intensively developing area. Thus, taking the advantage of introducing a monomer group to ILs, new family of functional polymer labeled polymeric ionic liquids or poly(ionic liquids), poly(ILs), have been developed. A number of reviews were devoted to the use of ionic liquids derivatives as electrolytes for chemical and electrochemical polymerizations, templates for porous materials and as components of polymeric or inorganic matrices.

Monomers based ionic liquids have been investigated resulting in novel solid polyelectrolytes having ILs moiety in the polymer structure. Several works about this new class of polymer have been reported reviewing new structures, new properties and applications. In poly(ILs) the properties of ILs are incorporated into the polymer chains providing a new class of polymeric materials. Overall, Poly(M have extended the possibility of designing new polyelectrolytes with suitable applications in energy, environment, and catalysis applications.

In the literature, three different synthetic routes have been proposed for the synthesis of polymer based ionic liquid including polymerization or crosslinking of monomer in IL, doping with ILs, and direct polymerization of IL based monomer. Poly(ILs) are generated using the well-established direct radical polymerization process and the widely studied method is the atom transfer radical polymerization (ATRR). As an example, vinylimidazolium monomers bearing different functional groups have been synthesized and investigated for developing novel poly(IL). Indeed, Salamorte et al. and Ohno et al. describe the polymerization of numerous vinylimidazolium based ILs. Moreover, several reviews have been devoted to the elaboration of poly(IL) bearing different cations and anions.

Polymers bearing electroactive units were found to be interesting materials for a broad variety of applications such as molecular electronics, (bio)analytical sensors, energy transduction materials, electrochemical actuator, smart surfaces, as well as batteries. Polymers containing ferrocene (Fc) redox units have been immobilized by plasma polymerization, electrochemically or through dip coating. Besides that, surface-initiated ATRP has been employed to generate polymer films containing Fc units, either by direct polymerization of a Fc functionalized monomer or by post-functionalization based on "click" chemistry.

However, the synthesis and electrochemical investigation of redox active polymer based ionic liquid has not been reported to date.

There is thus a need for new electro-active ionic liquids which are easy to access and whose properties may be easily tailored according to the field of application.

SUMMARY OF THE INVENTION

Ionic Moulds Containing an Imidazolium/Quaternary Ammonium Based Cation and a Negatively Charged Counter-Ion Applicants have found that ionic liquids containing an imidazolium/quaternary ammonium based cation and a negatively charged counter-ion comprising at least: one imidazolium/quaternary ammonium moiety, one reducible group and optionally one metallocene oxidizable group, display electro-active properties, opening a whole alley of applications.

In the ionic liquids of the invention, the imidazolium/quaternary ammonium moiety enhances the electrochemical capacities of the ionic liquid of the invention, while the metallocene oxidizable group (electron-donating group) and/or one reducible group (electron accepting group) provide the system with the properties of an organic battery, i.e. the ionic liquids of the invention are able to exchange electrons with an electrode and simultaneously to accept or release ions so as to ensure electrical neutrality. As such, the ionic liquids of the invention qualify as electro-active.

In particular, they may be used for providing multifunctional devices with applications in the optoelectronic field (In particular as smart windows), as well as in the electrochemical energy storage, acting as hybrid materials combining the properties of supercapacitors and organic batteries.

In addition, the electroactive ionic liquids of the invention display electrochromic properties, thus rendering them suitable for applications in optoelectronic in particular.

Therefore, in a first aspect, the invention concerns an electro-active ionic liquid including imidazolium/quaternary ammonium-based molecules, each of said imidazolium/quaternary ammonium-based molecule comprising at least:
  one imidazolium/quaternary ammonium moiety associated with a negatively-charged counter-ion,
  one reducible group,
  optionally one metallocene oxidizable group.

In another aspect, the invention concerns processes for preparing the electroactive ionic liquids of the invention.

In yet another aspect, the invention relates to a surface-modified substrate grafted with an electro-active ionic liquid of the invention, i.e. including imidazolium/quaternary ammonium-based molecules, each of said imidazolium/quaternary ammonium-based molecule comprising at least:
  one imidazolium/quaternary ammonium moiety associated with a negatively-charged counter-ion, and
  one metallocene oxidizable group and/or one reducible group.

In yet another aspect, the present invention relates to an energy storage device comprising at least two surface-modified electrodes of the invention.

In yet another aspect, the present invention relates to a process for grafting the surface of a substrate with an electro-active ionic liquid of the invention, i.e. including imidazolium/quaternary ammonium-based molecules, each of said imidazolium/quaternary ammonium-based molecule comprising at least:
one imidazolium/quaternary ammonium moiety associated with a negatively-charged counter-ion, and
one metallocene oxidizable group and/or one reducible group.

To generalize, the invention is an electro-active ionic liquid comprising molecules, comprising at least:
an ionic liquid center, associated with a negatively charged counter-ion, and selected from:

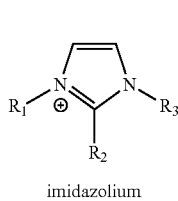
imidazolium

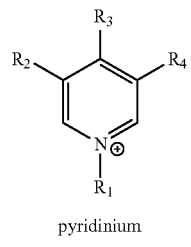
pyridinium

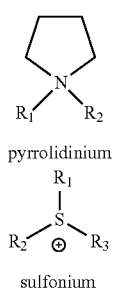
pyrrolidinium

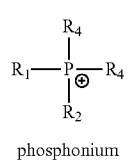
phosphonium

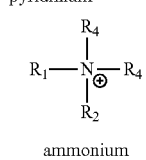
ammonium

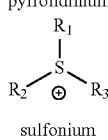
sulfonium a metallocene oxidizable group and/or a reducible group as defined in claim 1.

The present invention further relates to an electro-active polymeric ionic liquid comprising imidazolium-based repeated units, each of said imidazolium-based repeated units comprising at least:
an imidazolium moiety associated with a negatively charged counter-ion,
a metallocene oxidizable group and/or a reducible group, the reducible group being selected from:
an anthraquinone derivative of formula (IV):

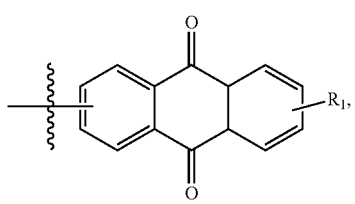

with $R_1$ representing a hydrogen atom or a $C_1$-$C_6$-alkyl group, a viologen group, in particular of formula (V):

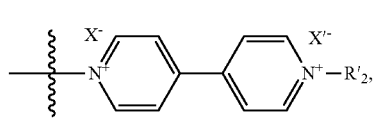

with $R'_2$ representing a hydrogen atom, a $C_1$-$C_8$ alkyl group or a $C_2$-$C_6$ alkenyl group, and X and X' identical or different, and each independently representing a halogen group, preferably Cl—, Br— or I—, or
a metallocene reducible group.

The present invention further relates to an electro-active polymeric ionic liquid comprising quaternary ammonium-based repeated units, each of said quaternary ammonium-based repeated units comprising at least:
a quaternary ammonium moiety associated with a negatively charged counter-ion,
a metallocene oxidizable group and/or a reducible group, the reducible group being selected from:
an anthraquinone derivative of formula (IV):

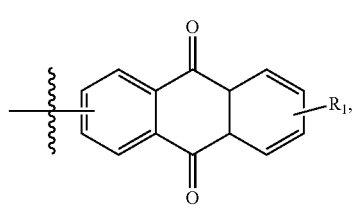

with $R_1$ representing a hydrogen atom or a $C_1$-$C_6$-alkyl group, or
a viologen group, in particular of formula (V):

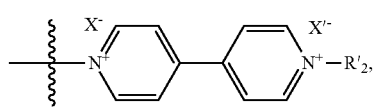

with $R'_2$ representing a $C_1$-$C_8$ alkyl group or a $C_1$-$C_6$ alkenyl group, and X and X' identical or different, and each independently representing a halogen group, preferably Cl—, Br— or I—,
a metallocene reducible group such as cobaltocene.

Definitions

As understood In the present invention, an ionic liquid (IL) is a salt in the liquid state, preferably at a temperature of below 50° C., more preferably below 30° C., even more preferably below 10° C., typically at a temperature of around 0° C. to around 5° C. As such, the ionic liquids of the present invention comprise an organic cation (more precisely an imidazolium based cation) and a negatively-charged counter-ion.

In the present invention, the "negatively-charged counter-ion" has a negative charge that compensates the positive charge of the imidazolium-based cation, so that they may form a neutral salt. The negatively-charged counter-ion preferably compensates only the positive charges resulting from the imidazolium moieties.

As understood herein, the negatively-charged counter-ion may be only one anion or a plurality of anions. Therefore, the negatively-charged counter-ion comprises at least one organic or inorganic anion. Preferably, the negatively-charged counter-ion is one or a plurality of organic anions. Even more preferably, the negatively-charged counter-ion is a fluorinated anion, in particular $PF_6^-$, $BF_4^-$, $Cl^-$, $Br^-$ or bis(trifluoromethanesulfonyl)imidate $CF_3SO_2NSO_2CF_3^-$, preferably $PF_6^-$, $BF_4^-$ and bis(trifluoromethanesulfonyl)imidate $CF_3SO_2NSO_2CF_3^-$, even more preferably bis(trifluoromethanesulfonyl)imidate $CF_3SO_2NSO_2CF_3^-$.

As used herein, TFSI stands for bis(trifluoromethanesulfonyl)imidate ($CF_3SO_2NSO_2CF_3^-$).

As used herein, a "salt" a salt is understood as a cation-anion pair, and is electrically neutral. In the present invention, the cation is preferably a single positively charged molecule, while the anion may be may be only one anion or a plurality of anions, and is as defined above or below.

As understood herein, a "reducible group" is selected from:

a nitrophenyl

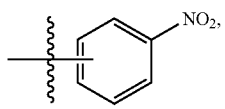

an anthraquinone derivative of formula (IV):

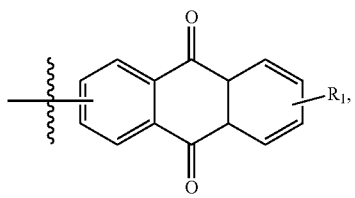

with $R_1$ representing a hydrogen atom or a $C_1$-$C_6$-alkyl group, or a viologen group, in particular of formula (V):

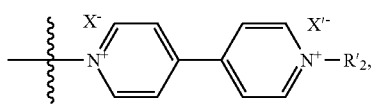

with $R'_2$ representing a hydrogen atom, a $C_1$-$C_8$ alkyl group or a $C_2$-$C_6$ alkenyl group, and X and X' identical or different, and each independently representing preferably a halogen group, such as $Cl^-$, $Br^-$ or $I^-$, or a reducible metallocene group, such as cobaltocene.

Preferably, $R^1$ is a hydrogen atom, and $R^2$ and $R^3$ are identical, and X and X' are identical preferably selected from $Cl^-$, $Br^-$ or $I^-$.

Advantageously, the viologen group is of formula (V) as defined above, and $R'_2$ is preferably a $C_1$-$C_8$ alkyl group or a $C_1$-$C_6$ alkenyl group, in particular a linear $C_1$-$C_8$ alkyl group or a linear $C_1$-$C_6$ alkenyl group, such as a linear $C_7$ alkyl group or an allyl group ($-CH_2CH=CH_2$).

Advantageously, the reducible group is selected from:
a nitrophenyl

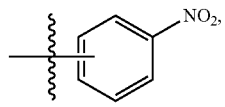

an anthraquinone derivative of formula (IV):

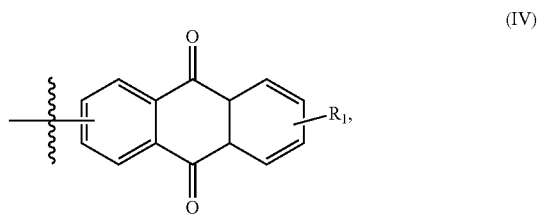

with $R_1$ representing a hydrogen atom or a $C_1$-$C_6$-alkyl group, preferably a hydrogen atom.

Even more advantageously, the reducible group is an anthraquinone derivative of formula (IV):

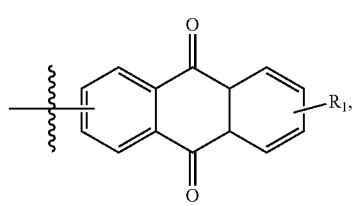

with $R_1$ representing a hydrogen atom or a $C_1$-$C_6$-alkyl group, preferably a hydrogen atom.

The imidazolium moiety of the present invention is preferably an imidazolium cation of formula:

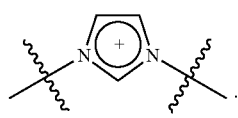

The quaternary ammonium moiety of the present invention is preferably a quaternary ammonium cation of formula:

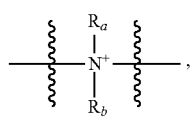

wherein $R_a$ and $R_b$ are identical or different and are each independently represents a $(C_1$-$C_6)$alkyl, advantageously a $(C_1$-$C_4$-$)$alkyl, the alkyl being preferably linear. For instance, $R_a$ and $R_b$ are each independently an ethyl or methyl group. Most preferably, $R_a$ and $R_b$ are both a methyl group. In other words, the quaternary ammonium moiety is most preferably

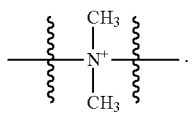

As used herein, the term "$(C_1-C_6)$alkyl" refers to a straight or branched monovalent saturated hydrocarbon chain containing from 1 to 6 carbon atoms including, but not limited to, methyl, ethyl, n-propyl, iso-propyl, n-butyl, iso-butyl, sec-butyl, t-butyl, n-pentyl, n-hexyl, and the like. As used herein, the term "$(C_1-C_6)$alkylene" refers to a straight or branched divalent saturated hydrocarbon chain containing from 1 to 6 carbon atoms including, but not limited to, methyl, ethyl, n-propyl, iso-propyl, n-butyl, iso-butyl, sec-butyl, t-butyl, n-pentyl, n-hexyl, and the like.

The term "aryl", as used in the present invention, refers to an aromatic group comprising preferably 5 to 10 carbon atoms. The aryl group of the invention may be monocyclic or comprise fused rings. Examples of aryl groups are phenyl or naphtyl groups. Advantageously, it will be a phenyl group.

As used herein, a vinyl group is a $(C_2-C_6)$alkenyl comprising a terminal double bond. Preferably, the vinyl group of the invention comprises only one double bond. Preferably, in the present invention, the vinyl group is of the formula $CH_2=CH-(C_1-C_4)$alkyl, or $CH_2=C(CH_3)-(C_1-C_4)$alkyl. Examples of vinyl groups as understood in the present invention are $CH_2=CH-CH_2-$, and $CH_2=CH-CH_2-CH_2-$ groups.

The term "$(C_1-C_6)$alkenyl", as used in the present invention, refers to a straight or branched monovalent unsaturated hydrocarbon chain containing from 2 to 6 carbon atoms and comprising at least one double bond including, but not limited to, ethenyl, propenyl, butenyl, pentenyl, hexenyl and the like.

As used herein, an acrylic group is a $CH_2=C(R)C(O)OR'$ group, wherein R and R' are indentical or different and independently represent a $C_{1-6}$ alkyl group. Preferred examples of acrylic groups are $CH_2=CH-C(O)O-CH_2CH_2-$ and are $CH_2=C(CH_3)-C(O)O-CH_2CH_2-$.

As used herein, a "leaving group" is understood as a chemical group which can be easily replaced with a nucleophile during a nucleophile substitution reaction, the nucleophile being in the present case imidazole or a mono-substituted imidazole. Such a leaving group can be in particular a halogen atom (in particular Cl, Br or I, more preferably Br or i), a sulfonate (in particular a group $-OSO_2-R''$ with $R''$ representing a $(C_1-C_6)$alkyl, aryl, aryl-$(C_1-C_6)$-alkyl or $(C_1-C_6)$-alkyl-aryl group, such as mesylate ($CH_3-S(O_2)O-$), a triflate ($CF_3-S(O)_2O-$) or a tosylate (p-Me-$C_6H_4-S(O)_2O-$)) or an ammonium group.

As used herein, an "ammonium group" is an ammonium group of formula $-N^+R_{10}R_{11}R_{12}T^-$, with $R_{10}$, $R_{11}$ and $R_{12}$ different or identical and independently representing a $C_1-C_6$ alkyl group, and T representing a halogen atom such as $Cl^-$, $Br^-$ or $I^-$. Preferably, $R_{10}$, $R_{11}$ and $R_{12}$ are identical, and advantageously represent a $CH_3$ group.

As used herein, the term "an electrochromic material" refers to a material which reversibly changes colour by using bursts of charge to cause electrochemical redox reactions in electrochromic materials.

As understood herein, "surface initiated atom-transfer radical polymerization" is a grafting method involving forming a reactive radical on a surface, which will then initiate an atom-transfer radical polymerization, for instance with vinylic or acrylic monomers.

As understood herein, "surface electro-initiated emulsion polymerization (SEEP)" is a grafting method that provides covalently grafted polymer films on conducting or semiconducting surfaces by radical polymerization in aqueous dispersed media. It relies on cathodic electroinitiation, which creates radical species able to start a radical polymerization and chains grafting to the cathode as termination reaction.

As used herein, a "graft-fast" reaction is understood as a process based on a simple redox activation of aryl diazonium salts with a reducing agent such as iron powder, hydrophosphorous or L-ascorbic acid with or without the presence of a vinylic or methacrylate monomer. In other words, in a graft-fast process, an aryl diazonium salt is activated through a redox reaction in the presence of a reducing agent such as iron powder, hydrophosphorous or L-ascorbic acid to provide the corresponding aryl radical, which is then grafted on the substrate. When the reaction is carried out in the presence of a vinylic or methacrylate monomer, a polymerization reaction occurs concomitantly with the grafting step.

As used herein, "electrografting" is understood as an electropolymerization technique dedicated to the chemisorption of molecules or polymers onto conductive surfaces. Electrografting also encompasses reactions involving an electron transfer between the substrate to be modified and the reagent, but also to examples where a reducing or oxidizing reagent is added to produce the reactive species, under conditions well-known to the one of skill in the art.

DETAILED DESCRIPTION

Electro-Active Ionic Liquids

The present invention relates to an electro-active ionic liquid including at least or consisting of imidazolium/quaternary ammonium-based molecules, each of said imidazolium/quaternary ammonium-based molecule comprising at least:
one imidazolium/quaternary ammonium moiety associated with a negatively-charged counter-ion, and
one metallocene oxidizable group and/or one reducible group.

In other words, the imidazolium/quaternary ammonium-based molecule comprises at least, or consists of:
one imidazolium/quaternary ammonium moiety, one negatively-charged counter-on and one metallocene oxidizable group, or
one imidazolium/quaternary ammonium moiety associated with one negatively-charged counter-ion, and one reducible group, or
one imidazolium/quaternary ammonium moiety associated with one negatively-charged counter-ion, one metallocene oxidizable group and one reducible group.

In a particular embodiment, the imidazolium/quaternary ammonium-based molecule comprises at least, or consists of:
one imidazolium/quaternary ammonium moiety associated with one negatively-charged counter-ion,
one reducible group, and
optionally one metallocene oxidizable group.

In a particularly advantageous embodiment, the imidazolium/quaternary ammonium-based molecule comprises at least or consists of one imidazolium/quaternary ammonium moiety associated with one negatively-charged, one metallocene oxidizable group and one reducible group.

In the present invention, the imidazolium/quaternary ammonium-based molecule comprises or consists of a single positively charged imidazolium/quaternary ammonium-based ion (also referred to as "single imidazolium/quaternary ammonium-based cation"), be it part of a "small cation" or a polymeric cation, and one or a plurality of counter-ions, so as to obtain a neutral salt. As understood herein, a "small imidazolium/quaternary ammonium-based cation" is an organic cation comprising an imidazolium/quaternary ammonium moiety, a metallocene oxidizable group and/or a reducible group as defined above or below, comprising not more than 3 positive net charges, typically one positive charge. Typically, the imidazolium/quaternary ammonium-based cation comprises only one imidazolium/quaternary ammonium moiety. The charges stemming from the metallocene group and/or the viologen group are compensated by other ions and are not taken into account in the net charge of the imidazolium/quaternary ammonium-based cation.

The metallocene oxidizable group is preferably a ferrocene, a nickellocene, a cobaltocene or a titanocene group, more preferably a ferrocene, a nickellocene or a cobaltocene group, even more preferably a ferrocene group. Typically, the metallocene oxidizable group is of formula of formula (III)

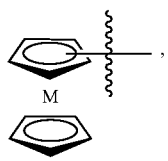

(III)

M being a transition metal ion such as iron, nickel, titanium or cobalt ion, preferably iron, nickel or cobalt ion, even more preferably iron ion.

Advantageously, the metallocene oxidizable group is a ferrocene group, and the reducible group is preferably selected from a nitrophenyl

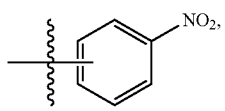

or an anthraquinone derivative of formula (IV) as defined above.

In another advantageous embodiment, the metallocene oxidizable group is a ferrocene group, and the reducible group is preferably selected from a viologen group of formula (V) as defined above, or an anthraquinone derivative of formula (IV) as defined above.

Even more preferably, the metallocene oxidizable group is a ferrocene group, and the reducible group is an anthraquinone derivative of formula (IV) as defined above.

In the anthraquinone derivative of formula (IV):

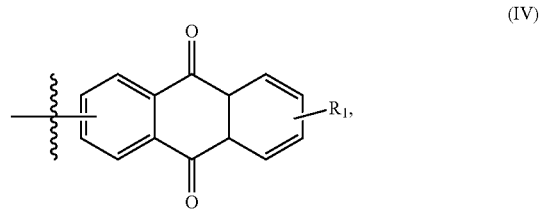

(IV)

$R_1$ preferably represents a hydrogen atom.

In a particular embodiment, the reducible group is a reducible metallocene group, in particular of formula (III')

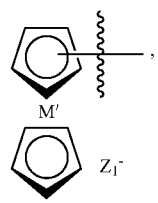

(III')

with M' being a transition metal ion such as iron, nickel, titanium or cobalt ion, preferably iron, nickel or cobalt ion, even more preferably cobalt ion, and $Z_1^-$ a negatively charged counter ion such as an organic anion, typically a fluorinated anion. In particular, Z is $PF_6^-$, $BF_4^-$, $Cl^-$, $Br^-$ or bis(trifluoromethanesulfonyl)imidate $CF_3SO_2NSO_2CF_3^-$, preferably it is bis(trifluoromethanesulfonyl)imidate $CF_3SO_2NSO_2CF_3^-$ (TFSI).

In a particular embodiment, the imidazolium/quaternary ammonium-based molecule contains only one imidazolium/quaternary ammonium moiety. In this embodiment, the imidazolium/quaternary ammonium-based molecule may comprise a carbon-carbon unsaturated bond suitable for polymerization, in particular bulk polymerization and surface polymerization, such as a vinyl group or an acrylic group. For instance, in this embodiment, the ionic liquid of the invention is of formula (Ib) as defined below.

In this embodiment, the electro-active ionic liquid of the invention is preferably of formula (I):

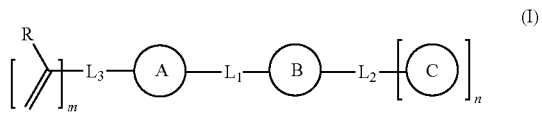

(I)

wherein m and n are independently 0 or 1;

$L_1$ is selected from: a bond, a $C_1$-$C_6$ alkyl group where one or two carbon atoms are optionally replaced by an oxygen atom, a CO—($C_1$-$C_6$)alkyl group, a ($C_1$-$C_6$)alkyl-CO— group, a CONH—($C_1$-$C_6$)alkyl group, a ($C_1$-$C_6$)alkyl-CONH— group, a COO—($C_1$-$C_6$)alkyl group, and a ($C_1$-$C_6$)alkyl-COO— group;

A and B are different and are selected from:

an imidazolium group of formula (IIa):

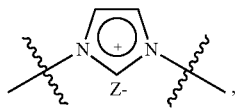

or a quaternary ammonium group of formula (IIb):

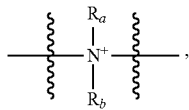

$Z^-$ being a negatively charged counter ion as defined above, and $R_a$ and $R_b$ being identical or different and being each independently represents a $(C_1-C_6)$alkyl, advantageously a $(C_1-C_4)$alkyl, and a metallocene oxidizable group of formula (III)

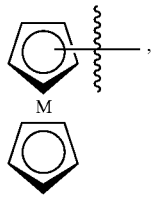

M being a transition metal ion such as iron, nickel, titanium or cobalt ion, or a reducible group, provided that at least A or B is an imidazolium/quaternary ammonium group of formula (IIa) or (IIb), when m is 1, then A or B is an imidazolium/quaternary ammonium group of formula (IIa) or (IIb), $L_3$ is selected from a bond, a $C_1-C_6$ alkyl group, a CONH—$(C_1-C_6)$alkyl group, a $(C_1-C_6)$alkyl-CONH— group, a COO—$(C_1-C_6)$alkyl group, and a $(C_1-C_6)$alkyl-COO— group, wherein one or two carbon atoms In the $(C_1-C_6)$-alkyl group are optionally replaced by an oxygen atom, and R is a hydrogen atom, a $C_1-C_6$ alkyl group or a $C_5-C_{10}$-aryl group.

when m is 0, then $L_3$ is a hydrogen atom if A is metallocene oxidizable group of formula (III) or a reducible group, $L_3$ is a $C_1-C_6$ alkyl group if A is an imidazolium/quaternary ammonium group of formula (IIa) or (IIb), when n is 1, then C is selected from:

a metallocene oxidizable group of formula (III) as defined above, or a reducible group as defined above, provided that A, B and C are different;

$L_2$ is selected from a bond, a C—C alkyl group, a CO—$(C_1-C_6)$alkyl group, a $(C_1-C_6)$alkyl-CO— group, a CONH—$(C_1-C_6)$alkyl group, a $(C_1-C_6)$alkyl-CONH— group, a COO—$(C_1-C_6)$alkyl group, and a $(C_1-C_6)$alkyl-COO— group, wherein one or two carbon atoms in the $(C_1-C_6)$-alkyl group are optionally replaced by an oxygen atom;

when n is 0, then $L_2$ is a hydrogen atom if B is metallocene oxidizable group of formula (III) or a reducible group, $L_2$ is a $C_1-C_6$ alkyl group if B is an imidazolium/quaternary ammonium group of formula (IIa) or (IIb).

In this particular embodiment, the ionic liquid of the invention thus consists of a "small molecule" comprising a "small" imidazolium/quaternary ammonium-based cation associated with a negatively charged counter-ion.

Preferably, Z represents an organic anion, typically a fluorinated anion. In particular, Z is $PF^{6-}$, $BF^{4-}$, $Cl^-$, $Br^-$ or bis(trifluoromethanesulfonyl)imidate $CF_3SO_2NSO_2CF_3^-$, preferably it is bis(trifluoromethanesulfonyl)imidate $CF_3SO_2NS_2CF_3^-$ (TFSI).

In a particular embodiment, the imidazolium/quaternary ammonium is an imidazolium group of formula (IIa).

In another embodiment, the imidazolium/quaternary ammonium is a quaternary ammonium group of formula (IIb) as defined above. In this embodiment, Ra and Rb are identical or different and are preferably linear alkyl groups, such as $C_1-C_4$ linear alkyl groups. For instance, $R_a$ and $R_b$ are each independently an ethyl or methyl group. Most preferably, $R_a$ and $R_b$ are both a methyl group.

Advantageously, $L_1$ is selected from: a bond, a $C_1-C_6$ alkyl group where one or two carbon atoms are optionally replaced by an oxygen atom, a CONH—$(C_1-C_6)$alkyl group, a $(C_1-C_6)$alkyl-CONH— group, a COO—$(C_1-C_6)$alkyl group, and a $(C_1-C_6)$alkyl-COO— group. Preferably, $L_1$ represents a $C_1-C_6$ alkyl group, a CONH—$(C_1-C_6)$alkyl group, a $(C_1-C_6)$alkyl-CONH— group, a COO—$(C_1-C_6)$ alkyl group, or a $(C_1-C_6)$alkyl-COO— group (In particular when neither A nor B is a viologen group). More preferably, $L_1$ represents a $C_1-C_2$ alkyl group, a CO—$(C_1-C_2)$alkyl group, a $(C_1-C_2)$alkyl-CO— group, a CONH—$(C_1-C_2)$alkyl group, a $(C_1-C_2)$alkyl-CONH— group, a COO—$(C_1-C_2)$ alkyl group, or a $(C_1-C_2)$alkyl-COO— group.

Advantageously, $L_2$ is selected from a bond, a $C_1-C_6$ alkyl group, a CONH—$(C_1-C_6)$alkyl group, a $(C_1-C_6)$alkyl-CONH— group, a COO—$(C_1-C_6)$alkyl group, and a $(C_1-C_6)$alkyl-COO— group, wherein one or two carbon atoms in the $(C_1-C_6)$-alkyl group are optionally replaced by an oxygen atom. Preferably, $L_2$ represents a $C_1-C_6$ alkyl group, a CONH—$(C_1-C_6)$alkyl group, a $(C_1-C_6)$alkyl-CONH— group, a COO—$(C_1-C_6)$alkyl group, or a $(C_1-C_6)$alkyl-COO— group (in particular when neither B nor C is a viologen group). More preferably, $L_2$ represents a $C_1-C_2$ alkyl group, a CO—$(C_1-C_2)$alkyl group, a $(C_1-C_2)$alkyl-CO— group, a CONH—$(C_1-C_2)$alkyl group, a $(C_1-C_2)$alkyl-CONH— group, a COO—$(C_1-C_2)$alkyl group, or a $(C_1-C_2)$alkyl-COO— group.

In a particular embodiment, neither A, B nor C represents a viologen group.

Advantageously, in formula (I), R represents H or $CH_3$, preferably H.

Advantageously, $L_3$ is a $C_1$-$C_6$ alkyl group, a COO—($C_1$-$C_6$)alkyl group or a ($C_1$-$C_6$)alkyl-COO group.

Preferably, $L_3$ is a $C_1$-$C_2$ alkyl group, a COO—($C_1$-$C_2$) alkyl group or a ($C_1$-$C_2$)alkyl-COO group.

In a particular embodiment, R is a hydrogen atom and L is a $C_1$-$C_6$ alkyl group, a COO—($C_1$-$C_6$)alkyl group or a ($C_1$-$C_6$)alkyl-COO group, preferably a $C_1$-$C_2$ alkyl group, a COO—($C_1$-$C_2$)alkyl group or a ($C_1$-$C_2$)alkyl-COO group.

In a particular embodiment, the metallocene oxidizable group is a ferrocene group, that is, the metallocene oxidizable group is of formula (III) as defined above with M representing iron.

In a particular embodiment, the reducible group is a reducible metallocene group, in particular of formula (III')

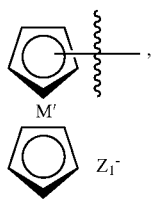
(III')

with M' being a transition metal ion such as Iron, nickel, titanium or cobalt ion, preferably iron, nickel or cobalt ion, even more preferably cobalt ion, and $Z_1^-$ a negatively charged counter ion such as an organic anion, typically a fluorinated anion.

In particular, Z is $PF^{6-}$, $BF^{4-}$, $Cl^-$, $Br^-$ or bis(trifluoromethanesulfonyl)imidate $CF_3SO_2NSO_2CF_3^-$, preferably it is bis(trifluoromethanesulfonyl)imidate $CF_3SO_2NSO_2CF_3^-$ (TFSI).

In a preferred embodiment, the reducible group is a viologen group of formula (V) as defined above. In this embodiment, the viologen reducible group is preferably a group of formula (V), with and $R'_2$ representing a $C_1$-$C_8$ alkyl group or a $C_2$-$C_6$ alkenyl group, preferably a linear $C_1$-$C_8$ alkyl group or a linear $C_2$-$C_6$ alkenyl group, such as a linear $C_7$ alkyl group or an allyl group (—$CH_2CH$=$CH_2$), and X and X' identical or different and each independently representing a halogen group, preferably $Cl^-$, $Br^-$ or $I^-$.

In a particularly preferred embodiment, the reducible group is an anthraquinone derivative of formula (IV) as defined above with $R_1$ preferably representing a hydrogen atom, and the metallocene oxidizable group is a ferrocene group that is the metallocene oxidizable group is of formula (III) as defined above with M representing iron.

In a particular embodiment, n is 1. In this embodiment, the ionic liquid of the invention is of formula (Ia):

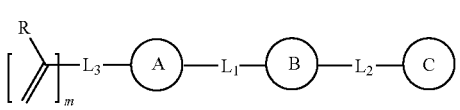
(Ia)

wherein A, B, C, $L_1$, $L_2$, $L_3$, m and R are as defined above in the case when n=1.

In another particular embodiment, m is 1. In this embodiment, the ionic liquid of the invention is of formula (Ib):

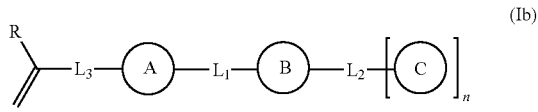
(Ib)

wherein A, B, C, $L_1$, $L_2$, $L_3$, n and R are as defined above in the case when m=1. In this embodiment, A is preferably an imidazolium group of formula (II) or a quaternary ammonium group of formula (IIb), as defined above.

In another particular embodiment, n is 0. In this embodiment, the ionic liquid of the invention is of formula (Ic):

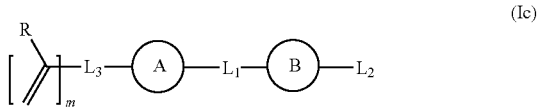
(Ic)

wherein A, B, $L_1$, $L_2$, $L_3$, m and R are as defined above in the case when n=0. Preferably In this embodiment, when m is 0, A is an imidazolium/quaternary ammonium moiety and B is a reducible group. Alternatively, in one embodiment, m is 1.

In a particular embodiment, m is 0. In this embodiment, the ionic liquid of the invention is of formula (Id):

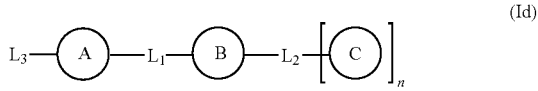
(Id)

wherein A, B, C, $L_1$, $L_2$, $L_3$ and n are as defined above in the case when m 0. Preferably in this embodiment, when n is 0, A is an imidazolium/quaternary ammonium moiety and B is a reducible group. Alternatively, in one embodiment, n is 1.

In another particular embodiment, n is 1 and m is 1. In this embodiment, the ionic liquid of the invention is of formula (Ie):

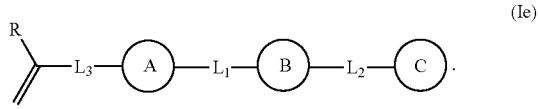
(Ie)

wherein A, B, $L_1$, $L_2$, $L_3$ and R are as defined above in the case when n=1 and m=1. In this embodiment, A is preferably an imidazolium group of formula (IIa) or a quaternary ammonium group of formula (IIb) as defined above.

In formula (I) and (Ia) to (Ie), the metallocene oxidizable group is preferably a ferrocene group, and the reducible group is preferably selected from a nitrophenyl

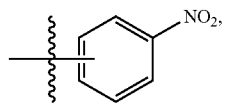

or an anthraquinone derivative of formula (IV) as defined above. Even more preferably, the reducible group is an anthraquinone derivative of formula (IV) as defined above.

In the anthraquinone derivative of formula (IV):

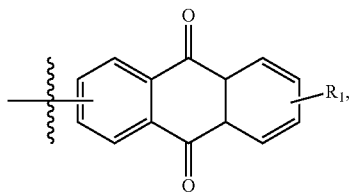

(IV)

R$_1$ preferably represents a hydrogen atom.

In formula (I) and (Ia) to (Ie), the metallocene oxidizable group is preferably a ferrocene group, and the reducible group is advantageously selected from a viologen group of formula (V), or an anthraquinone derivative of formula (IV) as defined above. Even more preferably, the reducible group is an anthraquinone derivative of formula (IV) as defined above, with R$_1$ preferably represents a hydrogen atom.

In a particular embodiment of formulae (I) and (Ib) to (Id), when n is 0, A and B are different and are selected from:

an imidazolium group of formula (IIa):

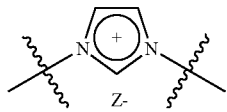

(IIa)

or quaternary ammonium group of formula (IIb)

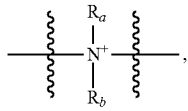

(IIb)

Z$^-$ being a negatively charged counter ion, and R$_a$ and R$_b$ being identical or different and being each independently represents a (C$_1$-C$_6$)alkyl, advantageously a (C$_1$-C$_4$)alkyl, and a reducible group as defined above or below.

Preferably, in this embodiment, when n=0, A is an imidazolium/quaternary ammonium group of formula (IIa/IIb) as defined above or below, and B is a reducible group as defined above or below.

In a particular embodiment, the ionic liquid of the invention is of formula (Ib), or it is a compound of formula (I) wherein m is 0, La is H and A is a viologen group of formula (V), with R'2 representing a C$_1$-C$_6$ alkenyl group, preferably an allyl group. In this embodiment, the ionic liquid of the invention thus comprises a polymerizable double bond (in particular under radical polymerization conditions).

In some embodiments which are comprised or not in the previous formula, the imidazolium/quaternary ammonium-based molecule of the invention can be:

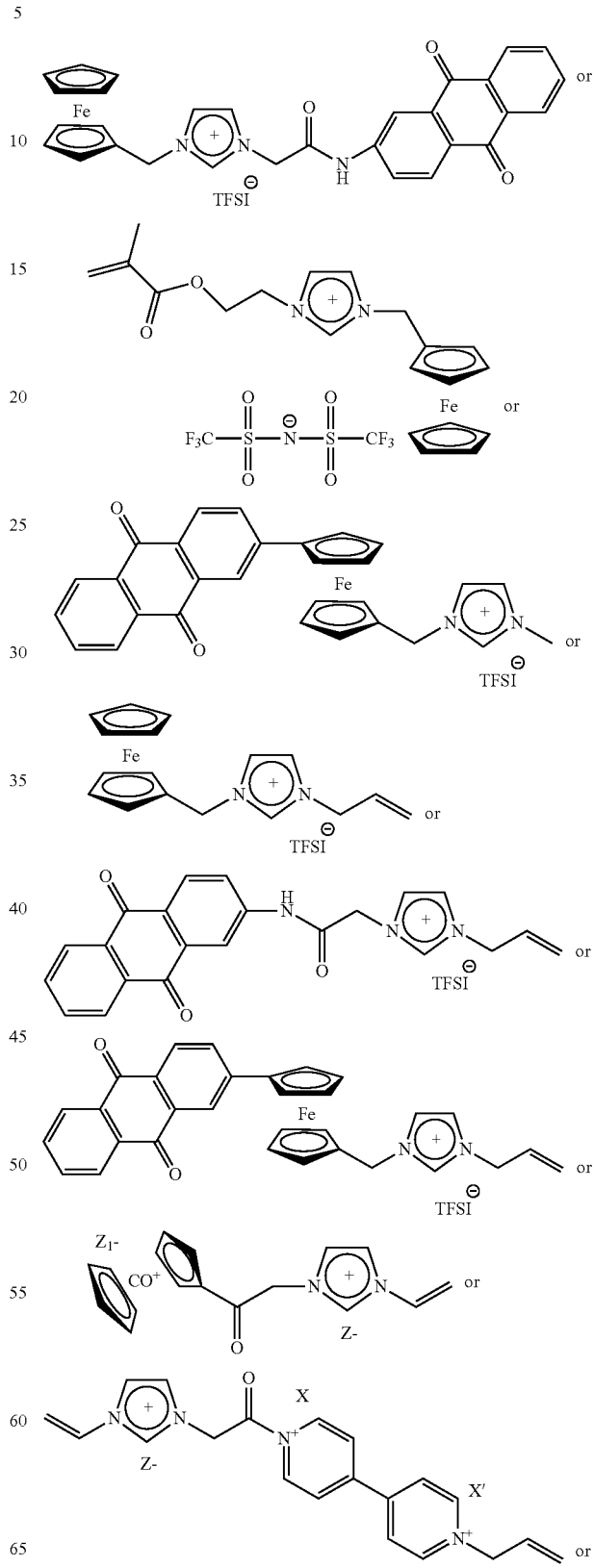

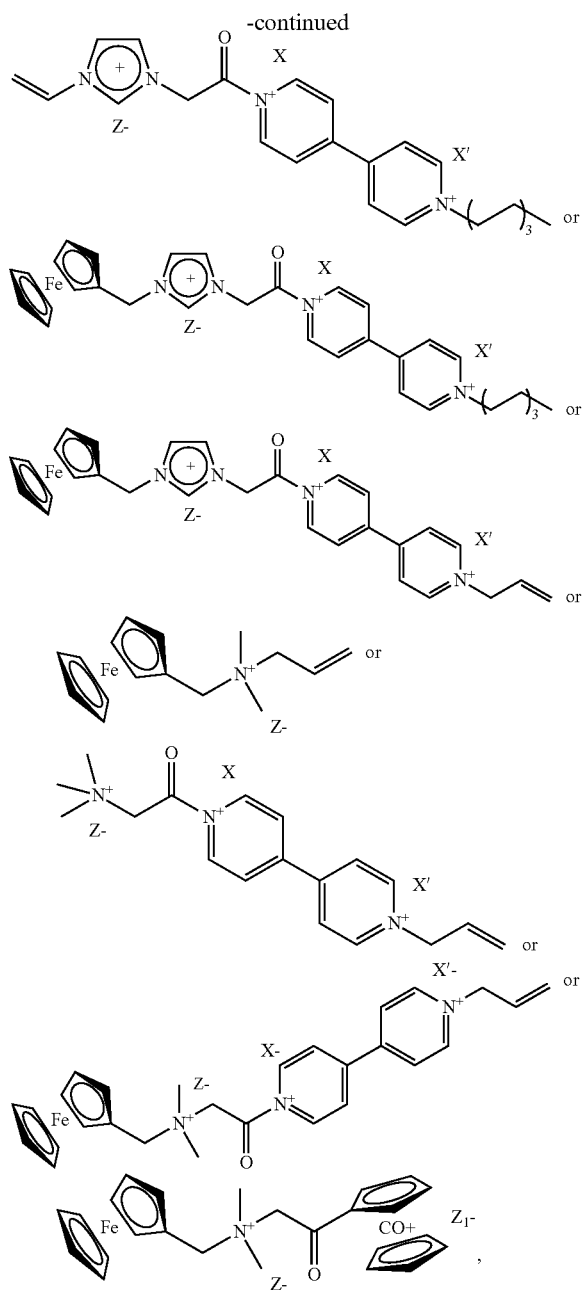

with $Z^-$, $Z_1^-$, $X^-$ and $X'^-$ as defined above, preferably representing a TFSI ion.

In another embodiment, the electroactive ionic liquid of the invention is a polymer comprising imidazolium/quaternary ammonium-based repeated units. Each of said imidazolium/quaternary ammonium-based units is an imidazolium/quaternary ammonium-based molecule as defined above, i.e. comprises at least:
- one imidazolium/quaternary ammonium moiety associated with one negatively-charged counter-ion, and
- one metallocene oxidizable group and/or one reducible group.

In this embodiment, the negatively-charged counter-ions, the imidazolium/quaternary ammonium moiety, the metallocene oxidizable and the reducible group are as defined above.

In this particular embodiment, the polymeric electroactive ionic liquid is preferably the product of the radical polymerization of imidazolium/quaternary ammonium-based monomers. Each of said imidazolium/quaternary ammonium-based monomer units is an imidazolium/quaternary ammonium-based molecule as defined above, preferably further comprising a carbon-carbon unsaturated bond suitable for polymerization, such as a vinyl group or an acrylic group. In other words, the imidazolium/quaternary ammonium-based monomer comprises at least:
- one imidazolium/quaternary ammonium moiety associated with one negatively-charged counter-ion, and
- one metallocene oxidizable group and/or one reducible group, and
- preferably a carbon-carbon unsaturated bond suitable for polymerization, such as a vinyl group or an acrylic group. The particular embodiments of the "small imidazolium/quaternary ammonium-based molecule" equally apply to the imidazolium/quaternary ammonium-based monomer.

In this particular embodiment, the polymeric ionic liquid is preferably the product of the radical polymerization of monomeric ionic liquids of formula (Ib) as defined above.

The imidazolium/quaternary ammonium-based polymeric ionic liquid of the invention may be:
- a copolymer, in particular a block-copolymer but not in a limited way, of:
  1) imidazolium/quaternary ammonium-based repeated units, each of said imidazolium/quaternary ammonium-based repeated units comprising imidazolium/quaternary ammonium-based molecules with: an imidazolium/quaternary ammonium moiety associated with a negatively charged counter ion and a metallocene oxidizable group (preferably ferrocene group) and
  2) imidazolium/quaternary ammonium-based repeated units, each of said imidazolium/quaternary ammonium-based repeated units comprising imidazolium/quaternary ammonium-based molecules with: an imidazolium/quaternary ammonium moiety associated with a negatively charged counter ion and a reducible group, preferably an anthraquinone derivative of formula (IV) as defined above, with $R_1$ advantageously representing a hydrogen atom;

or

- a homopolymer of imidazolium/quaternary ammonium-based repeated units, each of said imidazolium/quaternary ammonium-based repeated units comprising imidazolium/quaternary ammonium-based molecules with: an imidazolium/quaternary ammonium moiety associated with a negatively charged counter ion, a metallocene oxidizable group (preferably ferrocene group) and a reducible group (preferably an anthraquinone derivative of formula (IV) as defined above, with $R_1$ advantageously representing a hydrogen atom).

The polymeric ionic liquid of the invention may be immobilized, in particular grafted, on a surface, or be a "free" molecule (i.e. not immobilized).

Process for Preparing the Monomeric Electroactive Ionic Liquids from which the Polymeric Ionic Liquids of the Invention Will be Synthesized The ionic liquids of the invention are readily obtained by the one of skill in the art, through conventional reactions in the art.

In particular, the imidazolium-based molecules of the invention are prepared thanks to a process comprising at least:
a) a first nucleophilic substitution of a compound of formula D-L$_4$-Y and imidazole, with
D representing a metallocene oxidizable group or one reducible group,
L$_4$ representing a C$_1$-C$_6$ alkyl group, a CONH—(C$_1$-C$_6$)alkyl group, a (C$_1$-C$_6$)alkyl-CONH— group, a COO—(C$_1$-C$_6$)alkyl group, or a (C$_1$-C$_6$)alkyl-COO— group (preferably, L$_1$ represents a C$_1$-C$_2$ alkyl group, a CONH—(C$_1$-C$_2$)alkyl group, a (C$_1$-C$_2$)alkyl-CONH— group, a COO—(C$_1$-C$_2$)alkyl group, or a (C$_1$-C$_2$)alkyl-COO— group), and
Y representing a leaving group, preferably a halogen group (such as Cl, Br or I, preferably I) or a ammonium group
thus yielding a monosubstituted imidazole group of formula (VI)

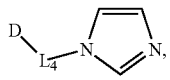

(VI)

with L$_4$ and D as defined above;
b) a second nucleophilic substitution of the monosubstituted imidazole group of formula (VI), with a compound of formula R$_4$—Y', with
Y' being a leaving group, preferably a halogen group such as C, Br or I, preferably I, and
R$_4$ representing a C$_1$-C$_6$ alkyl group or a group of formula CH$_2$=C(R)-L$_3$ with R and L$_3$ as defined in formula (I), or a L$_5$-E, with
E representing a metallocene oxidizable group or one reducible group, provided that D and E are different,
L$_5$ is selected from a bond, a C$_1$-C$_6$ alkyl group, a CONH—(C$_1$-C$_6$)alkyl group, a (C$_1$-C$_6$)alkyl-CONH— group, a COO—(C$_1$-C$_6$)alkyl group, and a (C$_1$-C$_6$)alkyl-COO— group, wherein one or two carbon atoms in the (C$_1$-C$_6$)-alkyl group are optionally replaced by an oxygen atom;
thus yielding an imidazolium-based ionic liquid of formula (VII)

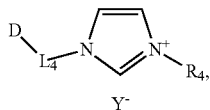

and
c) optionally an ion exchange reaction in order to exchange the Y$^-$ anion of the ionic liquid for a Z-anion as defined in formula (I), preferably a TFSI anion.

Alternatively, the imidazolium-based molecules of the invention are prepared thanks to a process comprising at least:
a) a first nucleophilic substitution of imidazole with a compound of formula R$_4$—Y', with
Y' being a leaving group, preferably a halogen group (such as C, Br or I, preferably I) or a ammonium group, and R$^4$ representing a C$_1$-C$_6$ alkyl group or a group of formula CH$_2$=C(R)-L$_3$ with R and L$_3$ as defined in formula (I), or a L$_5$-E, with
E representing a metallocene oxidizable group or one reducible group, provided that D and E are different,
L$_5$ is selected from a bond, a C$_1$-C$_6$ alkyl group, a CONH—(C$_1$-C$_6$)alkyl group, a (C$_1$-C$_6$)alkyl-CONH— group, a COO—(C$_1$-C$_6$)alkyl group, and a (C$_1$-C$_6$)alkyl-COO— group, wherein one or two carbon atoms in the (C$_1$-C$_6$)-alkyl group are optionally replaced by an oxygen atom;
thus yielding a monosubstituted imidazole group of formula (VIII)

(VIII)

with R$_4$ as defined above;
b) a second nucleophilic substitution of the monosubstituted imidazole group of formula (VIII) with a compound of formula D-L$_4$-Y, with
D representing a metallocene oxidizable group or one reducible group, provided that if R$_4$ comprises a metallocene oxidizable group or one reducible group, D and E are different,
L$_4$ representing a C$_1$-C$_6$ alkyl group, a CONH—(C$_1$-C$_6$)alkyl group, a (C$_1$-C$_6$)alkyl-CONH— group, a COO—(C$_1$-C$_6$)alkyl group, or a (C$_1$-C$_6$)alkyl-COO— group (preferably, L$_1$ represents a C$_1$-C$_2$ alkyl group, a CONH—(C$_1$-C$_2$)alkyl group, a (C$_1$-C$_2$)alkyl-CONH— group, a COO—(C$_1$-C$_2$)alkyl group, or a (C$_1$-C$_2$)alkyl-COO— group), and
Y representing a leaving group, preferably a halogen group, such as Cl, Br or I, preferably 1,
thus yielding an imidazolium-based ionic liquid of formula (VII) as defined above, and
c) optionally an ion exchange reaction in order to exchange the Y$^-$ anion of the ionic liquid for a Z$^-$ anion as defined in formula (I), preferably a TFSI anion.

The imidazolium-based molecules of the invention comprising one imidazolium moiety, one negatively-charged, one metallocene oxidizable group and one reducible group may also be prepared thanks to a process comprising the following successive steps:
a) a first nucleophilic substitution of a compound of formula D-L$_4$-Y and imidazole, with
D' representing a metallocene oxidizable group,
L$_4$ representing a C$_1$-C$_6$ alkyl group, a CONH—(C$_1$-C$_6$)alkyl group, a (C$_1$-C$_6$)alkyl-CONH— group, a COO—(C$_1$-C$_6$)alkyl group, or a (C$_1$-C$_6$)alkyl-COO— group (preferably, L$_1$ represents a C$_1$-C$_2$ alkyl group, a CONH—(C$_1$-C$_2$)alkyl group, a (C$_1$-C$_2$)alkyl-CONH— group, a COO—(C$_1$-C$_2$)alkyl group, or a (C$_1$-C$_2$)alkyl-COO— group), and
Y representing a leaving group, preferably a halogen group (such as Cl, Br or I, preferably I) or an ammonium group, thus yielding a monosubstituted imidazole group of formula (IX)

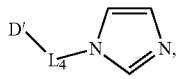
(IX)

with $L_4$ and D' as defined above;
  b) a second nucleophilic substitution of the monosubstituted imidazole group of formula (VI), with a compound of formula $R_5$—Y', with
    Y' being a leaving group, preferably a halogen group such as Cl, Br or I, preferably I or Br, and
    $R_5$ representing a $C_1$-$C_6$ alkyl group or a group of formula $CH_2$=C(R)-$L_3$ with R and $L_3$ as defined in formula (I),
thus yielding an intermediate of formula (X)

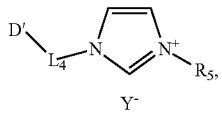
(X)

D', $L_4$ and $R_5$ as defined above,
  c) subjecting the intermediate of formula (X) to a diazonium aryl coupling, in particular with a diazonium anthraquinone of formula (XI)

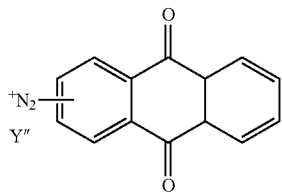
(XI)

with Y''' representing a halogen anion, in particular $Cl^-$, $Br^-$ or $I^-$, preferably $Br^-$,
to yield an imidazolium based molecule, and
  d) optionally an ion exchange reaction in order to exchange the anion of the ionic liquid for a $Z^-$ anion as defined in formula (I), preferably a TFSI anion.

Alternatively, they are prepared thanks to a process comprising at least:
  a) a first nucleophilic substitution of imidazole with a compound of formula $R_5$—Y', with
    Y' being a leaving group, preferably a halogen group (such as Cl, Br or I, preferably I or Br) or a ammonium group, and
    $R_5$ representing a $C_1$-$C_6$ alkyl group or a group of formula $CH_2$=C(R)-$L_3$ with R and $L_3$ as defined in formula (I),
thus yielding a monosubstituted imidazole group of formula (XII)

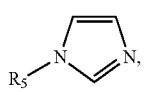
(XII)

with $R_5$ as defined above;
  b) a second nucleophilic substitution of the monosubstituted imidazole group of formula (VII) with a compound of formula D-$L_4$-Y, with
    D representing a metallocene oxidizable group,
    $L_4$ representing a $C_1$-$C_6$ alkyl group, a CONH—($C_1$-$C_6$)alkyl group, a ($C_1$-$C_6$)alkyl-CONH— group, a COO—($C_1$-$C_6$)alkyl group, or a ($C_1$-$C_6$)alkyl-COO— group (preferably, $L_1$ represents a $C_1$-$C_2$ alkyl group, a CONH—($C_1$-$C_2$)alkyl group, a ($C_1$-$C_2$)alkyl-CONH— group, a COO—($C_1$-$C_2$)alkyl group, or a ($C_1$-$C_2$)alkyl-COO— group), and
    Y representing a leaving group, preferably a halogen group, such as Cl, Br or I, preferably I,
  thus yielding an intermediate of formula (X) as defined above, and
  c) subjecting the intermediate of formula (X) to a diazonium aryl coupling, in particular with a diazonium anthraquinone of formula (XI) as defined above,
to yield an imidazolium based molecule, and
  d) optionally an ion exchange reaction in order to exchange the anion of the ionic liquid for a $Z^-$ anion as defined in formula (I), preferably a TFSI anion.

Similar processes using a tertiary amine instead of an imidazole may be used to prepare the compounds of the invention containing a quaternary ammonium moiety, under conditions known to the person skilled in the art.

Uses of the Electroactive Ionic Liquids or Polymeric Ionic Liquids of the Invention The electroactive ionic liquids or polymeric ionic liquids of the invention may be used in a variety of technical fields.

In particular, the electroactive ionic liquids or polymeric ionic liquids may be used as lubricants.

The electroactive ionic liquids or polymeric ionic liquids of the invention may also be used for functionalizing substrates, in particular through covalent grafting of the electroactive ionic liquids or polymeric ionic liquids of the invention on the surface of said substrate, thus providing multifunctional materials with a controlled architecture.

The electroactive ionic liquids or polymeric ionic liquids of the invention (immobilized or not) may be used:
  in energy storage, in particular in mobile devices (mobile phones, laptops, smart textiles;
  supercapacitors/organic batteries hybrid systems.

In a particular embodiment, the electroactive ionic liquids or polymeric ionic liquids are electrochromic. In this embodiment, the substrate is preferably transparent. This gives rise to what is usually referred to as "smart materials", and allows providing integrated systems combining electrochromic properties with charge storage abilities. In particular, in the field of optoelectronic, glass grafted with the electroactive ionic liquids of the invention thus qualify as "smart glass", which may darken when light exceeds a predetermined value of brightness (through programmed electrical impulse associated with a brightness detector), or allow displaying information, or be used as mirrors. In the field of energy storage (i.e. the substrate is a current collector of an electrode), using transparent electrodes, enables monitoring the state of charge of the organic battery.

Surface-Modified Substrates

Therefore, the present invention further relates to a surface-modified substrate, modified with an electroactive ionic liquid of the invention, i.e. including imidazolium/quaternary ammonium-based molecules, each of said imidazolium/quaternary ammonium-based molecules comprising at least:
- one imidazolium/quaternary ammonium moiety associated with one negatively-charged counter ion, and
- one metallocene oxidizable group and/or one reducible group;

wherein the negatively-charged counter-ion, the imidazolium/quaternary ammonium moiety, the metallocene oxidizable group, the reducible group, and the imidazolium/quaternary ammonium based molecule are as defined above.

In a preferred embodiment, the electro-active ionic liquid is covalently grafted on the surface of the substrate.

In a particular embodiment, the surface-modified substrate is grafted with ionic liquids of the invention, such that its surface comprises imidazolium/quaternary ammonium moieties (with a negatively charged counter-ion), metallocene oxidizable groups and reducible groups as defined above. In this embodiment, the metallocene oxidizable groups and the reducible groups may be found either in the same imidazolium/quaternary ammonium-based molecule or in different imidazolium/quaternary ammonium-based molecules. In other words, in this embodiment, the surface-modified substrate is grafted with either:

a combination of:
1) an electro-active ionic liquid comprising imidazolium/quaternary ammonium-based molecules, each of said imidazolium/quaternary ammonium-based molecule comprising at least:
   - one imidazolium/quaternary ammonium moiety associated with one negatively-charged counter ion, and
   - one metallocene oxidizable group, and
2) an electro-active ionic liquid comprising imidazolium/quaternary ammonium-based molecules, each of said imidazolium/quaternary ammonium-based molecule comprising at least:
   - one imidazolium/quaternary ammonium moiety associated with one negatively-charged counter ion, and
   - one reducible group, or an electro-active ionic liquid comprising imidazolium/quaternary ammonium-based molecules, each of said imidazolium/quaternary ammonium-based molecule comprising at least: 1) one imidazolium/quaternary ammonium moiety associated with one negatively-charged counter ion, 2) one metallocene oxidizable group and 3) one reducible group.

In this embodiment, the substrate is preferably a current collector.

The surface-modified substrate of the invention is either grafted with a monolayer of the ionic liquids of the invention (when it includes a "small imidazolium/quaternary ammonium-based molecule"), or with a polymeric ionic liquid of the invention.

In a preferred embodiment, the surface-modified substrate is modified with an imidazolium/quaternary ammonium-based polymeric ionic liquid comprising imidazolium/quaternary ammonium-based repeated units as defined above. Each of said imidazolium/quaternary ammonium-based units is an imidazolium/quaternary ammonium-based molecule as defined above, i.e. comprises at least:
- one imidazolium/quaternary ammonium moiety associated with one negatively charged counter-ion, and
- one metallocene oxidizable group and/or one reducible group.

In this embodiment, the negatively-charged counter-ions, the imidazolium/quaternary ammonium moiety, the metallocene oxidizable and the reducible group are as defined above. Preferably, each of said imidazolium/quaternary ammonium-based units comprises at least one imidazolium/quaternary ammonium moiety associated with one negatively charged counter-ion, one metallocene oxidizable group and one reducible group.

In this particular embodiment, the polymeric electroactive ionic liquid is preferably the product of the radical polymerization of imidazolium/quaternary ammonium-based monomers as defined above. Each of said imidazolium/quaternary ammonium-based monomer is an imidazolium/quaternary ammonium-based molecule as defined above preferably further comprising a carbon-carbon unsaturated bond suitable for polymerization, such as a vinyl group or an acrylic group, i.e. comprises at least:
- one imidazolium/quaternary ammonium moiety associated with one negatively-charged counter-ion, and
- one metallocene oxidizable group and/or one reducible group, and
- preferably a carbon-carbon unsaturated bond suitable for polymerization, such as a vinyl group or an acrylic group.

In this particular embodiment, the polymeric ionic liquid is preferably the product of the radical polymerization of monomeric ionic liquids, each monomeric ionic liquids comprising at least one imidazolium/quaternary ammonium moiety associated with one negatively charged counter-ion, one metallocene oxidizable group and one reducible group, and a carbon-carbon unsaturated bond suitable for polymerization, such as a vinyl group or an acrylic group. Advantageously, it is the product of the radical polymerization of monomeric ionic liquids of formula (Ib) as defined above.

The imidazolium/quaternary ammonium-based polymeric ionic liquid may be:

a copolymer, in particular a block-copolymer of:
1) imidazolium/quaternary ammonium-based repeated units, each of said imidazolium/quaternary ammonium-based repeated units comprising: an imidazolium/quaternary ammonium moiety associated with a negatively charged counter ion and a metallocene oxidizable group (preferably ferrocene group) and
2) imidazolium/quaternary ammonium-based repeated units, each of said imidazolium/quaternary ammonium-based repeated units comprising: an imidazolium/quaternary ammonium moiety associated with a negatively charged counter ion and a reducible group, preferably an anthraquinone derivative of formula (IV) as defined above, with $R_1$ advantageously representing a hydrogen atom;

or a homopolymer of imidazolium/quaternary ammonium-based repeated units, each of said imidazolium/quaternary ammonium-based repeated units comprising: an imidazolium/quaternary ammonium moiety associated with a negatively charged counter ion, a metallocene oxidizable group (preferably ferrocene group) and a reducible group (preferably an anthraquinone derivative of formula (IV) as defined above, with $R_1$ advantageously representing a hydrogen atom).

Preferably, the imidazolium/quaternary ammonium-based polymeric ionic liquid is a homopolymer of imidazolium/quaternary ammonium-based repeated units, each of said imidazolium/quaternary ammonium-based repeated units comprising: an imidazolium/quaternary ammonium moiety associated with a negatively charged counter ion, a metallocene oxidizable group (preferably ferrocene group) and a reducible group (preferably an anthraquinone derivative of formula (IV) as defined above, with $R_1$ advantageously representing a hydrogen atom).

When grafted on the surface of a substrate, the polymeric ionic liquids of the invention display a controlled architecture, which can be described as "brush-shaped". This particular structure results in particular from the regularly interspaced imidazolium/quaternary ammonium moieties of the repeated units.

This particular structure is particularly advantageous as it is highly ordered, and facilitates the electron exchanges. Stimuli-responsive polymers brushes are also particularly interesting materials that have been used for several applications including electrochemical devices, sensors, microfluidic devices and surface wettability.

Therefore, in a particular embodiment, the surface-modified substrate of the invention is grafted with a homopolymer of imidazolium/quaternary ammonium-based repeated units, each of said imidazolium/quaternary ammonium-based repeated units comprising a TFSI ion and an imidazolium/quaternary ammonium based cation, said cation comprising an imidazolium moiety, a ferrocene group and an anthraquinone derivative of formula (IV) with $R_1$ representing a hydrogen atom.

This surface-modified substrate with a polymeric ionic liquid containing imidazolium-based repeated units may be represented as follows:

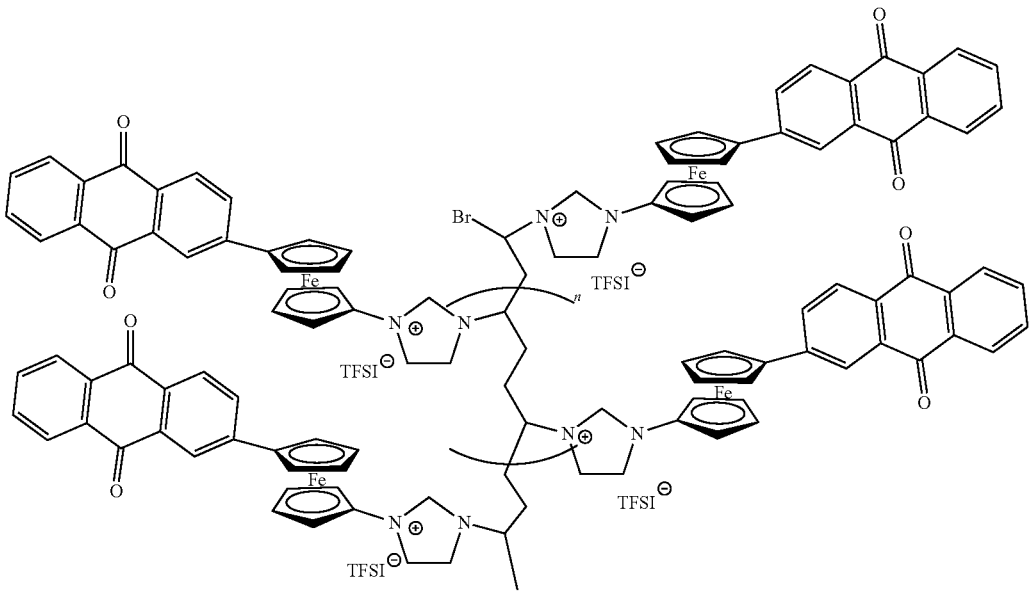

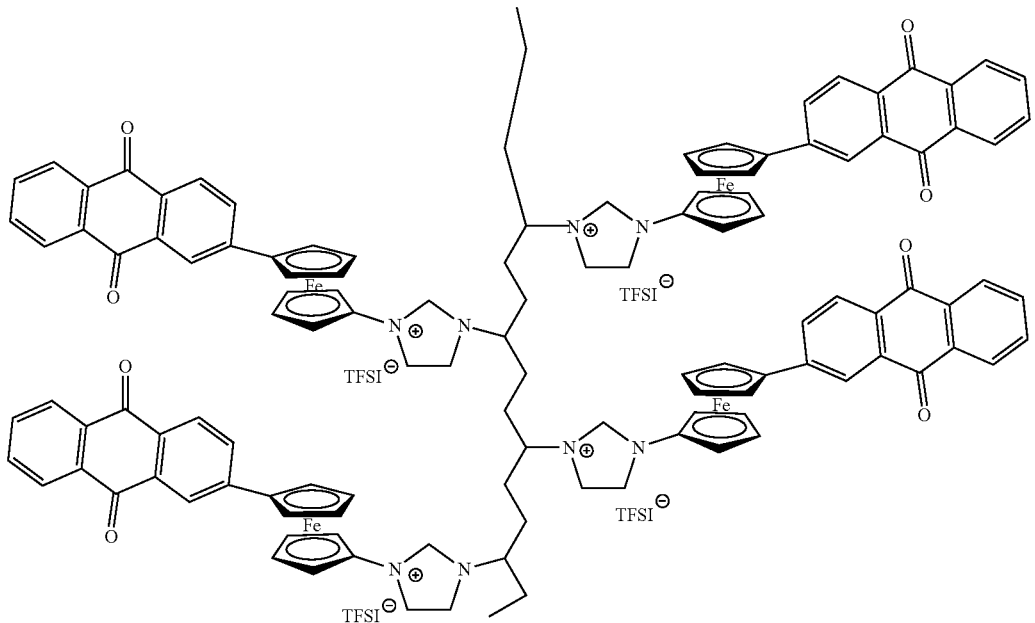

-continued

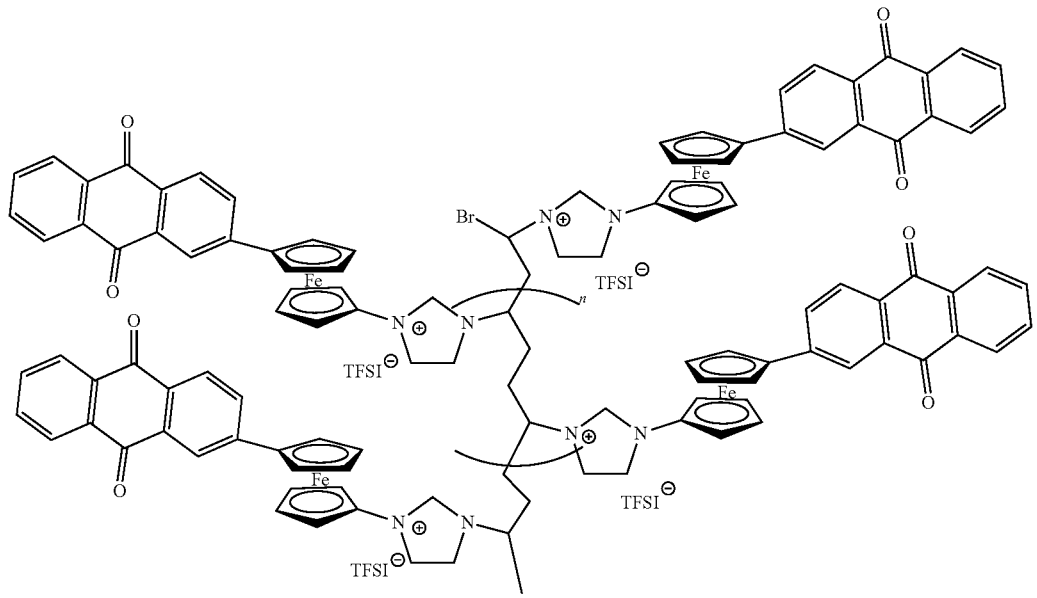

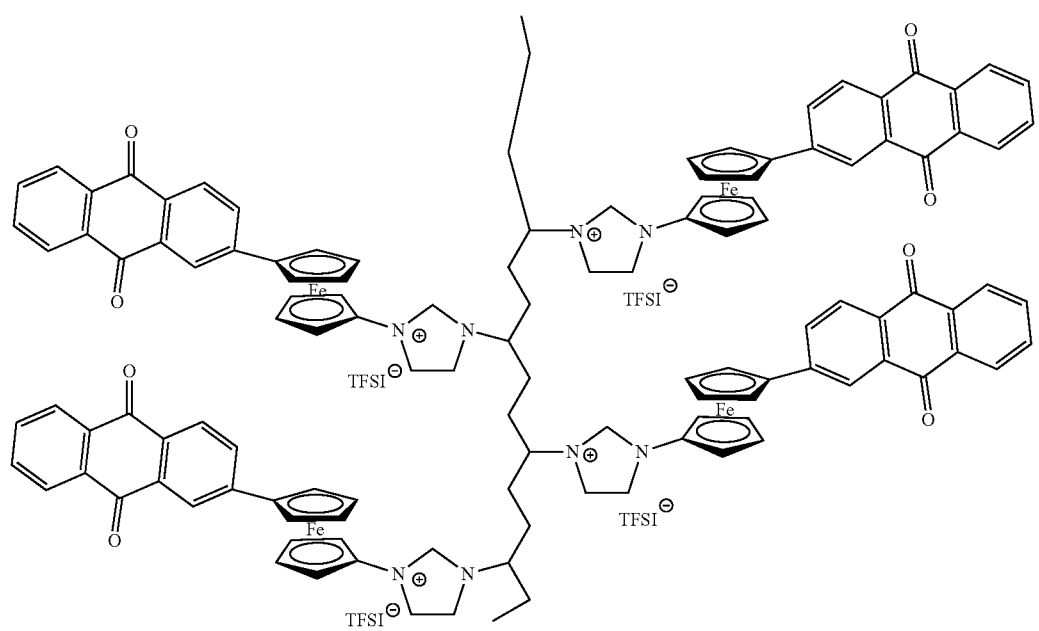

The substrate of the invention may be for instance a glass substrate, or a current collector, such as a current collector of an electrode. When the substrate is an electrode, it is preferably a carbon electrode, more preferably a flexible carbon electrode, advantageously transparent, such as a graphene electrode.

The substrate can be planar or have a 3D structure such as nickel foam, graphene foam or CNT-graphene composites.

The substrate can be modified via different methods enabling to immobilize the polymeric ionic liquid at its surface such as the covalent grafting or the deposition of the polymer.

The covalent grafting can be achieved through electrochemically assisted polymerization, SI-ATRP, graft-fast method or SEEP.

The deposition can be achieved through electrospinning, coating, screen printing, electrospray deposition.

Energy Storage Device

The present invention further concerns an energy storage device comprising at least two surface-modified electrodes of the invention, which are as described above in connection with the surface-modified substrates of the invention.

In the energy storage device of the invention, the surface-modified electrodes are identical or different.

In a first embodiment, the electrodes are different. Preferably, in this embodiment, the first electrode comprises imidazolium/quaternary ammonium-based molecules with at least:
- one imidazolium/quaternary ammonium moiety associated with one negatively charged counter-ion, and
- one metallocene oxidizable group, preferably a ferrocene group;

and the second electrode comprises imidazolium/quaternary ammonium-based molecules with at least:
- one imidazolium/quaternary ammonium moiety associated with one negatively charged counter-ion, and
- one reducible group, preferably an anthraquinone derivative of formula (IV) as defined above, with $R_1$ advantageously representing a hydrogen atom.

In a second embodiment, the electrodes are identical. Preferably, in this embodiment, the first and second electrode comprise imidazolium/quaternary ammonium-based molecules with at least:
- one imidazolium/quaternary ammonium moiety associated with one negatively charged counter-ion,
- one metallocene oxidizable group, preferably a ferrocene group, and
- one reducible group, preferably an anthraquinone derivative of formula (IV) as defined above, with $R_1$ advantageously representing a hydrogen atom.

As explained above, the surface-modified substrate of the invention is either grafted with a monolayer of the ionic liquids of the invention (when it includes a "small imidazolium/quaternary ammonium-based molecule"), or with a polymeric ionic liquid of the invention.

In the case of a monolayer the ionic liquid preferably comprises imidazolium/quaternary ammonium-based molecules not comprising polymerizable C=C double bonds.

In the case of a polymeric ionic liquid, the ionic liquid preferably comprises imidazolium/quaternary ammonium-based molecules comprising polymerizable C=C double bonds.

In the case of a polymeric ionic liquid, it is preferably a homopolymer of imidazolium/quaternary ammonium-based repeated units, each of said imidazolium/quaternary ammonium-based repeated units comprising: an imidazolium/quaternary ammonium moiety, a negatively charged counter ion, a metallocene oxidizable group (preferably ferrocene group) and a reducible group (preferably an anthraquinone derivative of formula (IV) as defined above, with $R_1$ advantageously representing a hydrogen atom).

In another particular embodiment, the energy-storage device of the invention comprises a surface-modified electrode grafted with a homopolymer of imidazolium/quaternary ammonium-based repeated units comprising a TFSI ion and an imidazolium/quaternary ammonium based cation, said cation comprising an imidazolium/quaternary ammonium moiety, a ferrocene group and an anthraquinone derivative of formula (IV) with $R_1$ representing a hydrogen atom.

This surface-modified electrode with a polymeric ionic liquid containing imidazolium-based repeated units may be represented as follows:

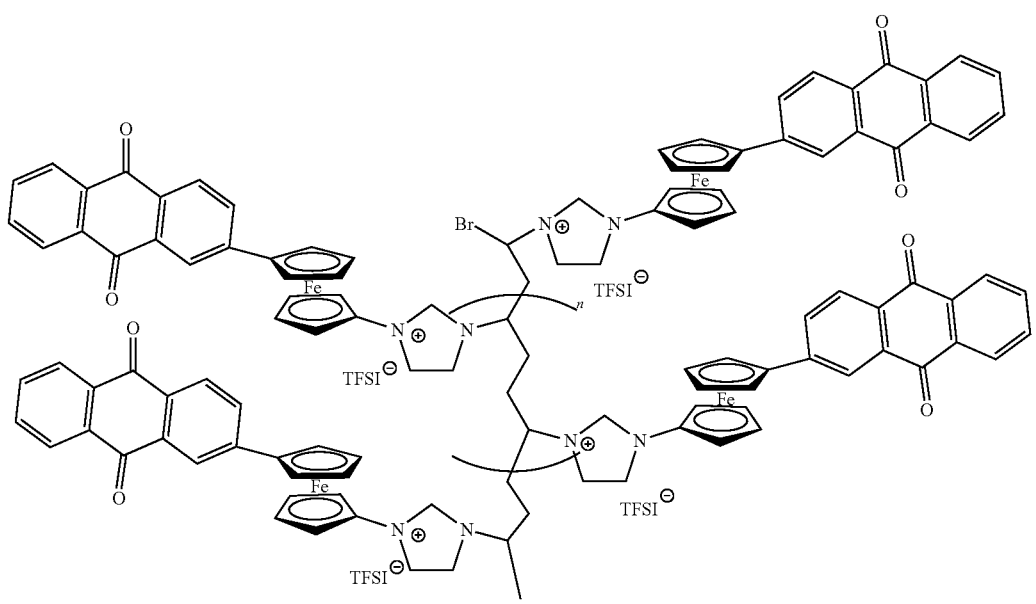

-continued
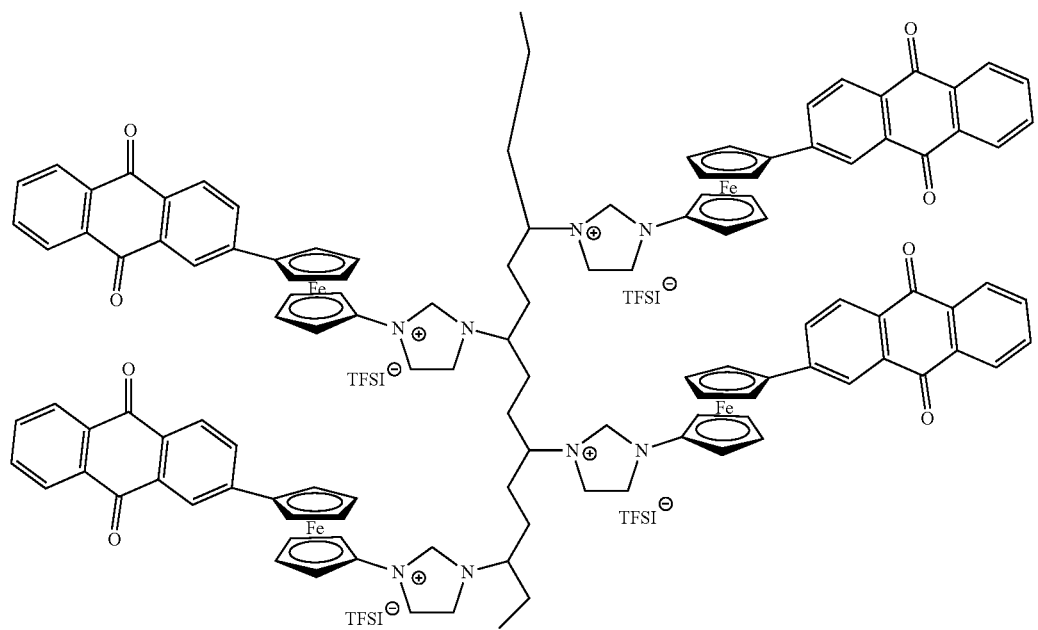
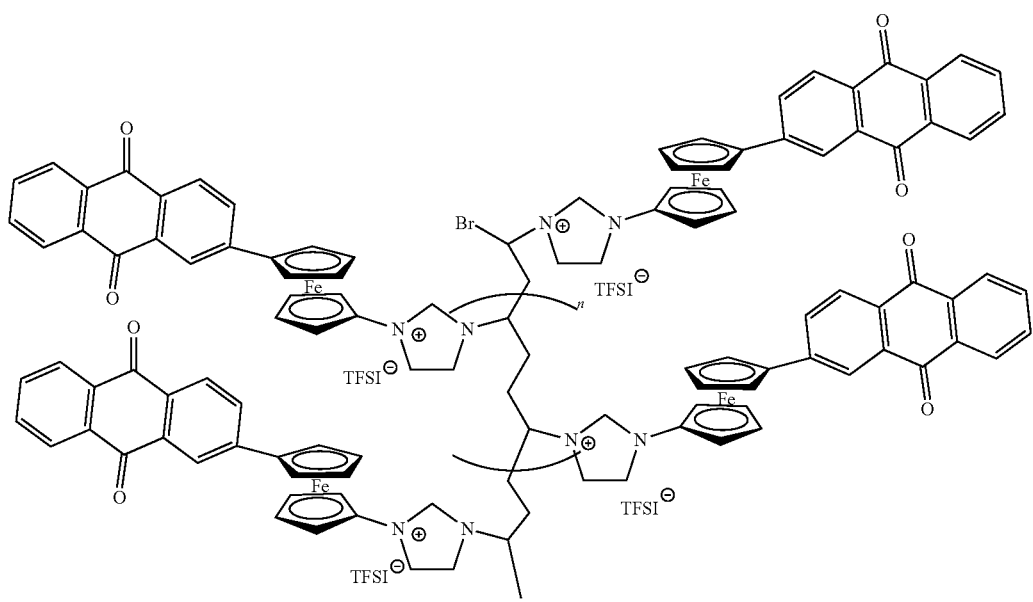

-continued

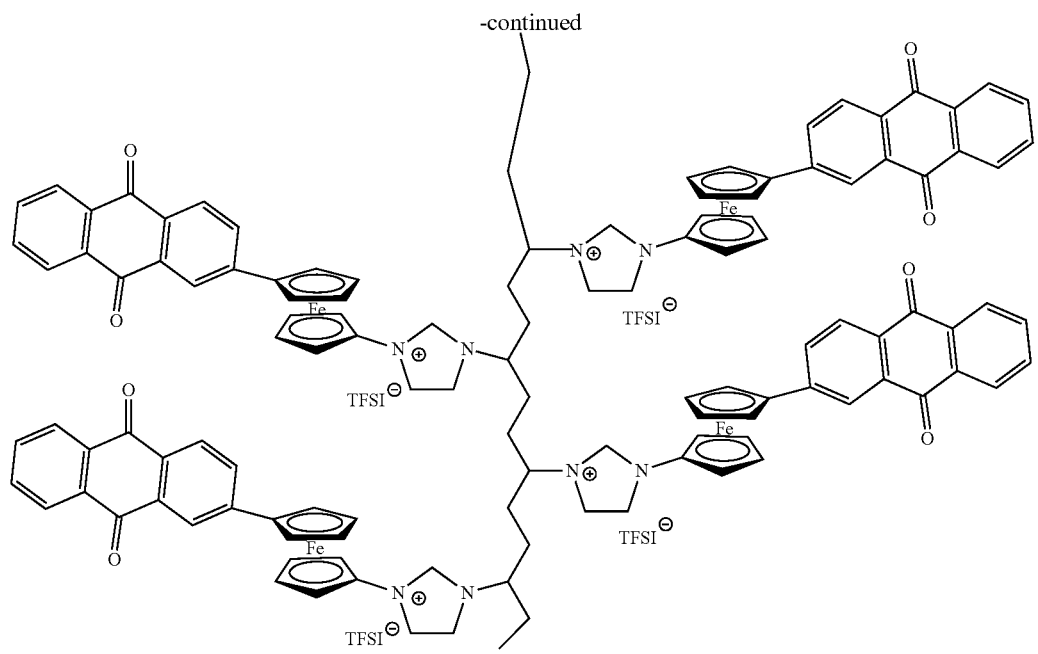

In the energy storage device of the invention, the electrodes may be planar, interdigitated and/or membraneless.

In the energy storage device of the invention, the electrodes are preferably carbon electrodes, more preferably a flexible carbon electrodes, advantageously transparent, such as graphene electrodes.

The energy storage device of the invention may be used as a supercapacitor or as a linear actuator.

The energy-storage device of the invention may advantageously be used with an electrolyte free of lithium ions. And yet, in this embodiment, the energy storage device of the invention is as efficient as a conventional lithium-ion battery.

Grafting Process

The present invention further concerns a process for grafting the surface of a substrate, in particular a current collector of an electrode, with an electro-active ionic liquid of the invention, i.e. including imidazolium/quaternary ammonium-based molecules, each of said imidazolium/quaternary ammonium-based molecule comprising at least:
  one imidazolium/quaternary ammonium moiety associated with one negatively-charged counter ion, and
  one metallocene oxidizable group and/or one reducible group;
wherein the negatively-charged counter-ion, the imidazolium/quaternary ammonium moiety, the metallocene oxidizable and the reducible group are as defined above.

The grafting process of the invention comprises:
  a) grafting an organic radical precursor on the surface of the electrode, such as a primary alkyl bromide or an aryl diazonium salt derivative,
  b) functionalizing the organic radical precursor through a radical reaction to covalently bond an electro-active ionic liquid including an imidazolium/quaternary ammonium based molecule as defined above,
thus leading to the surface-modified electrode of the invention.

Step b) may enable to graft a single layer of ionic liquids of the invention, or may be a polymerization step. In the latter case, the imidazolium/quaternary ammonium-based molecule of step b) is an imidazolium/quaternary ammonium-based monomer as defined above, and the ionic liquid grafted on the surface of the electrode is polymeric.

In a preferred embodiment, step b) includes polymerizing imidazolium/quaternary ammonium-based monomers as described above, i.e. comprising at least:
  one imidazolium/quaternary ammonium moiety associated with one negatively-charged counter-ion, and
  one metallocene oxidizable group and/or one reducible group, and
  preferably a carbon-carbon unsaturated bond suitable for polymerization, such as a vinyl group or an acrylic group,
using radical polymerization, such as surface-induced atom-transfer radical polymerization (SI-ATRP),
thus leading to a surface-modified electrode grafted with an imidazolium/quaternary ammonium-based polymeric ionic liquid. In this embodiment, the negatively-charged counter-ion, the imidazolium/quaternary ammonium moiety, the metallocene oxidizable and the reducible group are as defined above. The specific embodiments of the monomers described above In connection with surface-modified substrates grafted with polymeric ionic liquids equally apply here.

Depending on the structure of the monomer and on the order in which they are added in step b), the obtained polymer is either a copolymer (preferably a block-copolymer) or a homopolymer.

Advantageously, the grafting process of the invention further comprises a step c) of washing the surface of the surface-modified obtained in step b).

In a particular embodiment,
  the radical precursor of step a) is an aminoalkyl bromide, such as 2-aminoethyl bromide, and the radical reaction of step b) is a surface-induced atom-transfer radical polymerization (SI-ATRP), or
  the radical precursor of step a) is an aryl diazonium salt derivative, preferably an alkylaryldiazonium salt, and the radical reaction of step b) is preferably a surface electro-Initiated emulsion polymerization (SEEP).

In this embodiment, the process yields a grafted polymeric ionic liquid. Preferably, the ionic liquid of step b) is an imidazolium/quaternary ammonium-based monomer selected from:
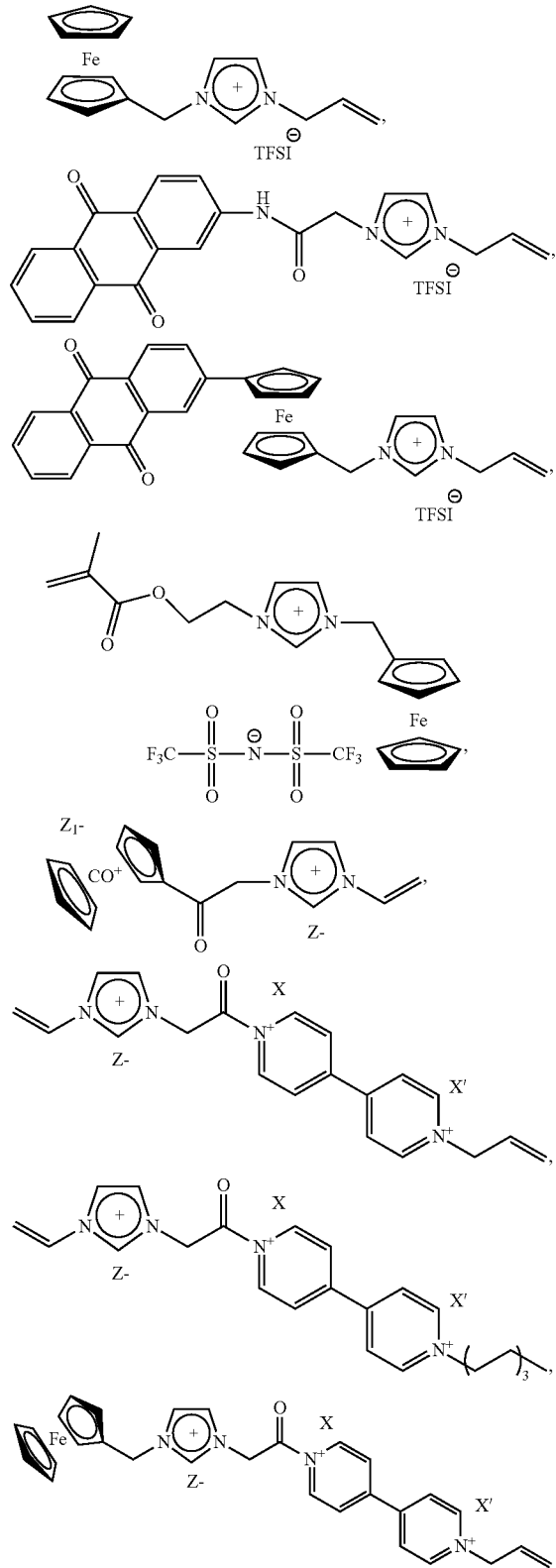
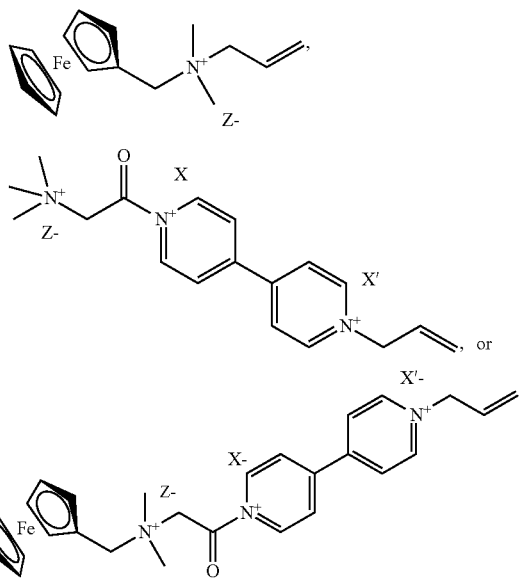
with $Z^-$, $X^-$ and $X'^-$ as defined above, preferably representing a TFSI ion.
In another example, the ionic liquids of step b) are:
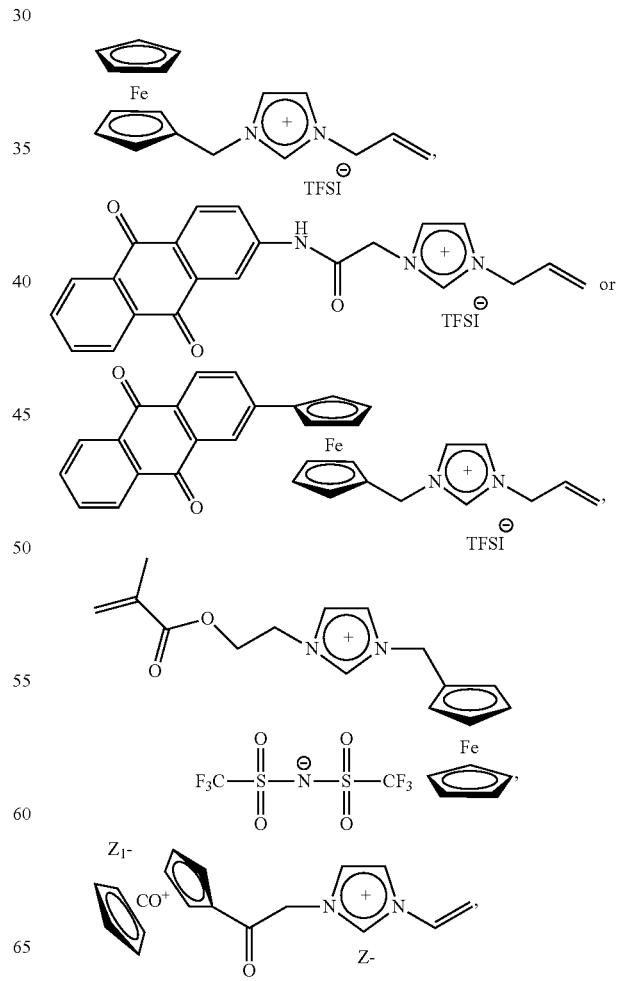

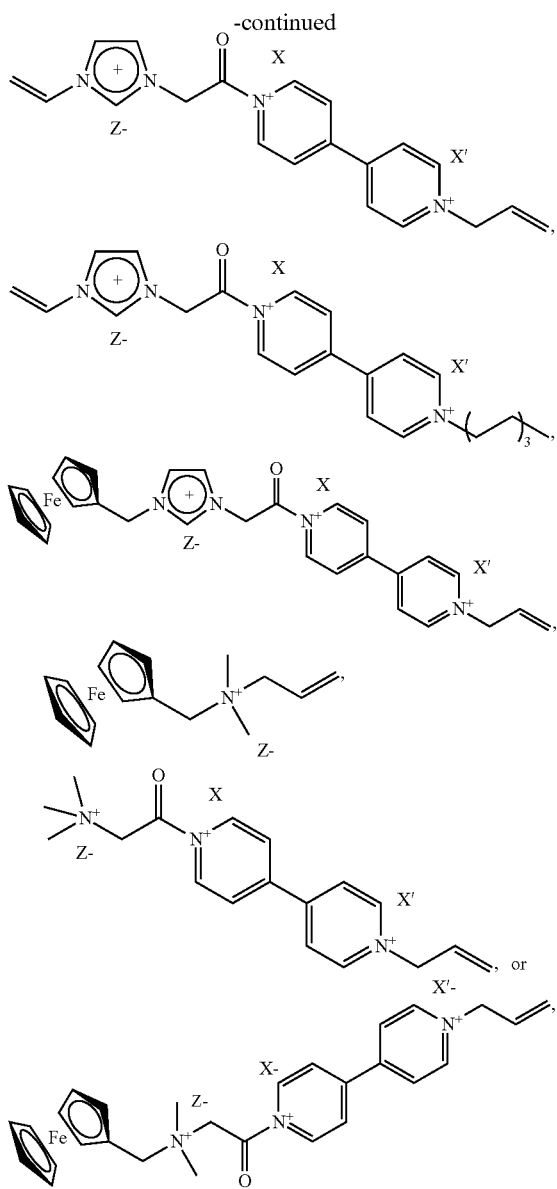

with Z⁻, X⁻ and X'⁻ as defined above, preferably representing a TFSI ion;
the radical precursor of step a) is an aryl diazonium salt derivative, preferably an alkylaryldiazonium salt,
the radical reaction of step b) is electrografting, and
step a) and b) occur concomitantly.

BRIEF DESCRIPTION OF THE DRAWINGS

In the following, CV stands for Cyclic voltammetry, and GC stands for glassy carbon, Fc stands for ferrocene and AQ stands for anthraquinone.

EXAMPLES

The present invention will be illustrated through the following examples, which are not to be construed as limiting the scope of the invention in any way.

Electrochemical Characterization:

Cyclic voltammetry (CV) Is an electrochemical technique which is used to study the redox properties of chemical electro-active compounds at the interface of electrode in a solution. This technique is based on sweeping a linear and controlled potential at a given scan rate for a stationary or rotating electrodes. The obtained signal with this technique is the faradic current, i.e. the current due to the oxydoreduction of electro-active species in solution or immobilized at the surface of electrode.

Figure 10:
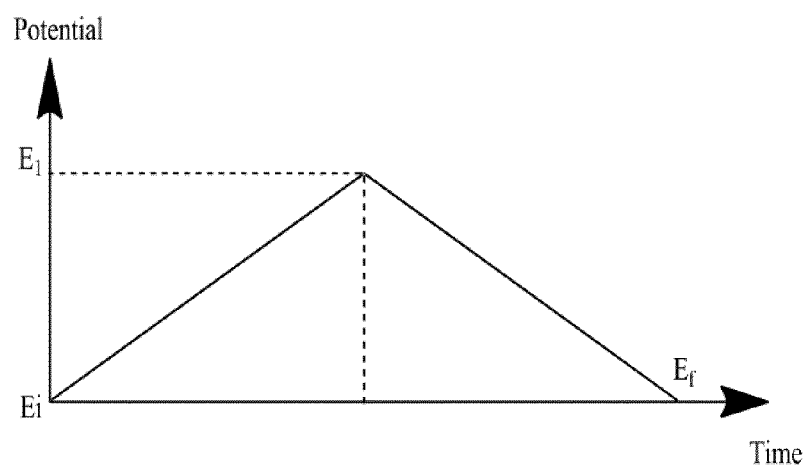
FIG. 10: Plot reporting the dependence between the measured current and the applied potential E=$E_i$+vt, with: E=Applied potential at the instant t; $E_i$=Initial potential; $E_1$=Inversion potential; $E_f$=Final potential; v=scan rate; t: time.
Figure 11:
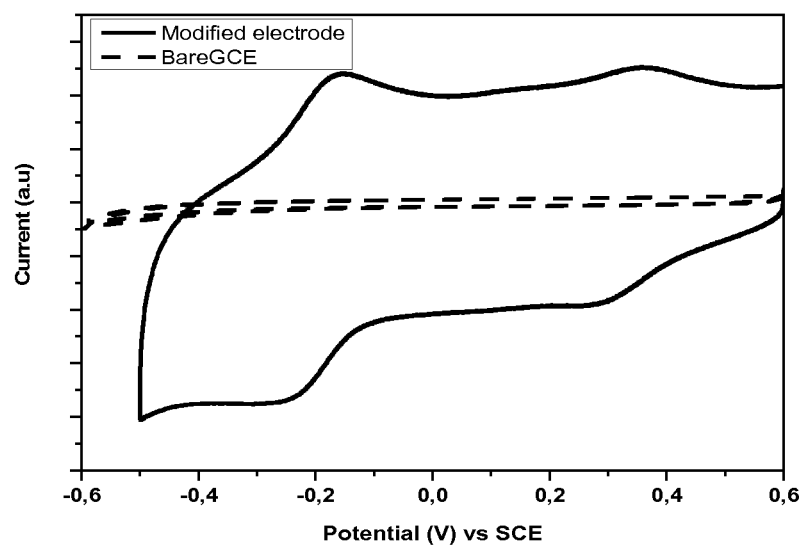
FIG. 11: Cyclic voltammetry response of carbon electrodes in aqueous solution containing 0.1 M of HTFSI. Bare electrode (dash line), modified electrode (solid line)—experiment corresponding to the 7th line of table 1 of example 2.

A three electrodes system is necessary for using this technique, a reference electrode, a working electrode and an auxiliary electrode. Supporting electrolyte is always added into the solution to keep a sufficient conductivity. The potential is measured with the working electrode and the reference electrode while the current is measured with the working electrode and the auxiliary electrode. The data at each instant are reported in order to plot the dependence between the measured current and the applied potential (see FIG. 10).

Example 1: Imidazolium-Based Ionic Liquids and Polymeric Ionic Liquid of the Invention Containing a Ferrocene Group as the Oxidizable Group Chemical.

Pentamethyl-diethylenetriamine (PMDETA), CuCl, CuCl$_2$, LiTFSI, 2-bromoethyl methacrylate, imidazol, ferrocenylmethyl-trimethylammonium iodide, bromoethane, 4-methoxyphenol, tetrabutylammonium tetrafluoroborate from Aldrich were used as received. Solvent such as N,N-dimethylformamide, acetonitrile, dichloromethane were purchased from Aldrich. Ultrapure water (Millipore, resistivity 18.2 MΩ·cm) was obtained in the laboratory.

Synthesis of Ionic Liquid and Polymeric Ionic Liquid.

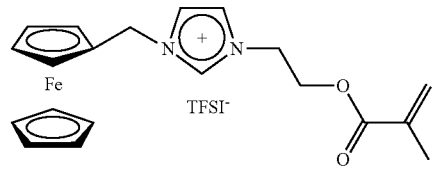

1-Ethyl-2,3-dimethylimidazolium Bis(trifluoromethane)sulfonimide, EdMI-TFSI, ionic liquid was prepared following the previously published procedures (Park et al. *J. Org. Chem.* 2001, 66, 8395-8401). The synthesized RTILs were dried under vacuum pumping overnight and the amount of residual water was measured with Karl Fischer titration (Karl Fischer 652 Metrohm) and found to be below 50 ppm.

For the synthesis of monomer ionic liquid, the 2-bromoethyl methacrylate was first synthesized according to the previously published procedure. Next to that, N-(ferrocenylmethyl) imidazole was synthesized by adding ferrocenylmethyltrimethylammonium iodide (52 mM) and imidazole (64 mM) in dimethylformamide (according to the procedure of Forgie et al. *Phys. Chem. Chem. Phys.* 2013, 15, 7713-7721).

In a second step, 2-Bromoethyl methacrylate (0.01 M) was mixed with N-(ferrocenylmethyl) imidazole (0.02 M) in the presence of inhibitor 4-methoxyphenol in 20 ml acetonitrile. The mixture was stirred at 40° C. for 24 h under N$_2$ atmosphere, following that the mixture is diluted in CH$_2$Cl$_2$ and re-precipitated in diethyl ether in an ice bath and then filtered through a silica gel column, leading to the generation of ionic liquid based monomer. Finally, anion exchange reaction was performed by adding to the 3-(2-methacryloyloxy ethyl)-1-(N-(ferrocenylmethyl) imidazolium bromide (0.01 M) lithium bis(trifluoromethylsulfonyl)imide LiTFSI (0.012 M) in deionized water. The ionic liquid monomer was washed with water then mixed with dichloromethane and charcoal. This solution was purified through aluminium oxide layer, and then dried over MgSO$_4$. After that, the trace of water was removed by vacuum pump overnight to afford 3-(2-methacryloyloxy ethyl)-1-(N-(ferrocenylmethyl) imidazolium bis(trifluoromethylsulfonyl)imide, as a brown viscous liquid. $^1$H NMR (400 MHz, DMSO) δ: 1.90 (s, 3H), 3.71 (t, J=5.6 Hz, 2H), 4.16 (t, J=2.0 Hz, 2H), 4.19 (s, 5H), 4.32 (t, J=2.0 Hz, 2H), 4.44 (t, J=5.6 Hz, 2H), 4.93 (s, 2H), 5.74 (t, J=1.6 Hz, 1H), 6.08 (s, 1H), 6.92 (s, 1H), 7.22 (s, 1H), 7.82 (s, 1H). $^{19}$F NMR (DMSO): 78.7 (s, 6F). More detail about the synthesis are reported in the Supporting Information.

Immobilization of Initiator Layer.

Bromide-terminated substrates were generated from the electrochemical oxidative grafting of 2-bromoethylamine onto glassy carbon (GC), Indium Tin Oxide (ITO), or on Au electrodes. The grafting was performed by chronoamperometry at potential 1.2 V vs SCE during 200 s. After the electrochemical modification the substrates were rinsed and sonication in water during 10 min.

SI-ATRP Procedure.

The procedure for polymerization of 3-(2-methacryloyloxy ethyl)-1-(N-(ferrocenylmethyl) imidazolium is as fellow. A mixture of 2 mM of the monomer [MAEImMFc][TFSI] and ligand pentamethyl-diethylenetriamine, PMDETA, (1.2 μL) in solvent ionic liquid [EMIm][TFSI]

was added to a dried Schenk flask. Next, the catalyst, Cu$^I$Cl (4 μM), and the deactivator, Cu$^{II}$Cl$_2$ (1.4 μM), were introduced. The initiator-modified electrodes were immersed into the reaction mixture under argon flow. For the SI-ATRP, different temperatures reactions were used, 30, 40, 50, 60 and 70° C.

Surface Analyses.

XPS measurements on generated polymer redox ionic liquid were performed using a Thermo VG Scientific ESCALAB 250 system fitted with a micro-focused, monochromatic Al Kα (hv=1486.6 eV) 200 W X-ray source. For XPS investigations the polymers were supported on indium tin oxide (ITO) substrate, and the electrodes are systematically rinsed and then sonicated during 10 min to remove the weakly adsorbed molecules.

The morphology and the thickness of the poly(FcIL) were investigated using AFM experiments in tapping mode were recorded at room temperature with a Molecular Imaging PicoPlus. The thickness of the generated polymer layers onto Au substrate was determined by ellipsometry on a SENTECH SE 400adv ellipsometer.

Electrochemical Measurements.

Three-electrode cell was used for the electrochemical measurements. Platinum wire and saturated calomel electrode, SCE, were used as auxiliary electrode and reference electrode, respectively. The electrochemical measurements were recorded using a CHI 660C potentiostat (CH Instruments, made in TX, USA).

Results and Discussion

The SI-ATRP process for the elaboration of polymer brushes onto electrode surface is based on the immobilization of thin initiator layer. The first step is to carry out an electrochemical oxidation of 2-bromoethylamine onto electrode surface. This process yielded a bromide terminated layer strongly attached onto the electrode. Following that, the attached initiator layer was immersed in ionic liquid, [EMIm][TFSI], containing the redox ionic liquid monomer, [MAEImMFc][TFSI], and all the necessary reagent for the SI-ATRP as presented in the experimental section.

The first SI-ATRP experiment was performed onto ITO substrate at 50° C. using 30 min polymerization time. To confirm the successful growth of the polymer redox ionic liquid, chemical surface composition was analyzed by X-ray photoelectron spectroscopy (XPS), and the obtained results are summarized in FIG. 1.

Figure 1:
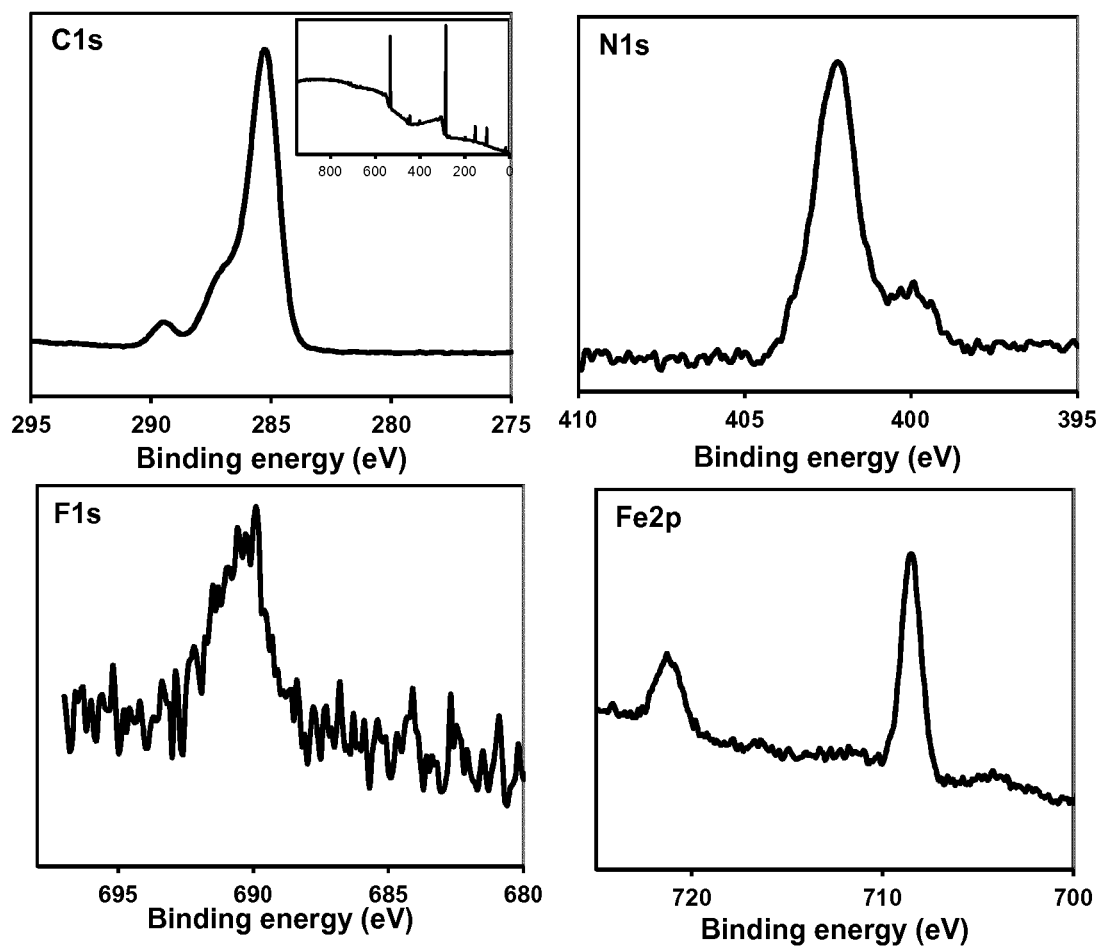
FIG. 1. XPS high resolution spectra for C(1s), N(1s), Fe(2p) and F(1s) of poly(FcIL) deposited on ITO surface in example 1. Inset XPS survey scan.

The inset in FIG. 1 displays the survey spectrum of the polymer modified ITO electrode which shows mainly the contribution of $C_{1s}$ and $O_{1s}$, as well as $N_{1s}$ signals, in agreement with the element composition of the redox polymer ionic liquid. Small signals corresponding to $In_{3d}$ and $Sn_{3d}$ are also visible. The intensity attenuation of the $In_{3d}$ (at 445 eV) and $Sn_{3d}$ (at 487 eV) XPS signals, compared to unmodified ITO, is an indication of the covering of ITO by the polymer. Deep analysis of the XPS measurements through the investigation of high-resolution element scans of $C_{1s}$, $N_{1s}$, $Fe_{2p}$, and $F_{1s}$ signals reveal several features. The C(1s) high resolution spectrum shows the presence of two peaks components at 287 and 285 eV attributable to amide bands and aromatic carbon, respectively. The peak observed at 289.4 eV is related to the contribution of C=O component. The N(1s) spectrum displays two defined components at 400 and 402.4 eV respectively attributed to nitrogen bonded to sulfonyl groups and to imine group in the imidazolic ring. Additional peak at 690 eV is observed and attributed to F(1s). Finally, the presence of two peaks at 708.6 and 721.1 eV, is a signature of the presence of Fe element in the form of ferrocene. The analysis of the FTIR spectrum shows peaks at 1740 and 1260 cm$^{-1}$ ascribed to C=O and C—O stretching vibrations modes In the ester group. The peak around 1148 cm$^{-1}$ was assigned to the C—N stretching of the imidazolium side chain, while the peaks at 1646 and around 1456 cm$^{-1}$ are attributed to the ring vibration of imidazolium. The small peaks located at 1410, 1103 and the sharp peak at 1066 cm$^{-1}$ are characteristic for the ferrocene group. On the high wavenumber zone, the peaks centered at 2925 and 2855 cm$^{-1}$ are ascribed to the asymmetric and symmetric stretching of C—H, respectively, in the polymer backbone, while the bands In the region of 3650 cm$^{-1}$ are due to the vibrations mode for TFSI anion. Overall, XPS and FTIR investigations confirm the immobilization of polymer ferrocene ionic liquid, poly(FcIL), and the presence of the TFSI anion.

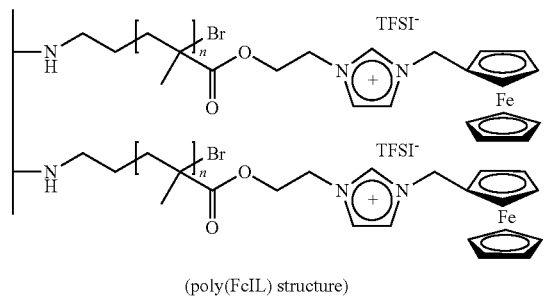

(poly(FcIL) structure)

Figure 2:
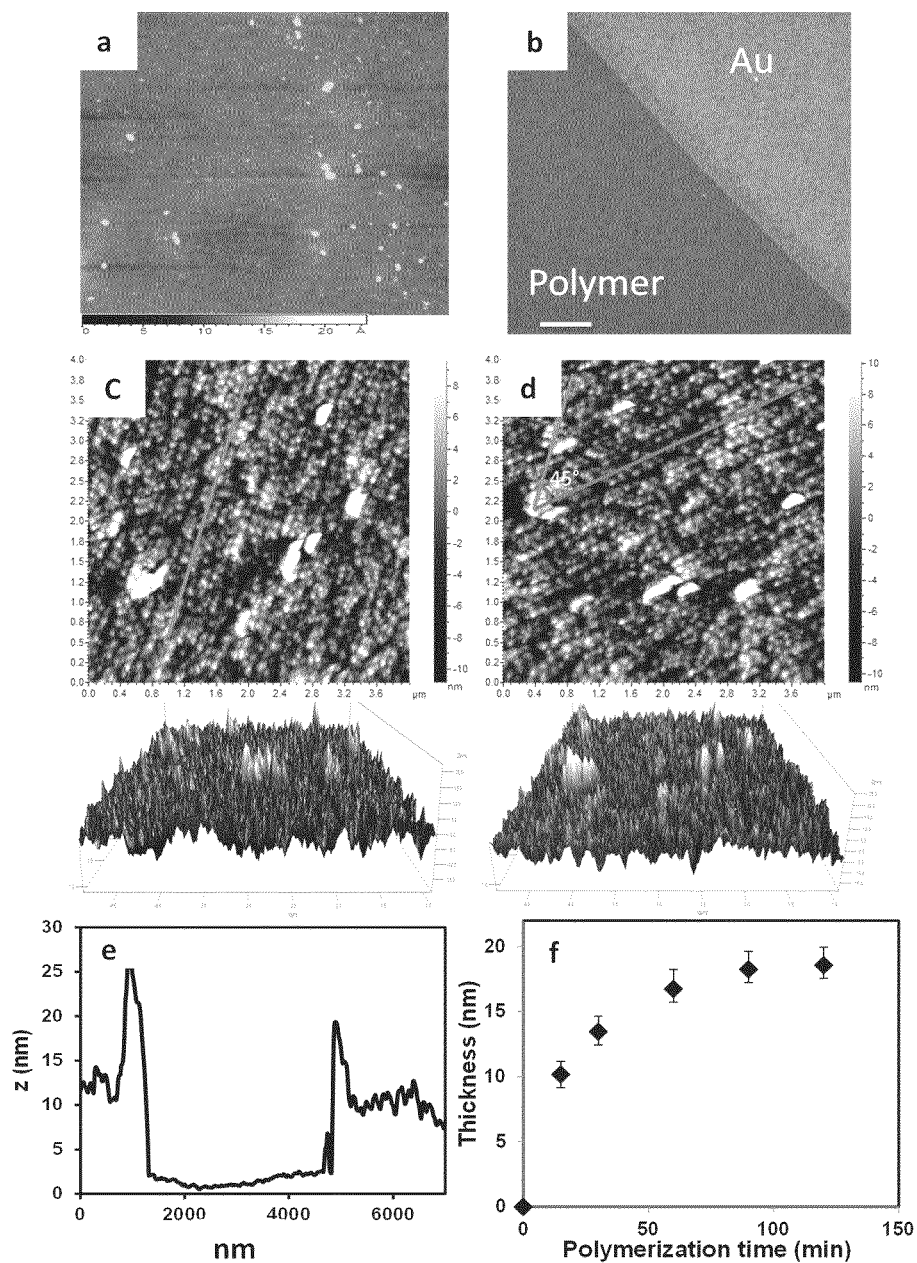
FIG. 2. (a) AFM topography image of Au modified with the initiator layer (b) SEM image of the poly(FcIL) growth on Au. Scale bare 1 µm (c) AFM topography and 3D AFM image representation of poly(FcIL) onto Au substrate, image size 4×4 µm². (d) AFM topography and 3D AFM image representation performed in the same area as (c) using scan angle of 45°. (e) Cross section after scratch AFM experiment. (f) Evolution of poly(FcIL) film thickness as function of polymerization time for the SI-ATRP.

Surfaces analyses of polymer modified electrode were complemented by AFM investigations and ellipsometry measurements as shown in FIG. 2.

FIG. 2a shows the topography image of the attached initiator layer onto gold surface. This image reveals homogeneous morphology, the average roughness is around 0.5 nm and the thickness is around 1.5 nm. The same morphology was observed on different area of the sample indicating the homogeneity of the layer. After the performance of the SI-ATRP polymerization the surface was characterized by SEM and AFM images. The SEM image clearly shows two distinct zone, the bright area which represents the unmodified Au and dark area corresponding to the attached poly (FcIL). FIGS. 2c and d illustrate a typical 2D and 3D AFM topographic scan of the polymer. The 2D image shows a morphological change when compared to unmodified substrate. The image, FIG. 2c, exhibits a grainy structure with an alignment of the grain on 1D direction (blue line) demonstrating a self-reorganization of the polymer based ionic liquid. To confirm this morphology, the same area was scanned using 45° scan angle as shown in FIG. 2d. As a consequence, the alignment of the grain is still visible (red line) but twisted by 45° compared to the initial image. This experiment confirms that the observed alignment is due to the self-organization of the deposited polymer and not to the tip imaging artefacts. The polymer units on the surface exhibit a brush-like structure as illustrated in the 3D representation (FIGS. 2c and 2d). These investigations suggest that the i-ATRP has given rise to a dense coverage of polymer brushes on the surface. FIG. 2e shows the cross section of the generated hole by scratch AFM experiment and an average thickness of 12 nm is measured.

One of the parameter that controls the polymer thickness in the SI-ATRP is the polymerization time reaction. The SI-ATRP was performed onto Au substrate using the same condition as described above but with different polymerization time reaction 15, 30, 60, 90 and 120 min. The thickness of the film was measured for each reaction time by ellipsometry and the obtained results are presented in FIG. 2f. The curve shows an initial increase of the polymer thickness as function of the polymerization time. After, 1 h polymerization time reaction the thickness reach a maximum value around 20 nm and cease to growth suggesting the limited access of monomer to surface. Similar tendency has been reported in the literature. The measured thicknesses by AFM were in perfect agreement with ellipsometry measurements. Compared to the measured thickness, in classical solvent, as function of the polymerization time, the polymerization rate in ionic liquid is higher than that observed in the classical solvents. This effect has been already reported and was attributed to the polarity of ILs. Despite this effect, the measured thickness of the poly(FcIL) Is in the same range as that reported for other poly(IL).

Figure 3:
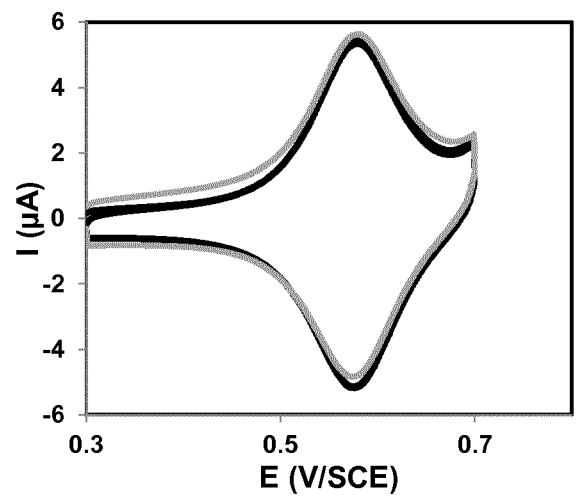
FIG. 3. CV characterization of modified electrode in acetonitrile solution containing 0.1 M $Bu_4NBF_4$ at scan rate 0.1 V·s⁻¹. The black curve represents the 1$^{st}$ cycle while the gray curve corresponds to the 20$^{th}$ cycle.

To obtain insights on the redox properties of the polymer, the electrochemical characterization of poly(FcIL) become straightforward as the attached polymer contain electroactive units, ferrocene, which could be easily characterized by cyclic voltammetry (CV). SI-ATRP was performed onto GC electrode at 50° C. using 60 min reaction time. FIG. 3 displays the electrochemical response of the poly(FcIL) deposited onto GC electrode In acetonitrile electrolytic solution.

The CV shows oxidation and reduction waves with standard potential at 0.57 V vs SCE, this redox signal is attributed to the electrochemical response of the $Fc^+/Fc$ redox couple. The peak-to-peak potential is almost 0 V confirming the attachment of the Fc species onto the electrode surface. The electrochemical response of Fc units enables the estimation of the surface coverage using the formula $\Gamma=Q/nFA$, where Q is the charge of the anodic peak, n is the number of the electrons for the oxidation of the attached Fc units, F the Faraday's constant and A represent the area of the electrode. The average value of the surface coverage was found to be around $4\times10^{-9}$ mol·cm$^{-2}$. Pyun and co-workers have investigated the polymerization by SI-ATRP of ferrocene functional polymer brushes and they demonstrate a linear correlation between the surface coverage and the molecular polymer weight of polyferrocenyl methacrylate deposited on electrode surface (see Kim et al. Langmuir 2010, 26, 2083-2092). Based on their results, the expected molecular weight of the polymer with a surface coverage of about $4\times10^{-9}$ mol·cm$^{-2}$ is 10,000 g/mol. Thus, assuming the applicability of this relation to our system, the average grafting densities of the poly(FcIL) brushes could be estimated in the range of 0.3 to 0.8 chains/nm$^2$. FIG. 3 demonstrates that after repetitive CV the electrochemical signal remains unchanged (gray curve) suggesting the stability of the attached ferrocene. This finding leads to conduct further electrochemical studies based on the variation of the $Fc^+/Fc$ peaks current.

Figure 4:
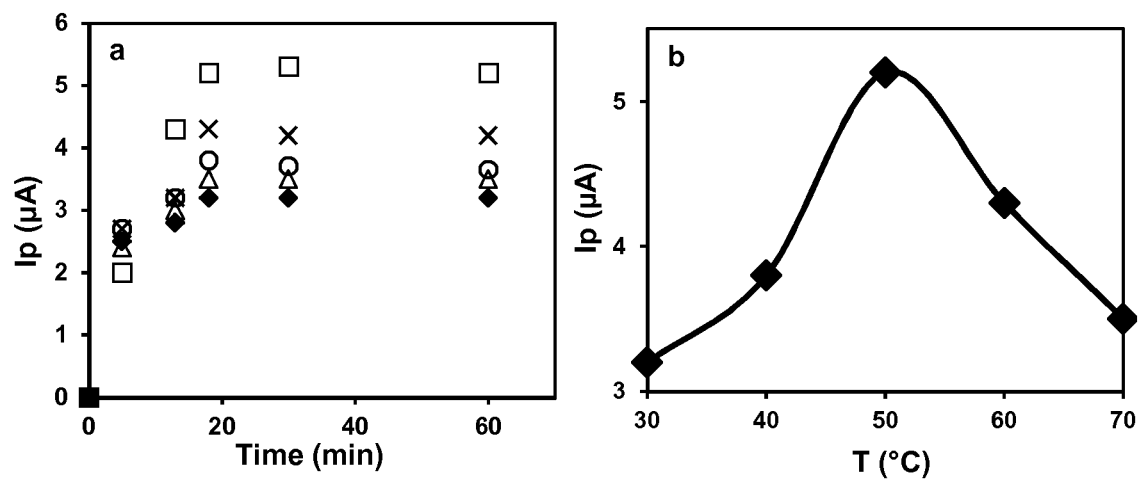
FIG. 4. a) Dependency of peak current on reaction time at different reaction temperature (♦) 30 (○) 40 (□) 50 (x) 60 (Δ) 70° C. b) Plot of peak current variation as function of reaction temperature for 30 min SI-ATRP reaction time.

In the following, the SI-ATRP in ionic liquid was performed using various reaction time and various temperatures. In order to compare the impact of the polymerization time and the temperature in the SI-ATRP process, the variation of the $Fc^+/Fc$ peaks current was followed. FIG. 4a illustrates the evolution of the oxidation peak current of the attached Fc as function of the reaction time and the temperature. One has to note that each point in the FIG. 4 is an average of 10 distinct experiments.

The curve shows that whatever the used temperature the tendency is that the peak current increases fast initially with the polymerization times to attain an asymptotic value after 30 min. The observed saturation after 30 min polymerization time could be due to the termination reaction of the SI-ATRP process or to the limit of the electrochemical detection of ferrocene unit. This nonlinearity feature is consistent with the ellipsometry results shown in FIG. 2d, and suggests probably the termination of the SI-ATRP process after 30 min reaction time under our experimental conditions. FIG. 4b displays the variation of oxidation peak current of ferrocene as function of temperature for fixed reaction time (30 min). For low temperature, the curve shows increases of the peak current with the temperature and reaches a maximum at 50° C., then for higher temperature the peak current decreases. Form these investigations it appears that the optimal conditions for the SI-ATRP of the redox ionic liquid monomer in ionic liquid media are 30 min reaction times at 50° C. In the following these optimum reaction conditions will be used.

Figure 5:
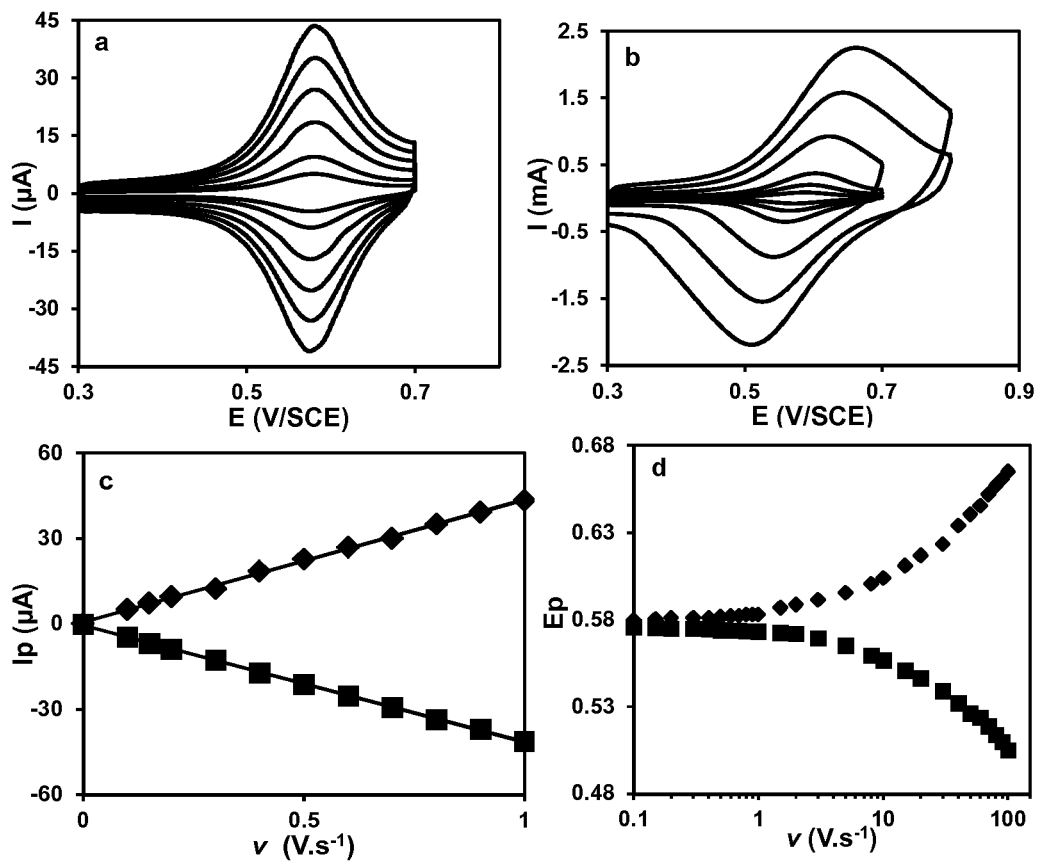
FIG. 5. CV characterization of poly(FcIL)modified electrode in acetonitrile containing $Bu_4NBF_4$ 0.1M, a) Scan rate 0.1, 0.2, 0.4, 0.6, 0.8 and 1 V·s⁻¹. b) Scan rate 2, 5, 10, 30, 60 and 100V·s⁻¹. c) Variation of anodic and cathodic peak current with the scan rate. d) Variation of the peaks potential with the scan rate (log plot).

The electrochemical investigations were complemented by recording the CV of the modified electrode at different scan rate as illustrated in FIG. 5.

FIGS. 5a and b shows series of cyclic voltammograms of Poly(FcIL) brushes deposited onto GC electrode performed at different scan rates. For lower scan rate (<1 V·s$^{-1}$), the $Fc^+/Fc$ redox signal is clearly visible with a peak potential separation close to 0 V. The full-width at half maximum (fwhm) is around 100 mV, this value is slightly higher than 90 mV predicted theoretically (Bard, A. J.; Faulkner, L. R. Electrochemical methods. Fundamentals and Applications; Wiley; New York, N.Y., 1980; p. 522), suggesting the occurrence of weak lateral interaction of ferrocene moieties within the polymer structure. In addition, linear variation of the peak current versus the scan rate is observed (FIG. 5c), suggesting the presence of non-diffusive process demonstrating that the Fc species are attached onto the GC electrode. However, for higher scan rate (above 1 V·s$^{-1}$) the redox signal of ferrocene starts to deviate from fully reversible system (FIG. 5b and FIG. 5d). FIG. 5d shows that the peak potential remains unchanged for lower scan rate. However, further increase of the scan rate induces variation of the peaks potentials in positive and negative direction suggesting the limitation of the redox process by the rate of electron transfer of attached Fc in the polymer film. From this curve and based on Laviron's model one could estimate the apparent rate constant of electron transfer (Laviron et al. J. Electroanal. Chem. 1979, 101, 19-28).

$$k_a^{app}=(1-\alpha_a)nFv_a/RT; k_c^{app}=\alpha_c nFv_c/RT$$

The charge transfer coefficient (a) was determined from the respective slopes of the linear portion of the Ep vs Log(v) plot, at high scan rates, and a value of 0.6 and 0.4 were obtained for the anodic and cathodic coefficient transfer, respectively. In the present case, the measured average of the apparent rate constants is 160 s$^{-1}$. This value has to be compared to that measured for neutral Fc units covalently attached onto electrode material which are ranged from 0.1 to 200 s$^{-1}$ (Fabre et al. J. Phys. Chem. B. 2006, 110, 6848-6855). The disparity of the reported electron transfer rate value is mainly related to the organization of the Fc units onto the surface, to the surface density and to the selected method for the grafting. In our case, the value of the reported apparent electron transfer rate could be considered as very fast which could be explained by several features. Indeed, the measured rate is a contribution of electron tunneling, through the thin initiator layer acting as insulating barrier (for attached ferrocene located at distance less than 5 nm from the electrode), and also electron hopping between the ferrocene units located beyond the tunneling distance. Other parameters could enhance the electron transfer including the organization of Fc units within the polymer brushes like structure, the short distance of the initiator and the chemical composition of the polymer which includes a positive and negative charge of the ionic liquid based structure. The electron transport mechanism process through the initiator and brush layers containing Fc units has been described in the literature. Thus, for the Fc units located near the electrode surface (5 nm distance) the electron transport may occur across the initiator layer through diffusion of polymer bound ferrocene and/or pinholes or defects within the polymer brushes or by tunneling. However, for Fc unit located at distance higher than the tunneling distance the electron transfer process is mainly governed by hopping mechanisms or electron exchange within the polymer structure. Indeed, we believe that the presence of positive and negative charges within the film may enhance the electron hopping process and consequently the electron transfer rate.

Figure 6:
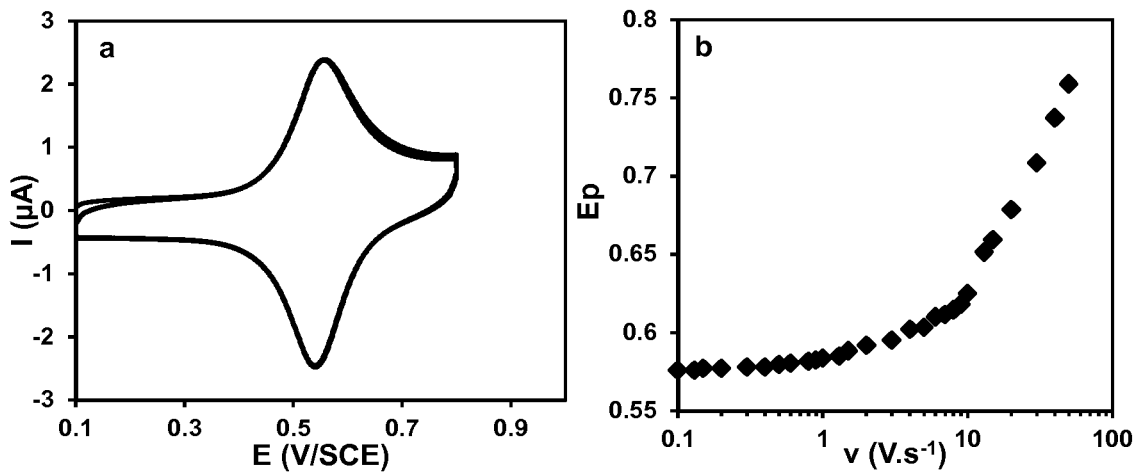
FIG. 6. a) CV characterization of modified electrode in 1-ethyl-2,3-dimethyl imidazolium TFSI, scan rate 0.1 V·s⁻¹. b) Dependency of peak potential on scan rate.

In this part, the electrochemical investigations of the poly(FcIL) modified electrodes were performed in ionic liquid media. FIG. 6a displays the recorded CV of poly (FcIL) supported GC electrode in ionic liquid, while FIG. 6b represent the dependency of the peak potential as function of the scan rate.

The characterization in ionic liquid of the modified electrode exhibits similar behavior as that observed in acetonitrile solution (see FIG. 3). Indeed, a reversible redox system corresponding to $Fc^+/Fc$ redox couple is observed at 0.57 V. The difference between the anodic and cathodic peak potential is almost 0 V indicating the presence of immobilized system. However, when compared to the response in ACN solution the peak current is 3 times lower in ionic liquid. As consequence, it appears that the surface concentration of immobilized Fc in ionic liquid is lower than that obtained in ACN for the same electrode; however, one has to consider the effect of the ionic liquid viscosity and direct comparison could not be conducted. Such difference could be linked to the ionic liquid viscosity, to the solvation of attached layer in ionic liquid media compared to acetonitrile, and to the electrostatic interaction between attached imidazolium and the imidazolium based ionic liquid.

FIG. 6b shows the dependency of the oxidation peak potential variation with the scan rate. As expected, no variation of the peak potential is observed for low scan rate. However, the increase of the scan rate induces a positive deviation of peak potential suggesting control of the redox process by the rate of electron transfer. More interestingly, the apparent rate constant measured in ionic liquid was found to be similar to that measured in ACN media. In general, for redox species dissolved in ionic liquid solution the apparent electron transfer constant is lower by 1 to 2 orders of magnitude compared to classical solvent; however, in our case and for attached species this constant appears to be not affected by the used solvent and less sensitive to the solvation. Such behavior could be linked to the presence of positive (imidazolium ring) and negative (TFSI) charge within the film, which could be considered as self-solvation or self-double layer of the poly(FcIL) modified electrode.

Figure 7:
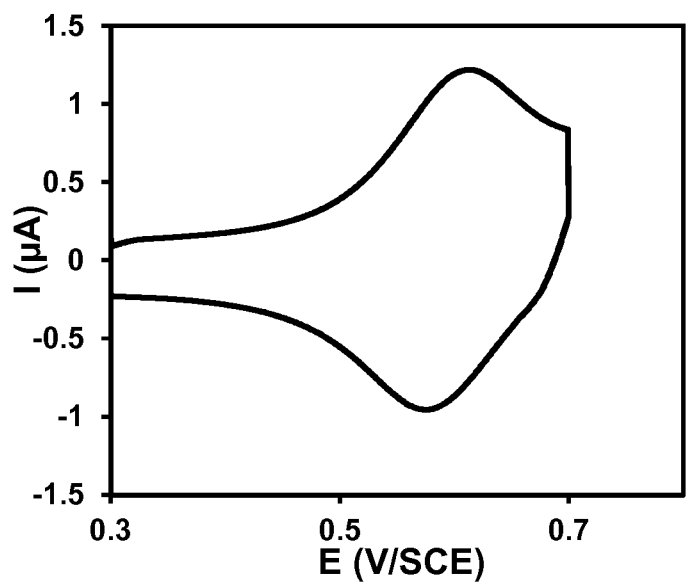
FIG. 7. CV response of poly(FcIL) deposited onto GC electrode in THF containing 0.1 M $Bu_4NBF_4$.

In order to confirm the role of ionic moieties in the electrochemical response, further investigations of poly(FcIL) were conducted in THF electrolytic solution (see FIG. 7).

The CV shows clear reversible redox process related to the $Fc^+/Fc$ redox couple with a peak potential separation almost close to 0 V. This behavior has to be compared with the electrochemical response of neutral redox polymer modified electrode, poly-ferrocene methacrylate (PFcMA), in THF electrolytic solution. In the presence of THF as solvent, the electrochemical response of neutral poly(Fc) polymer brushes film exhibits large peak potential separation suggesting that the redox process is restricted by rate of counter-ion migration into/out of the polymer. However, in our case, the electrochemical response of poly(FcIL) in THF is similar to that recorded in ACN without a visible change in the peak to peak potential separation. This difference, when compared to neutral redox polymer film, is probably linked to the presence of ions (cation and anion in polymer ionic liquid) within the film which maintains the fast electron transfer rates between adjacent Fc units. This result highlights the advantage of the formation of redox polymer ionic liquid in electrochemical system.

Figure 8:
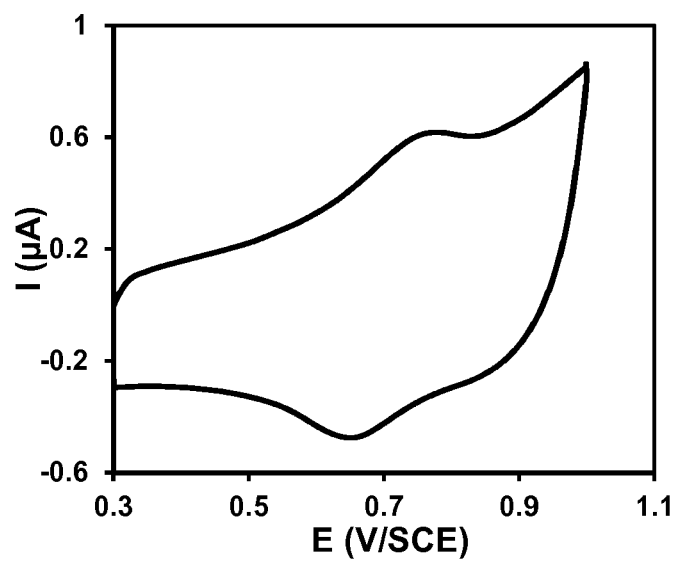
FIG. 8. CV characterization of poly(FcIL) modified GC electrode in ACN without supporting electrolyte.

Based on the above results, the electrochemical characterization of the generated material was investigated in solvent free of supporting electrolyte. The CV of poly(FcIL) modified electrode recorded in the absence of supporting electrolyte is shown in FIG. 8.

The curve shows anodic and cathodic peaks of $Fc^+/Fc$ redox couple. Compared to the electrochemical signal recorded in the presence of supporting electrolyte the peak current is lowered and the peak potentials are shifted to more positive potential. The decrease in the peak current is expected since no ions are present in the solution and could be related to the presence of silent Fc groups that are not detected during the electrochemical measurement. The positive peak potential shift has already been reported when investigating the influence of supporting electrolyte concentration on the response of neutral redox polymer. It was found that it is more difficult to oxidize neutral redox polymer film in the presence of low supporting electrolyte concentration. However, in the present example there is no supporting electrolyte In the solution and the electrochemical signal is still visible. One has to note that the electrochemical characterization of neutral polymer brushes, poly(FcMA), In acetonitrile solution free of electrolyte does not show any electrochemical signal (data not shown). The presence of the electrochemical signal in solvent free electrolyte confirms that the poly(FcIL) could act as self-supporting electrolyte thanks to the presence of imidazolium cation and the TFSI anion within the film.

Stimuli-responsive polymers brushes are particularly interesting materials that have been used for several applications including electrochemical devices, sensors, microfluidic devices and surface wettability. In the following, the generated poly(FcIL) has been investigated for potential use in their capability of reversible electrochemical-switch of the surface wettability and for bio-catalytic activity.

Figure 9:
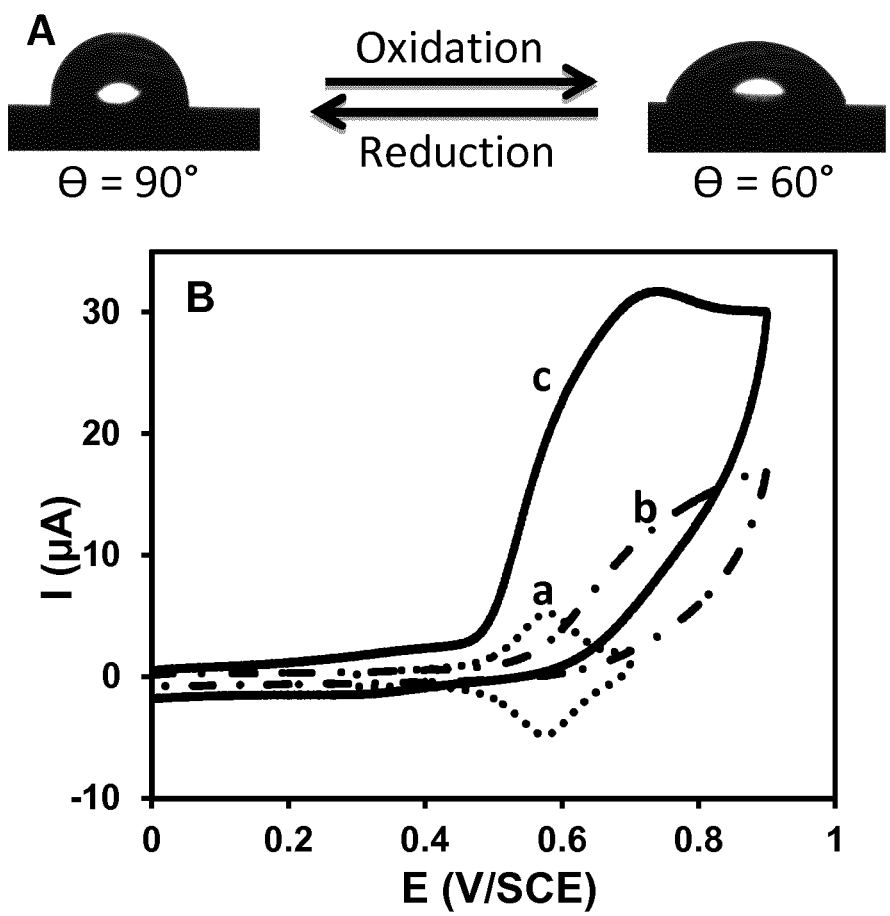
FIG. 9. (A) Contact angles obtained for poly(FcIL) deposited onto Au substrate before and after electrochemical oxidation. (B) (a) Cyclic voltammogram of poly(FcIL) modified GC in PBS solution, (b) CV of bare GC in PBS solution containing 10⁻⁴ M of tyrosine, (c) CV of poly(FcIL) modified GC in PBS solution containing 10 M of tyrosine. Scan rate 0.1 V·s⁻¹.

The modulation of the properties of interfaces such as the variation of the wettability is of high interest. The best advantage of using electrochemistry as an external stimulus is its ability to switch the surface oxidation state in a few second or less. FIG. 9A shows the contact angle for the poly(FcIL) attached onto Au substrate before and after electrochemical oxidation. Oxidation of the ferrocene based polymer was achieved electrochemically by applying a potential of about 0.7 V during 10 seconds in ACN solution containing 0.1 M LiTFSI as supporting electrolyte. Contact angle (CA) measurements were performed for four different samples and the poly(FcIL) interface shows an average contact angle of about 90° indicating the hydrophobic character of the surface. This result is in accordance with previously reported results on poly(IL). Interestingly, after electrochemical oxidation the CA decreases to 60° suggesting the presence of hydrophilic surface. This AA of about 30° suggests the possibility to perform electro-switchable wettability, and this switching appears to be reversible upon several oxidation reduction processes. The poly(FcIL) could be used as stimuli responsive polymer with a reversible electrochemical switchable wettability. This property could be coupled with the possibility to perform counterions (anions) exchanges within the polymer based ionic liquid films, which may lead to further drive the transition between hydrophobicity and hydrophilicity of the surfaces.

As stated above, poly(IL) and redox polymer have been used in several applications including sensor. In the following, the electrochemical response of L-tyrosine on poly (FcIL) modified GC electrode was investigated. Tyrosine was chosen as test molecules since it is an important component of proteins, and is indispensable in human nutrition. As Tyrosine is an electroactive molecule, electrochemistry has been proposed as method for its detection in different media. Nevertheless, the low electroactivity, the slow electron transfer rate combined with the high oxidation over potential of tyrosine provide ill-defined electrochemical system. To overcome these limitations, the use of modified electrodes as electrochemical sensor has been proposed to improve the electrochemical detection of tyrosine.

FIG. 9Ba shows the electrochemical response of poly (FcIL) modified GC in PBS solution. The curve displays a redox electrochemical signal corresponding to Fc redox couple of the poly(FcIL). The shape of the CV recorded in PBS solution is similar to that observed in acetonitrile electrolytic solution. FIG. 9Bb displays the response of bare GC electrode in in PBS solution containing $10^{-4}$ M tyrosine. As expected, the curve shows clearly that the oxidation peak (around 0.8 V/SCE) of tyrosine is ill-defined. However, the electrochemical signal of tyrosine onto poly(FcIL) modified GC electrode (FIG. 9Bc) was considerably improved as attested by the peak potential shift to less positive value, the oxidation peak current become sharper and increased significantly. Compared to bare GC electrode, the potential shift, to less positive potential, of about 120 mV indicates that the modified electrode shift the over-potential negatively. This result associated with the increase of the anodic peak current evidenced that the poly(FcIL) improves the oxidation of tyrosine.

CONCLUSION

In summary, this work presents the first example of redox active poly(ionic liquid) directly grafted onto electrode surface using surface-initiated ATRP. Surface investigations of the generated material clearly confirm the immobilization of poly(FcIL) and the presence of the TFSI anion within the attached polymer, while AFM images reveal the formation of a well-defined polymer brushes like structure. The electrochemical characterizations of poly(ferrocenyl ionic liquid) modified electrode in electrolytic acetonitrile solution show the presence of a reversible redox signal. Besides that, the electrochemical analyses reveal that the redox behavior is characteristic of surface-confined electroactive layers. Unlike neutral poly(Fc), and thanks to the presence of ionic moieties in the poly(FcIL) the oxidation/reduction of the Fc units is not restricted by the rate of counter-on migration into/out of the polymer. This finding is supported by the observation of the ferrocene electrochemical signal when using solvent free electrolyte. Finally, the poly(FcIL) modified electrodes have been successfully used as reversible redox responsive materials as attested by the reversible electrochemical switchable wettability of the polymer. In addition, the generated polymer based redox ionic liquid exhibits excellent electrocatalytic activity and voltammetric response towards tyrosine. These properties would promote the potential useful of poly(redox ionic liquid) in electrochemical sensor and microfluidic applications.

Example 2. Ionic Liquids Comprising Anthraquinone Groups as the Reducible Group 2.1. Synthesis of N-Ferrocenemethyl-N'-ethyl-eneamidoanthraquinoneimidazolium bis(trifluoromethylsulfonyl)imide

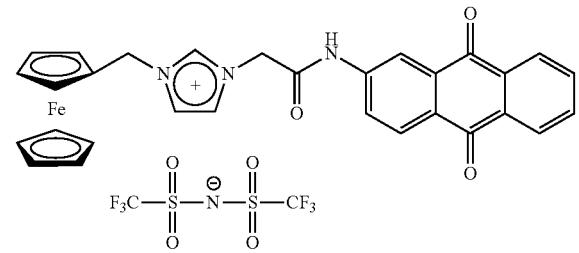

The synthesis was performed in 4 steps

1st Step: Synthesis of Chloroethyleneamidoanthraquinone

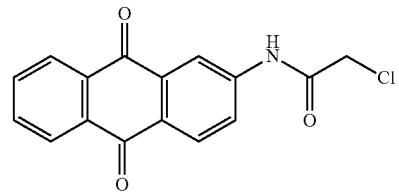 [SMILES: O=C(CCl)Nc1ccc2c(c1)C(=O)c1ccccc1C2=O]

In a three necked flask, 2-aminoanthraquinone (1.0 g, 4.5 mmol), pyridine (0.5 ml, 6.2 mmol) and 60 ml of dichloromethane were mixed under vigorous stirring at 0° C. Solution of chloroacetylchloride (0.4 ml, 5.4 mmol) in 20 ml of dichloromethane was then added drop wise. After stirring 4 h, the solution was filtered and extracted with 20 ml HCl 3M. The organic layer was washed with 20 ml of saturated NaCl and recovered by decantation. A large amount of MgSO$_4$ was added into the organic phase in order to eliminate water traces. The solvent was evaporated to obtain a brown residue. The crude product was further dissolved in 100 ml of dichloromethane and 100 ml of hexane was slowly added into the solution. The purified product was recrystallized in the mixture and then was filtered and dried under vacuum.

Yield: 42.7% (0.55 g)

1H RMN (CDCl$_3$) δ: 4.27 (s, 2H), 7.82 (m, 2H), 8.23 (d, J=2.4 Hz, 1H), 8.32 (m, 4H), 8.6 (s, 1H)

2nd Step: Synthesis of N-ferrocenylmethylimidazole 25 g of trimethylammonium ferrocene iodide (64.8 mmol, 1 equiv.) and 5.4 g of imidazole (79 mmol, 1.22 equiv.) were dissolved in 140 ml of dimethylformamide (DMF). The solution was refluxed for 2 hours. Then 150 ml of distilled water was added into the balloon and the black solid precipitate was eliminated by filtration. The product was recovered by decantation with diethyl ether (3×100 ml). The organic layer was washed 1 time with distilled water (100 ml) in order to eliminate DMF traces. The organic phase was dried with MgSO$_4$. Diethyl ether was evaporated to obtain orange powder.

Yield: 45% (8.23 g)

1H NMR (DMSO): 4.15 (t, J=2.0 Hz, 2H), 4.18 (s, 5H), 4.31 (t, J=2 Hz, 2H), 4.90 (s, 2H), 6.83 (s, 1H), 7.15 (s, 1H), 7.64 (s, 1H).

3rd Step: Synthesis of N-Ferrocenemethyl-N'-ethyleneamidoanthroquinoneimidazolium Iodide

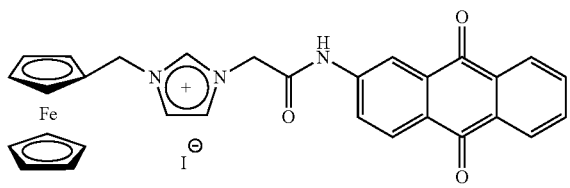

0.1 g of chloroethyleneamidoanthraquinone (0.33 mmol) was mixed with 0.094 g of N-ferrocenylmethylimidazole (0.35 mmol) and a catalytic amount of sodium iodide in 20 ml of acetone/dichloromethane (50:50 v/v).

The reaction was performed under vigorous stirring at room temperature for 60 hrs. Then the product was recovered by filtration and washed with distilled water. The brown powder was obtain and dried under vacuum for 1 day.

Yield: 69.5% (0.13 g). 1H RMN (CDCl$_3$) δ: 4.27 (m, 7H), 4.46 (t, J=2 Hz, 2H), 5.26 (s, 2H), 5.28 (s, 2H), 7.82 (s, 1H), 7.91 (s, 1H), 8.04 (m, 2H), 8.2 (m, 1H), 8.24 (s, 3H), 8.47 (m, 1H), 9.15 (s, 1H), 11.18 (s, 1H).

4$^{th}$ Step: Synthesis of N-Ferrocenemethyl-N'-ethyleneamidoanthroquinoneimidazolium TFSI

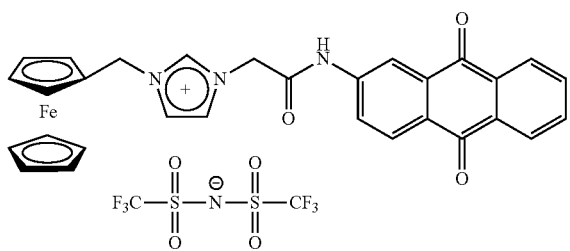

0.13 g of N-Ferrocenemethyl-N'-ethyleneamidoanthraquinoneimidazolium iodide (0.25 mmol) was added into a solution containing 20 ml of distilled water and 0.2 g of lithium bis(trifluoromethylsulfonyl)imide (0.75 mmol). The solution was then heated at 70° C. for 24 hours in order to obtain a brown powder. The product was washed thoroughly with distilled water and dried under vacuum for 1 day.

Yield: 87% (0.17 g)

1H RMN (CDCl$_3$): 4.27 (m, 7H), 4.45 (t, J=2 Hz, 2H), 5.26 (s, 2H), 5.28 (s, 2H), 7.81 (s, 1H), 7.92 (s, 1H), 8.04 (m, 2H), 8.18 (m, 1H), 8.24 (s, 3H), 8.47 (m, 1H), 9.15 (s, 1H), 11.18 (s, 1H).

19F RMN: −78.88 (s, 6F)

Via structural study by using NMR; the formation and the purity of the obtained product were confirmed.

2.2. Synthesis of N-ethyleneamidoanthraquinone-N-vinylimdazolium Iodide

In the solution containing 1-vinylimidazole (0.094 g, 0.9 mmol) and a catalytic amount of sodium iodide (0.14 g, 1 mmol) in 20 ml de acetone/dichloromethane (50/50 v/v), chloroethyleneamidoanthraquinone (0.27 g, 0.9 mmol) was added. The mixture was kept under stirring at room temperature for 1 day. After the reaction, the precipitate was filtered and washed 5 times with distilled water. The crude product was further recrystallized in a solution of dichloromethane/hexane and the purified one was appeared as brown powder.

Yield: 94% (0.3 g).

1H RMN (DMSO): 5.39 (s, 2H), 5.5 (m, 1H), 6.05 (m, 1H), 7.47 (q, J=8.8 Hz, 1H), 7.82 (s, 1H), 7.9 (s, 1H), 7.93 (m, 2H), 8.08 (m, 1H), 8.22 (m, 3H), 8.29 (d, J=2 Hz, 1H), 9.52 (s, 1H), 11.53 (s, 1H).

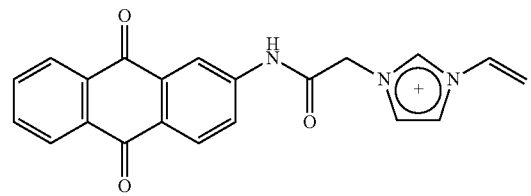

2.3. Synthesis of N-anthroquinoneferrocenemethyl-N-allylimidazolium

1$^{st}$ Step: Synthesis of N-ferrocenylmethyl-N-allylimidazolium Bromide 1.2 g of Ferrocenylmethylimidazole (8.76 mmol, 1 equiv.) previously synthesized was dissolved in 40 ml of chloroform. Then, 0.91 ml of allylbromide (10.5 mmol, 1.2 equiv.) was added slowly to the solution of ferrocenemethylimidazole under stirring. The mixture was refluxed for 2 h. Finally, the solvent and non-reacted allylbromide were eliminated by evaporation under reduced pressure. The product was dried under vacuum for 1 day. The title compound is obtained as a very viscous brown oil in 90% yield (2.04 g).

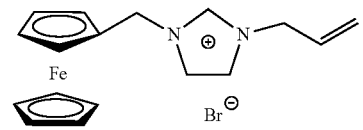

1H RMN (DMSO) δ: 4.22 (m, 7H), 4.45 (t, J=1.6 Hz, 2H), 4.83 (m, 2H), 5.26 (s, 2H), 5.33-5.36 (m, 2H), 6.04 (m, 1H), 7.71 (s, 1H), 7.81 (s, 1H), 9.23 (s, 1H).

2$^{nd}$ Step: Synthesis of N-anthraquinoneferrocenemethyl-N-allylimidazolium

Solution containing 3.5 mM de N-ferrocenemethyl-N-allyimidazolium in 10 ml of MeCN was mixed with a second solution containing 3.7 mM of anthraquinone diazonium salt dissolved in 10 ml of MeCN. The mixture was sonicated for 30 minutes and served to modify the electrodes.

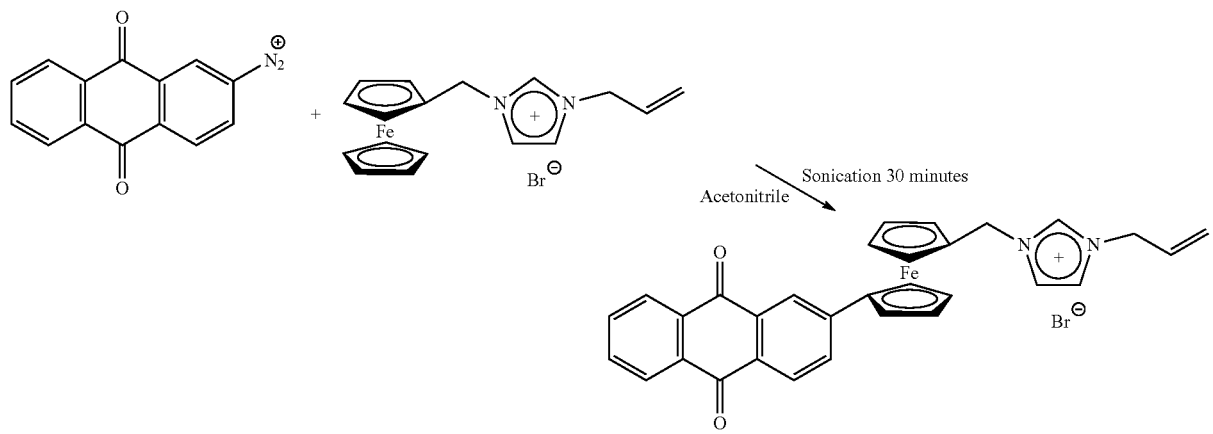

2.4. Synthesis of N-ethyleneamidoanthroquinone-N-methylimidazolium bis(trifluoromethylsulfonyl)imide

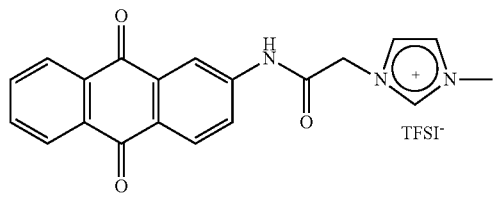

1st Step: Synthesis of Chloroethyleneamidoanthaquinone

In a two-necked flask, 2-aminoanthraquinone (1.0 g, 4.5 mmol), pyridine (0.5 mL, 6.2 mmol) and dichloromethane (60 mL) were mixed and stirred at 0° C. Solution of Chloroacetyl chloride (0.4 mL, 5.4 mmol) in dichloromethane (20 mL) was then added drop-wise. After stirring 4 h, the solution was filter and extracted with 20 mL HCl 3 M. The dichloromethane layer was washed with 20 mL saturated NaCl solution. The organic layer was then dried over anhydrous sodium sulfate. The solvent was then evaporated to obtain a brown residue. The crude product was further dissolved in 100 mL dichloromethane and 100 mL hexane was slowly added. The purified product was then filtered and dried under vacuum. Intermediate 10 is obtained as a brown crystalline solid in 54% yield (0.73 g).

$^1$H NMR (CDCl$_3$): 4.27 (s, 2H, CH$_2$), 7.82 (m, 2H, 2×ArH), 8.23 (d, 2.4 Hz, 1H, ArH), 8.32 (m, 4H, 4×ArH), 8.6 (s, 1H, NH)

2nd Step: Synthesis of N-ethyleneamidoanthraquinone-N-methylimidazolium Iodide To a solution of methylimidazole (0.11 g, 1 mmol) and a catalytic amount of sodium iodide in 15 ml Acetone/dichloromethane (50:50), chloroethyleneamidoanthraquinone (0.3 g, 1 mmol) was added and the mixture was stirred for 24 hr at room temperature. After reaction, the precipitate was filtered and then washed 5 times with distilled water. The crude product was then recrystallized in dichloromethane/hexane to obtain the brown powder. Intermediate 10 is obtained as a brown solid powder in 84% yield (0.29 g).

$^1$H NMR (DMSO): 3.94 (s, 3H, CH$_3$), 5.34 (s, 2H, CH$_2$), 7.76 (s, 1H, N—CH), 7.78 (s, 1H, N—CH), 7.95 (m, 2H, 2×ArH), 8.07 (m, 1H, ArH), 8.22 (m, 3H, 3×ArH), 8.52 (d, 2 Hz, 1H, ArH), 9.14 (s, 1H, N—CH—N), 11.43 (s, 1H, —CONH—).

3rd Step: Synthesis of N-ethyleneamidoanthraquinone-N-methylimidazolium bis(trifluoromethylsulfonyl)imide The ion exchange was occurred in aqueous media. Solution of LiTFSI (0.124 g, 0.47 mmol) in 5 mL distilled water was added dropwise to the Chloroethyleneamidoanthraquinone 1-methylimidazolium iodide (0.03 g, 0.1 mmol) in 0.1 mL DMSO. The mixture was stirred for 24 hrs at 70° C. After that, the solid product was filtered and washed with distilled water (4×20 ml) affording brown powder. The title compound is obtained as a brown powder in 20% yield (0.01 g).

$^1$H NMR (DMSO): 3.94 (s, 3H, CH$_3$), 5.3 (s, 2H, CH$_2$), 7.77 (s, 1H, N—CH), 7.76 (s, 1H, N—CH), 7.94 (m, 2H, 2×ArH), 8.03 (m, 1H, ArH), 8.21 (m, 3H, 3×ArH), 8.5 (d, 2 Hz, 1H, ArH), 9.11 (s, 1H, N—CH—N), 11.18 (s, 1H, —CONH—).

$^{19}$F NMR (DMSO): 78.73 (s, 6F, —CF$_3$).

2.6. Synthesis of N-ethyleneamidoanthraquinone-N-vinylimidazolium bis(trifluoromethylsulfonyl)imide

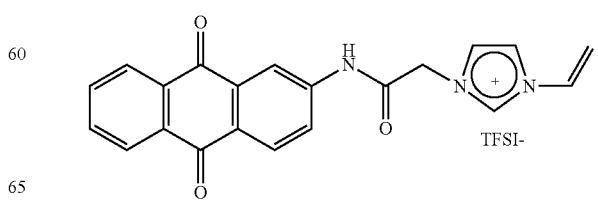

1st Step: Synthesis of ethyleneamidoanthraquinone-N-vinylimidazolium Iodide

This compound was synthesized using the protocol of N-ethyleneamidoanthraquinone-N-methylimidazolium iodide. To a solution of 1-vinylimidazole (0.094 g, 0.9 mmol) and a catalytic amount of sodium iodide (0.14 g, 1 mmol) in 20 ml Acetone/dichloromethane (50:50), chloro-ethyleneamidoanthraquinone 10 (0.27 g, 0.9 mmol) was added and the mixture was stirred for 24 hr at room temperature. After reaction, the precipitate was filtered and then washed 5 times with distilled water. The crude product was then recrystallized in dichloromethane/hexane to obtain the brown powder. Intermediate 16 is obtained as a brown solid powder in 94% yield (0.30 g) $^1$H NMR (DMSO): 5.39 (s, 2H, CH$_2$), 5.5 (m, 1H, CH=CH$_2$), 6.05 (m, 1H, CH=CH$_2$), 7.47 (q, 8.8 Hz, 1H, CH=CH$_2$), 7.93 (m, 2H, 2×ArH), 8.08 (m, 1H, ArH), 8.22 (m, 3H, 3×ArH), 8.29 (d, 2 Hz, 1H, ArH), 9.52 (s, 1H, N—CH—N), 11.53 (s, 1H, —CONH—).

2nd Step: Synthesis of N-ethyleneamidoanthraquinone-N-vinylimidazolimbis(trifluoromethylsulfonyl)imide This compound was synthesized using the protocol of N-ethyleneamidoanthraquinone-N-methylimidazolium bis(trifluoromethylsulfonyl)imide. The ion exchange was occurred in aqueous media. Solution of LiTFSI (0.17 g, 0.6 mmol) in 5 ml distilled water was added drop-wise to the N-ethyleneamidoanthraquinone-N-vinylimidazolium iodide (0.179 g, 0.5 mmol) in 0.1 ml CH$_2$Cl$_2$. The mixture was stirred for 24 hrs at 70° C. After that, the solid product was filtered and washed with distilled water (4×20 ml) affording brown powder. The title compound is obtained as a brown solid powder in 86% yield (0.22 g). $^1$H NMR (DMSO): 5.35 (s, 2H, CH$_2$), 5.5 (m, 1H, CH=CH$_2$), 6.05 (m, 1H, CH=CH$_2$), 7.45 (q, 8.8 Hz, 1H, CH=CH$_2$), 7.94 (m, 2H, 2×ArH), 8.05 (m, 1H, ArH), 8.21 (m, 3H, 3×ArH), 8.50 (d, 2 Hz, 1H, ArH), 9.47 (s, 1H, N—CH—N), 11.52 (s, 1H, —CONH—).
$^{19}$F NMR (DMSO): 78.73 (s, 6F, —CF$_3$).

Example 3. Ionic Liquids Comprising Viologene Groups as the Reducible Group

3.1. Synthesis of 1-heptyl-1'-(2-(1-ferrocenylmethyl-1H-imidazol-3-ium-3-yl)acetyl)-[4,4'-bipyridine]-1,1'-diium 1$^{st}$ Step: Synthesis of 1-heptyl-1'-chloroacetyl-[4,4'-bipyridine]-1,1'-diium

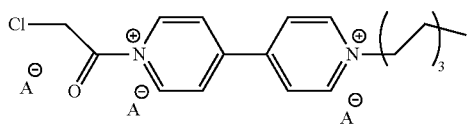

In a three necked flask, 1-Heptyl-4-(4-pyridyl)pyridinium bromide (3.36 g, 10 mmol) was dissolved in 100 ml of distilled dichloromethane under vigorous stirring at 0° C. Solution of chloroacetylchloride (1.5 ml, 20 mmol) in 40 ml of dichloromethane was then added drop wise. After stirring 1 h, the solution was filtered yielded light yellow solid. The solid was then washed with dichloromethane and dried under vacuum.
Yield: 99% (4.02 g)

2$^{nd}$ Step: Synthesis of 1-heptyl-1'-(2-11-ferrocenyl-methyl-1H-imidazol-3-ium-3-yl)acetyl)-[4,4'-bipyridine]-1,1'-diium

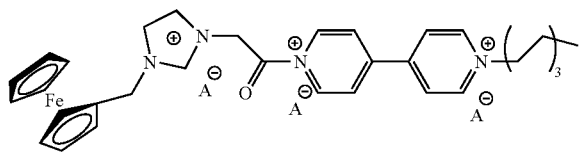

1-heptyl-1'-chloroacetyl-[4,4'-bipyridine]-1,1'-diium (0.45 g, 1 mmol) was mixed with N-ferrocenylmethylimidazole (0.32 g, 1.2 mmol) in 100 ml of distilled dichloromethane. The mixture was then heat for 24 hrs at 50° C. Then the solvent was distilled off under reduced pressure yielded highly viscous brown oil. The crude product was washed in n-hexane:dichloromethane (10:1, 3 times).
Yield: 73% (0.52 g)

3.2. Synthesis of 1-allyl-1'-(2-(1-ferrocenylmethyl-1H-imidazol-3-ium-3-yl)acetyl)-[4,4'-bipyridine]-1,1'-diium 1$^{st}$ Step: Synthesis of 1-allyl-[4,4'-bipyridine]-1-ium

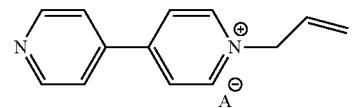

In a three necked flask, 4,4'-bipyridyl (3.2 g, 20 mmol) was dissolved in 100 ml of distilled dichloromethane under vigorous stirring. Solution of allyl bromide (2 ml, 24 mmol) in 40 ml of dichloromethane was then added drop wise. After stirring overnight at 50° C., the solution was filtered yielded light yellow solid and yellow solution. The solid was washed with dichloromethane resulting 1,1'-diallyl-[4,4'-bipyridine]-1,1'-diium. The solvent from organic layer was cut off under reduced pressure resulting yellow solid. The crude product was then recrystallized in dichloromethane:hexane (1:20) resulting yellow powder. Finally, the purified product was dried under vacuum.
Yield: 70% (1.94 g)

2$^{nd}$ Step: 1-allyl-1'-chloroacetyl-[4,4'-bipyridine]-1,1'-diium

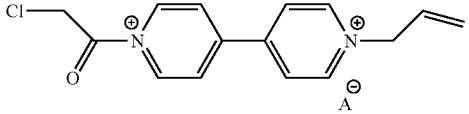

In a three necked flask, 1-ally-4-(4-pyridyl)pyridinium bromide (2.77 g, 10 mmol) was dissolved in 100 ml of distilled dichloromethane under vigorous stirring at 0° C. Solution of chloroacetylchloride (1.5 ml, 20 mmol) in 40 ml of dichloromethane was then added drop wise. After stirring 1 h, the solution was filtered yielded light yellow solid. The solid was then washed with dichloromethane and dried under vacuum.

Yield: 97% (3.77 g)

3$^{rd}$ Step: Synthesis of 1-allyl-1'-=2-(1-ferrocenylmethyl-1H-imidazol-3-ium-3-yl)acetyl)-[4,4'-bipyridine]-1,1'-diium

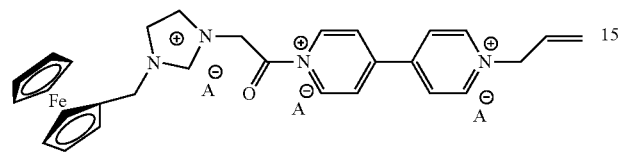

1-allyl-1'-chloroacetyl-[4,4'-bipyridine]-1,1'-diium (1.12 g, 3 mmol) was added into a dichloromethane solution (100 ml) containing N-ferrocenylmethylimidazole (0.96 g, 3.6 mmol). The mixture was then refluxed overnight. Black solid was filtered and the solvent was evaporated under reduced pressure. The residue was washed in hexane resulting viscous brown oil.

Yield: 60% (1.16 g)

3.3. Synthesis of 1-allyl-1'-((N,N-dimethyl-N-ferrocenylmethylammonium)acetyl)-[4,4'-bipyridine]-1,1'-diium

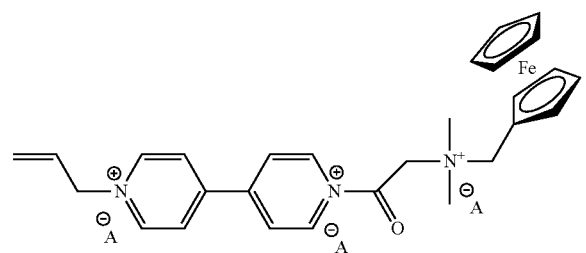

1-allyl-1'-chloroacetyl-[4,4'-bipyridine]-1,1'-diium (1.12 g, 3 mmol) was added into a dichloromethane solution (100 ml) containing N,N-dimethyl-N-ferrocenylmethylammonium (0.87 g, 3.6 mmol). The mixture was then refluxed overnight. Black solid was filtered and the solvent was evaporated under reduced pressure. The residue was washed in hexane resulting yellow solid.

Yield: 86% (1.63 g)

3.4. Synthesis of 1-heptyl-1'-(2-(1-vinyl-1H-imidazol-3-ium-3-yl)acetyl)-[4,4'-bipyridine]-1,1'-diium

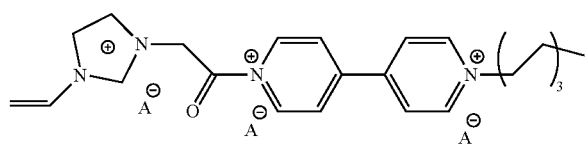

1-heptyl-1'-chloroacetyl-[44'-bipyridine]-1,1'-diium (1.35 g, 3 mmol) was added into a dichloromethane solution (100 ml) containing N-vinylimidazole (0.34 g, 3.6 mmol). The mixture was then refluxed overnight. The solvent was eliminated under reduced pressure. The residue was dissolved in water (50 ml) containing bis(trifluoromethane)sulfonimide lithium salt (1.05 g, 3.7 mmol). The solution was heated at 70° C. for 4 hrs resulting phase separation. The aqueous phase was eliminated and the organic phase was washed with water (3 times×50 ml) then dried over MgSO$_4$. Finally the organic layer was filtered and dried under vacuum.

Yield: 46% (1.73 g)

3.5. Synthesis of 1-allyl-1'-(2-(1-vinyl-1H-imidazol-3-ium-3-yl)acetyl)-[4,4'-bipyridine]-1,1'-diium

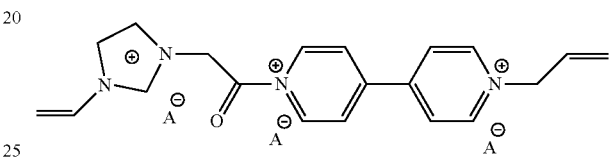

1-allyl-1'-chloroacetyl-[4,4'-bipyridine]-1,1'-diium (1.12 g, 3 mmol) was added into a dichloromethane solution (100 ml) containing N-vinylimidazole (0.34 g, 3.6 mmol). The mixture was then refluxed overnight. The solvent was eliminated under reduced pressure. The residue was dissolved in water (50 ml) containing bis(trifluoromethane)sulfonimide lithium salt (1.05 g, 3.7 mmol). The solution was heated at 70° C. for 4 hrs resulting phase separation. The aqueous phase was eliminated and the organic phase was washed with water (3 times×50 ml) then dried over MgSO$_4$. Finally the organic layer was filtered and dried under vacuum.

Yield: 46% (1.75 g)

Example 4. Other Ionic Liquids or Polymeric Ionic Liquids of the Invention 4.1 Synthesis of N-allyl-N,N-dimethyl-N-ferrocenylammonium

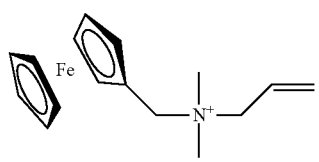

The N,N-dimethyl-N-ferrocenylmethylprop-2-en-1-ammonium bromide was produced using the following procedure. First, the (dimethylaminomethyl)ferrocene (2.43 g, 10 mmol) and allyl bromide (2.42 g, 20 mmol) were dissolved in CH$_2$Cl$_2$ and the mixture was heated overnight at 55° C. Then the mixture was cooled down to room temperature and the solvent with unreacted allyl bromide were evaporated under reduced pressure. Finally, the residue was recrystallized using CH$_2$Cl$_2$/hexane (1:20 v/v) resulting orange powder. The purified product was filtered and dried under vacuum 1 day before use.

Yield: 96% (3.5 g)

4.2. Synthesis of N-cobaltoceniumacetyl-N-ferrocenylmethyl-N,N-dimethylammonium

1$^{st}$ Step: Synthesis of 1-Chloroacetylcobaltocenium bis(trifluoromethane)sulfonamide

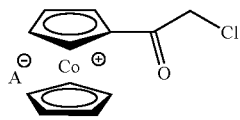

A solution of cobaltocene (1.89 g, 10 mmol) is distilled CH$_2$Cl$_2$ (40 ml) was added into a CH$_2$Cl$_2$ (80 ml) solution containing chloroacetyl chloride (1.36 g, 12 mmol) and aluminium (III) chloride (1.6 g, 12 mmol) at 0° C. under rigorous stirring. After 2 hrs of reaction, the mixture was then poured into water (100 ml). The aqueous phase was washed with CH$_2$Cl$_2$ (100 ml). Then LiTFSI (3.44 g, 12 mmol) was added into the aqueous layer. The solution was slightly heated (50° C.) under vigorous stirring for 2 hrs. After 2 hours of reaction, the reaction mixture was cooled down to room temperature resulting yellow crystals. By washing with water, the solid was dried under vacuum. The residue was applied to silica gel chromatography (methanol:dichloromethane=1:10) to afford yellow compound.

Yield: 41% (2.23 g)

2$^{nd}$ Step: Synthesis of N-cobaltoceniumacetyl-N-ferrocenylmethyl-N,N-dimethylammonium

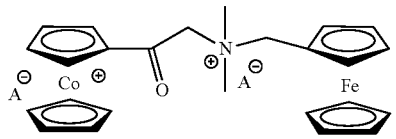

1-Chlorocetylcobaltocenium bis(trifluoromethane)sulfonamide (0.55 g, 1 mmol) was added into a CH$_2$Cl$_2$ solution containing N-ferrocenylmethyl-N,N-dimethylamine (0.28 g, 1.2 mmol). The mixture was heated under vigorous stirring for overnight. The solvent was then eliminated under reduced pressure. The residue was then applied to silica gel chromatography (methanol:hexane=1:10) and concentrated affording viscous brown oil.

Yield: 82% (0.64 g)

4.3. Synthesis of N-cobaltoceniumacetyl-N'-vinylimdazolium

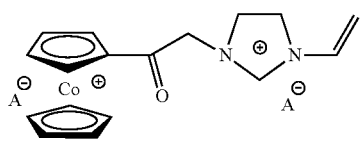

1-Chloroacetylcobaltocenium bis(trifluoromethane)sulfonamide (0.55 g, 1 mmol) was refluxed with vinylimidazole (0.11 g, 1.2 mmol) in 100 ml of CH$_2$Cl$_2$ for 24 hrs. After the reaction, the mixture was poured into water. The underlayer was taken out and washed with water (3 times, 50 ml). The organic layer was dried over MgSO4 and concentrated to afford viscous brown oil Yield: 61% (0.39 g)

Example 5: Functionalization of Glassy Carbon Electrode by Using SI-ATRP: Surface-Initiated Atom Transfer Radical Polymerization

5.1. Electrografting of Initiator Layer

Electrografting was performed by sweeping the potential from 0.5 V to 1.6 V versus saturated calomel electrode (SCE) at 0.1 V/s (cyclic voltammetry) in an aqueous solution containing 5 mM of 2-bromoethylamine and 0.1M LiClO$_4$.

The choice of electro-grafting is crucial for a covalent attachment of initiator layer onto the electrode surface. A various types of electrodes (current collectors) can be used, such as nano-carbon (carbon nanotubes or graphene), nickel, gold, platinum, etc. By using this method, the stability of the polymer brushes attached on the surface can be improved.

5.2. Polymerization at the Surface of Initiator-Modified Electrodes

5.2.1 Poly(N-ferrocenemethyl-N-allylimidazolium Bromide)

An amount of 3.5 mM of the monomer N-ferrocenylmethyl-N-allylimidazolium bromide in MeCN was added to a dried beaker together with 4 µM of the catalyst (CuCl), 1.4 µM of deactivator (CuCl$_2$) and 1.2 µM of complexing agent (N,N,N',N'',N''-pentamethyldiethylenetriamine (PMDETA)). The solution was deoxygenated for 20 minutes. The initiator-modified electrodes were immersed into the reaction mixture for 2 hrs at 50° C. under argon flow.

After 2 hrs of reaction, the electrodes were extracted from the reaction medium and thoroughly rinsed and sonicated in MeCN for 10 minutes. Then the modified electrodes were suffered 10 cycles of cyclic voltammetry in 0.1 M of tetrabutylammonium perchlorate (from 0 V to 0.8 V vs SCE) in order to eliminate the monomer weakly adsorbed at the surface.

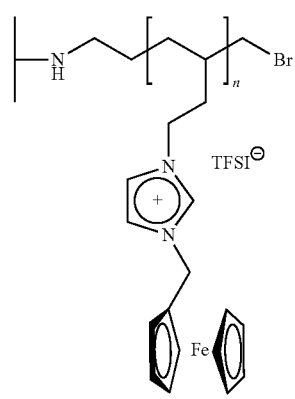

5.2.2. Polymer in Bloc: Poly(N-ferrocenemethyl-N-(methacryloyloxy Ethyl) Imidazolium and poly(N-vinyl-N-anthroquinoneimidazolium)

The first layer was performed by using SI-ATRP with Poly(FcILs) or Poly(VAQILs) followed by a second SI-ATRP using Poly(VAQILs) or Poly(FcILs) under the same conditions described in the previous part.

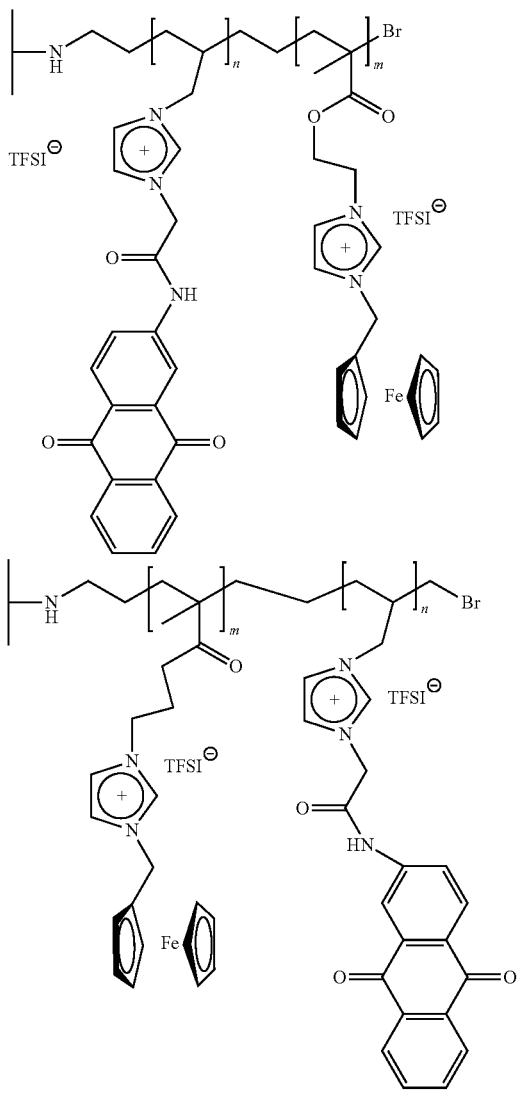

5.2.3. Poly(N-(3'-anthroquinoneferrocenyl-1-methyl)-N-allylimidazolium Bromide)

The in situ preparation of the monomer solution N-(3'-anthraquinoneferrocenyl-1-methyl)-N-allylimidazolium bromide was described previously (c.f 4). Then the others products for the polymerization were added to obtain a final solution containing 0.1 mM of CuCl, 28 µM of CuCl$_2$, 0.05 mM of PMDETA. The reaction mixture was deoxygenated for 20 minutes. The surface-initiated electrodes were immersed into the mixture for 2 hrs. at 50° C. under argon flow.

After 2 hrs of reaction, the electrodes were extracted from the reaction medium and thoroughly rinsed and sonicated in MeCN for 10 minutes. Then the modified electrodes were suffered 10 cycles of cyclic voltammetry in 0.1 M of tetrabutylammonium perchlorate (from −1.2 V to 0.8 V vs SCE) in order to eliminate the monomer weakly adsorbed at the surface.

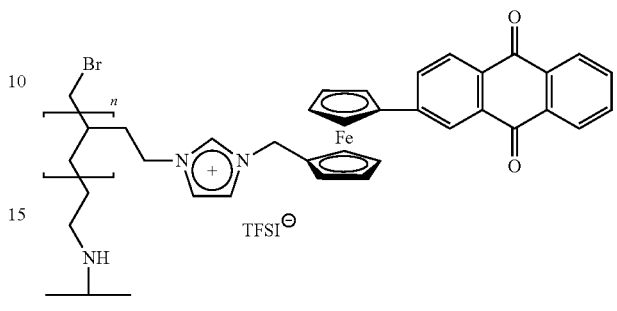

Example 6: Electrochemical Characterization of Imidazolium Based Molecules and of Imidazolium Based Polymeric Ionic Liquids of the Invention

6.1. Electrochemical Characterization of the Ionic Liquid N-cobaltoceniumacetyl-N'-vinylimidazolium in Solution

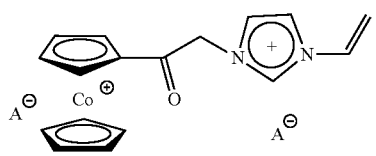

Figure 17:
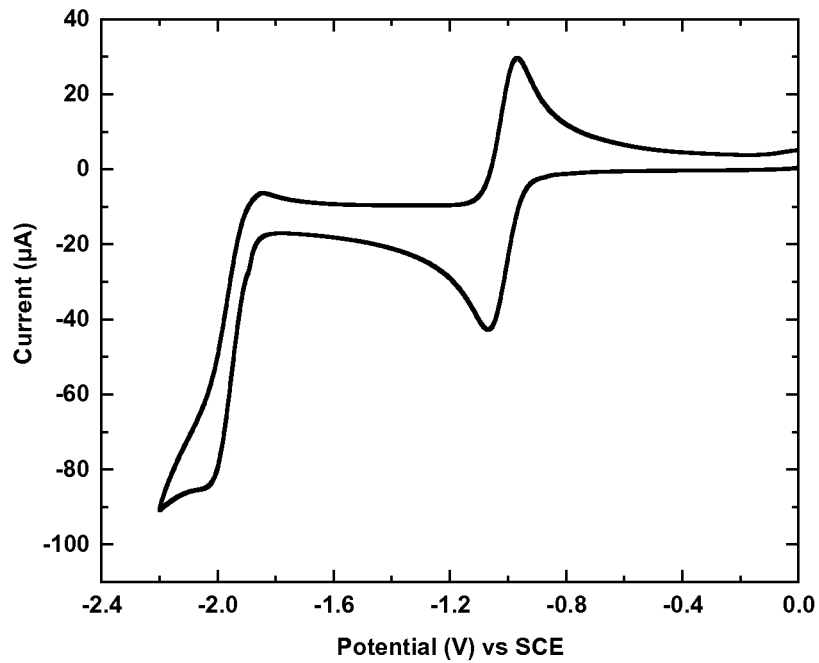
FIG. 17: CV of 1 mM of N-cobaltoceniumacetyl-N'-vinylimidazolium in MeCN containing 0.1 M of $LiClO_4$-imidazolium based molecule in solution using a GC electrode (example 6.1).

The above ionic liquid containing a cobaltocene moiety was polymerized using SI-ATRP on a glassy carbon electrode. CV measurements are shown in FIG. 17.

6.2. Electrochemical Characterization of Poly(N-cobaltoceniumacetyl-N'-vinylimdazolium) Immobilized on a Glassy Carbon Electrode A glassy carbon electrode was modified by immobilizing a polymeric ionic liquid on its surface using SI-ATRP with the monomeric cobaltocene-containing ionic liquid depicted below.

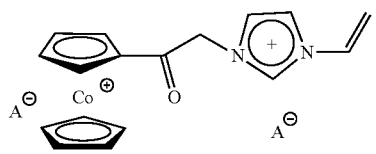

Figure 18:
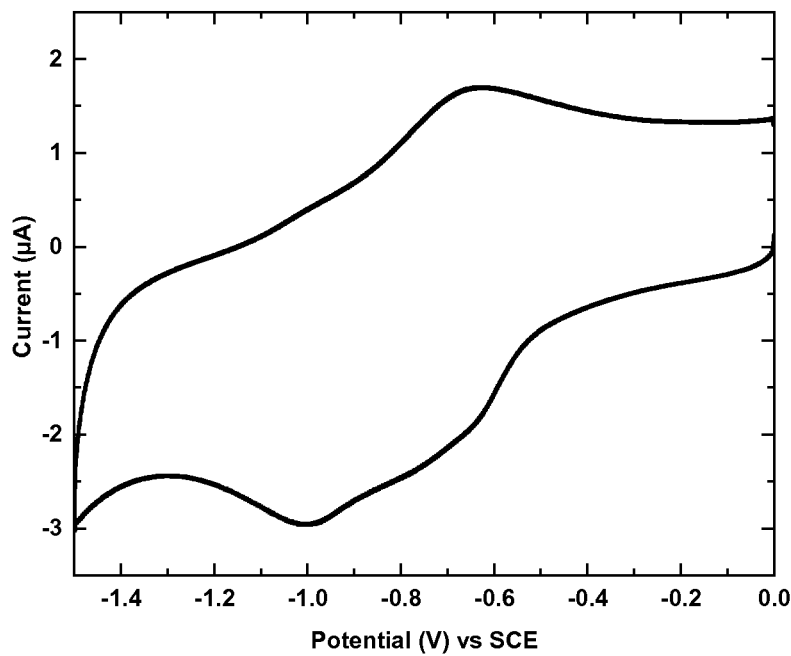
FIG. 18: CV of Poly(N-cobaltoceniumacetyl-N'-vinylimidazolium) modified GC electrode in MeCN containing 0.1 M $LiClO_4$ (example 6.2).

CV measurements are shown in FIG. 18.

6.3. Electrochemical Characterization of Poly(1-allyl-1'-2-(1-ferrocenylmethyl-1H-imidazol-3-ium-3-yl)acetyl)-[4,4'-bipyridine]-1,1'-diium) Immobilized on a Glassy Carbon Electrode A glassy carbon electrode was modified by immobilizing a polymeric ionic liquid on its surface using SI-ATRP with the monomeric viologen-containing ionic liquid depicted below.

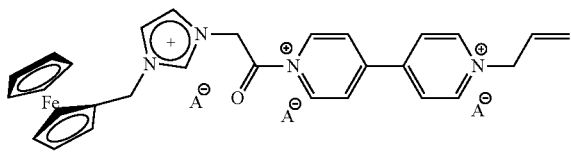

Figure 19:
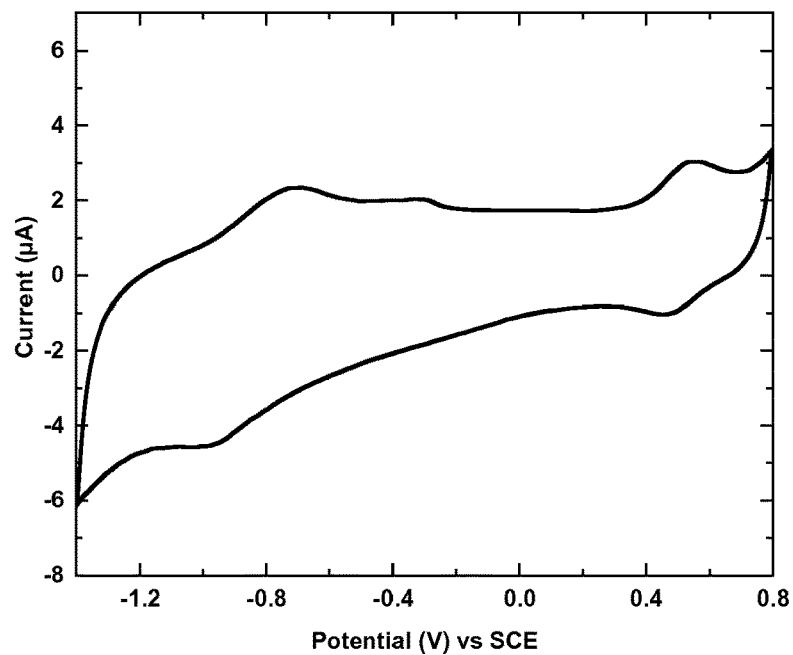
FIG. 19: CV of Poly(1-allyl-1'-(2-(1-ferrocenylmethyl-H-imidazol-3-ium-3-yl)acetyl)-[4,4'-bipyridine]-1,1'-diium) modified GC electrode in MeCN containing 0.1 M LiClO$_4$ (example 6.3).

CV measurements are shown in FIG. 19.

Example 7: Influence of the Medium on the Electrochemical Properties of an Imidazolium Based Molecule and Imidazolium Based Polymeric Ionic Liquid of the Invention Structure of ionic liquid used for the electrochemical tests (First 5 lines of Table 1). The concentration of electroactive ionic liquid is fixed at 1 mM for the entire test.

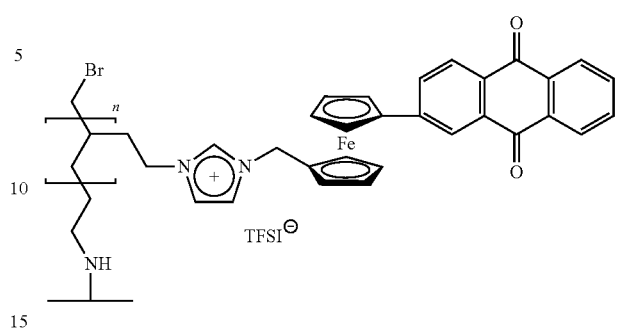

The results are presented in Table 1 below.

TABLE 1

Comparison of electrochemical properties of electro-active ionic liquid in different medium (GCE = glassy carbon electrode).

| | Experiment number # | Medium | $E°_{(Fc)}$ (V) | $E°_{(AQ)}$ (V) | $I_{a(Fc)}/I_{a(AQ)}$ | $E°_{(Fc)} - E°_{(AQ)}$ (V) | Relative Capacitance $C_{mod}/C_{nue}$ |
|---|---|---|---|---|---|---|---|
| Electroactive Ionic liquid in solution | 1 | EMITFSI | 0.457 | −0.434 | 2.1 | 0.891 | — |
| | 2 | 0.1M EMITFSI/ACN | 0.559 | −0.735 | 1.2 | 1.294 | — |
| | 3 | 0.1M HTFSI/ACN | 0.463 | 0.120 | 1.3 | 0.344 | — |
| | 4 | 0.1M EImHTFSI/H$_2$O | 0.422 | −0.583 | 0.6 | 1.005 | — |
| | 5 | 0.1M LiClO$_4$/ACN | 0.469 | −0.750 | 1.04 | 1.219 | — |
| Grafted Electroactive Ionic liquid Polymer on GCE surface | 6 | EMITFSI | 0.473 | −0.590 | 2 | 1.064 | 9.6 |
| | 7 | 0.1M HTFSI/H$_2$O | 0.318 | −0.204 | 1.0 | 0.521 | 30.9 |
| | 8 | 0.1M HTFSI/ACN | 0.437 | −0.036 | 1.7 | 0.401 | 15.8 |
| | 9 | 0.1M EImHTFSI/H$_2$O | 0.485 | −0.587 | 0.7 | 1.071 | 9 |
| | 10 | 0.1M EMITFSI/ACN | 0.485 | −0.586 | 1.4 | 1.063 | 14.1 |
| | 11 | 0.1M LiClO$_4$/ACN | 0.442 | −0.910 | 1.2 | 1.352 | 12.1 |

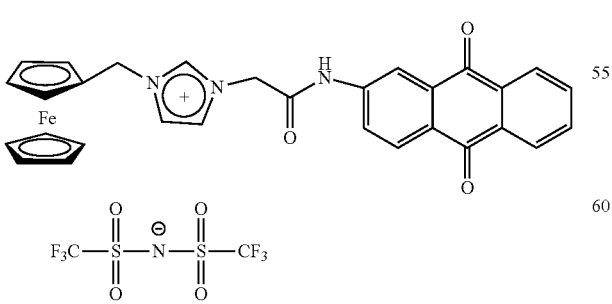

Structure of the modified electrode with polymer brushes (last six lines of Table 1).

CONCLUSIONS

From the anodic current $I_a$, the ratio $I_a(Fc)/I_a(AQ)$ (see column 6 of Table 1) gives the information on the electrochemical response of ferrocene (Fc) and anthraquinone (AQ) of polymer brushes. The variation of this value may be due to the presence of imidazolium ring. A low value of this ration indicates that the electrochemical response of ferrocene is hindered. Otherwise, a high value indicates that the presence of imidazolium ring and ferrocene group modifies the solvation of anthraquinone part, following by a decrease of anthraquinone signal. In conclusion, from this ratio, we can obtain some information about the kinetic of the charge transfer and the influence of the chemical environment nearby the molecule for each solvent.

The gap between the formal potential of ferrocene and anthraquinone $E°_{(Fc)}$-$E°_{(AQ)}$ (see column 7 of Table 1) indicates the influence of chemical environment (solvent) on the thermodynamical properties of the studied systems. For the immobilized electro active ionic liquid polymers containing together ferrocene and anthraquinone, this gap gives a magnitude of the voltage obtained for an organic batteries based on these active materials.

Relative capacitance is a measurement of capacity for immobilized ionic liquids polymers to stock energy via electrochemical double layer (properties of super capacitors). This relative capacitance (see column 8 of Table 1), measured in the potential window in which no redox process can be occurred (potential range in between $E°_{(Fc)}$ and $E°_{(AQ)}$), is equal to the ratio between the capacitive current (non-faradic) in presence of immobilized ionic liquid polymers and the capacitive current in absence of immobilized ionic liquid polymers (Bare electrode). (Last 6 lines of Table 1).

Figure 12:
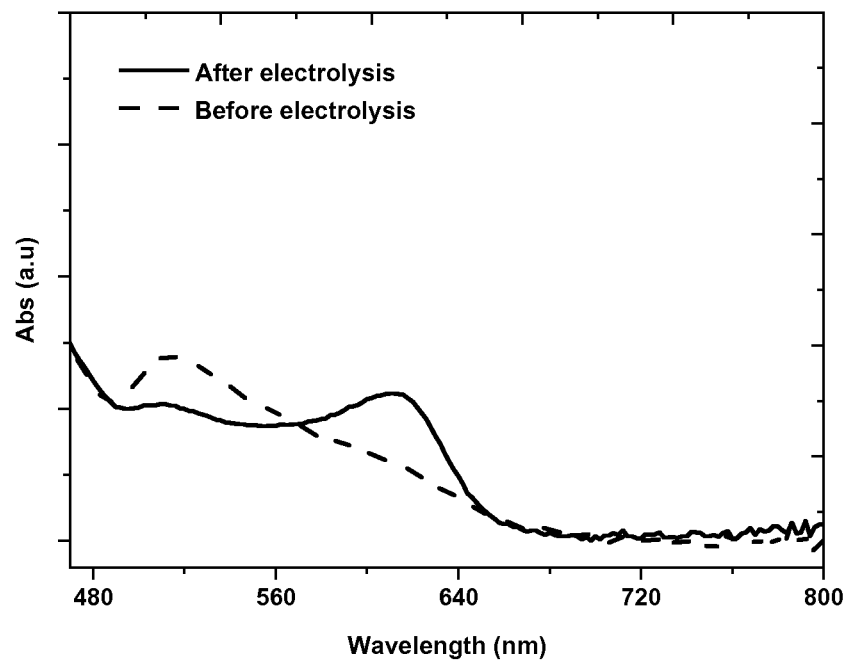
FIG. 12: UV-Visible spectrum of the aqueous solution containing 1 mM of N-Ferrocenylmethyl-N-ethyleneamido-anthraquinoneimidazolium TFSI and 0.1 M of HTFSI before (dash line) and after (solid line) electrolysis.
Figure 13:
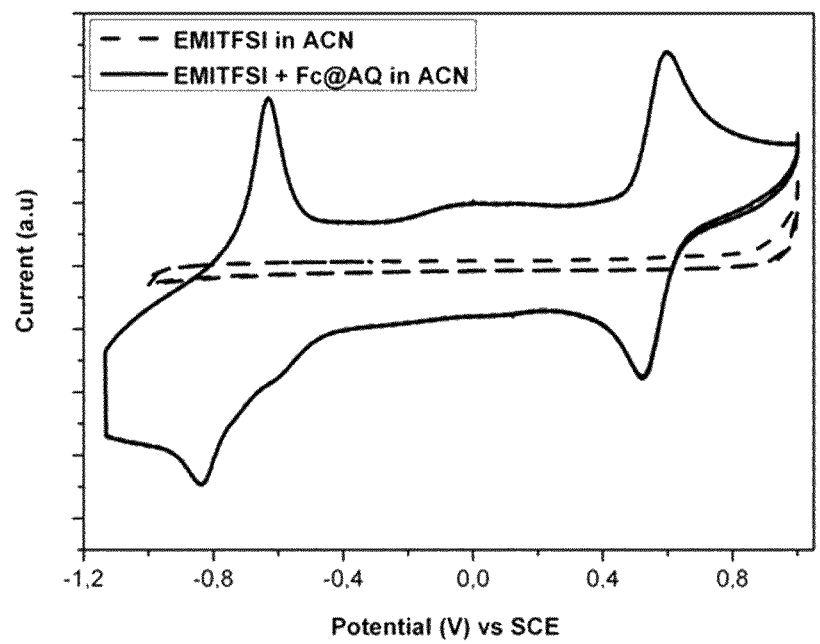
FIG. 13: Cyclic voltammetry response of carbon electrodes in 0.1 M of EMITFSI in MeCN. Absence (dash line) and presence (solid line) of electroactive molecule (1 mM de N-Ferrocenylmethyl-N-ethyleneamidoanthraquinoneimidazolium). Experiment corresponding to the 2nd line of table 1 of example 2.

FIG. 12 shows the UV-Visible spectrum of the solution containing 1 mM of N-Ferrocenylmethyl-N-ethyleneamido-anthraquinone-imidazolium TFSI and 0.1 M of HTFSI in distilled water before (dash line) and after (solid line) electrolysis.

Figure 14:
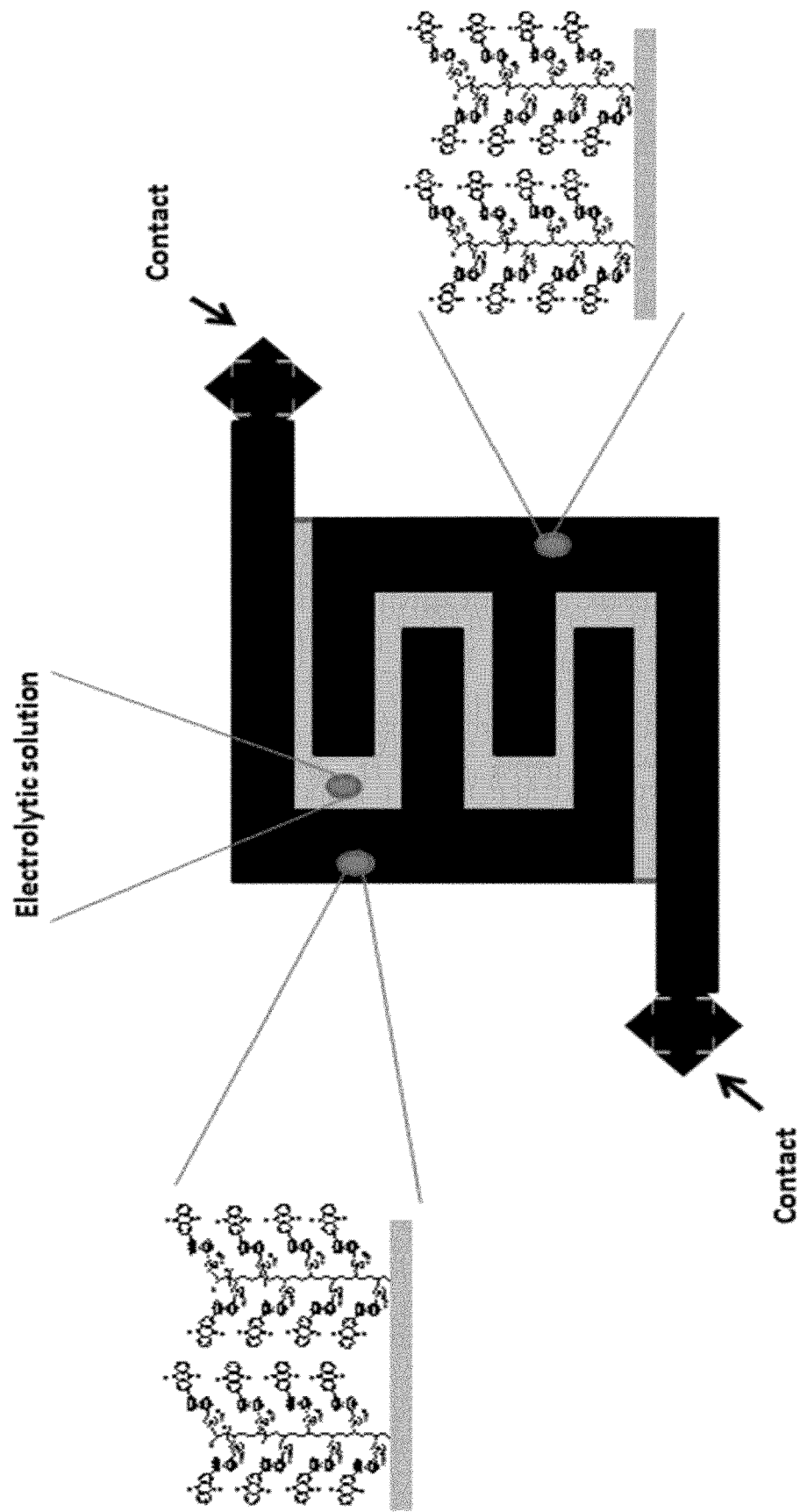
FIG. 14: Planar membraneless interdigitated electrodes for energy storage (supercapacitor or organic battery).

Interdigitated electrodes (as depicted for instance in FIG. 14) can be fabricated with classical technologies as serigraphy, lithography and the printing could be performed on rigid or flexible substrates. Various electrode materials can be used (carbon, nickel, gold, . . . ) depending on the application and the chosen elaboration technique.

As the nature of active materials (electroactive ionic liquid polymer) is identical on positive electrode and negative electrode, the grafting on both electrodes can be performed simultaneously. For the electrografting process, these 2 electrodes can be directly connected in order to get a unique working electrode for the electrografting of initiator layer (c.f 5.1). Then SI-ATRP can be performed.

A material which can insure the ionic conduction between positive electrode and negative electrode can be physically deposited on both electrodes. There are multiple choices on the chemical nature of the ionic conducting material: electrolytic solution (solvent+ions), ionic gels, Ionic liquids, and ionic liquids polymers. Encapsulation of the whole system allows us to get an isolated device.

Example 8. Electrochemical Characterization of Quaternary Ammonium-Based Molecules and of Quaternary Ammonium-Based Polymeric Ionic Liquids of the Invention 8.1. Electrochemical Characterization of the Ionic Liquid N-allyl-N,N-dimethyl-N-ferrocenylammonium in Solution

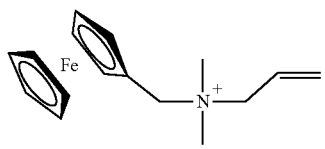

Figure 20:
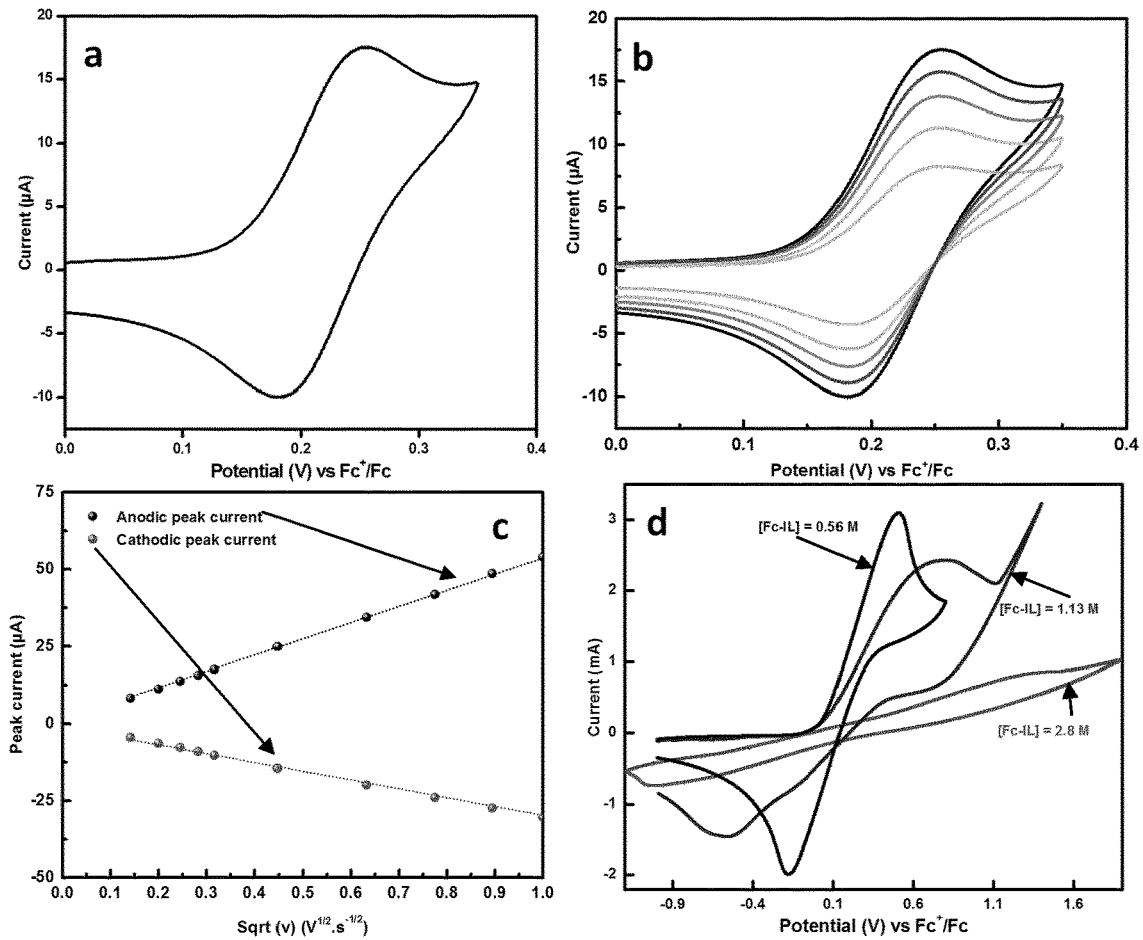
FIG. 20: (a) Cyclic voltammetry recorded at glassy carbon (GC) electrode of Fc quaternary ammonium at 1 mM in acetonitrile electrolytic solution, scan rate 0.1 V/s. (b) CV's at different scan rates from 0.02 to 0.1 V/s. (c) Plots of the peaks current as function of $v^{1/2}$. (d) CV's of undiluted redox monomer ionic liquid and diluted in acetonitrile, scan rate 0.1 V/s (example 8.1).

The quaternary ammonium bromide bearing ferrocene and vinyl group was synthesized following the reaction scheme presented previously. The electrochemical behavior of the synthesized molecule was studied by cyclic voltammetry. FIG. 20 exhibits a reversible signal at 0.22 V vs $Fc^+/Fc$ corresponding to ferrocenyl ammonium redox couple. Besides that, the investigation of the evolution of the redox signal as function of the scan rate shows linear relation between the peak current and $v^{1/2}$, suggesting that the system is under diffusion control. This linearity leads to determine the diffusion coefficient of the redox molecule using the Randles-Sevčik equation and a value of $7.65 \times 10^{-6}$ cm$^2$/s was determined. This value is two times lower than that observed for ferrocene indicating that the diffusion of the ferrocenyl ammonium cation is slower than that of neutral ferrocene. Thus, having a positive charge linked to Fc provokes electrostatic interactions with other ions present in the electrolytic solution, resulting in lower diffusion coefficient.

For undiluted ionic liquid the estimated concentration is around 2.8 M and the recorded CV (see FIG. 20) shows a weak oxidation and reduction peaks with large peak potential separation due to a large solution resistance (IR ohmic drop) and the high viscosity. However, after addition of small amount of acetonitrile the electrochemical response exhibits more defined oxidation and reduction peaks and the redox signal is well defined at a concentration of 0.56 M. This experiment evidences the possibility to record the electrochemical signal of ferrocene based ammonium ionic liquid at high concentration 1.1 and 0.56 M.

8.2. Electrochemical Characterization of Poly(N-allyl-N,N-dimethyl-N-ferrocenylammonium) Immobilized in a Glassy Carbon Electrode The previously synthesized quaternary ammonium-based molecules bear vinyl group that could be engaged for polymerization. The SI-ATRP process is based on the immobilization of thin initiator layer, which could be performed using the oxidative grafting of primary amine yielding to a bromide terminated layer. Following that, the modified electrode with the initiator layer was immersed in solution containing the redox ionic liquid monomer and all the necessary reagents, for the SI-ATRP, were added.

Scheme illustrating the SI-ATRP procedure:

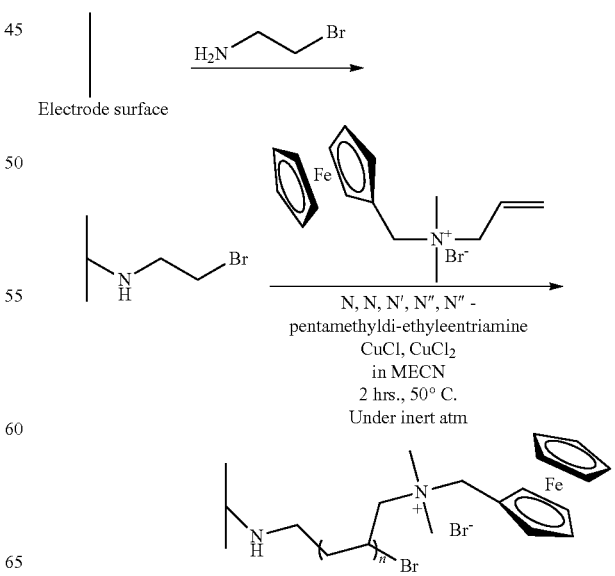

Figure 21:
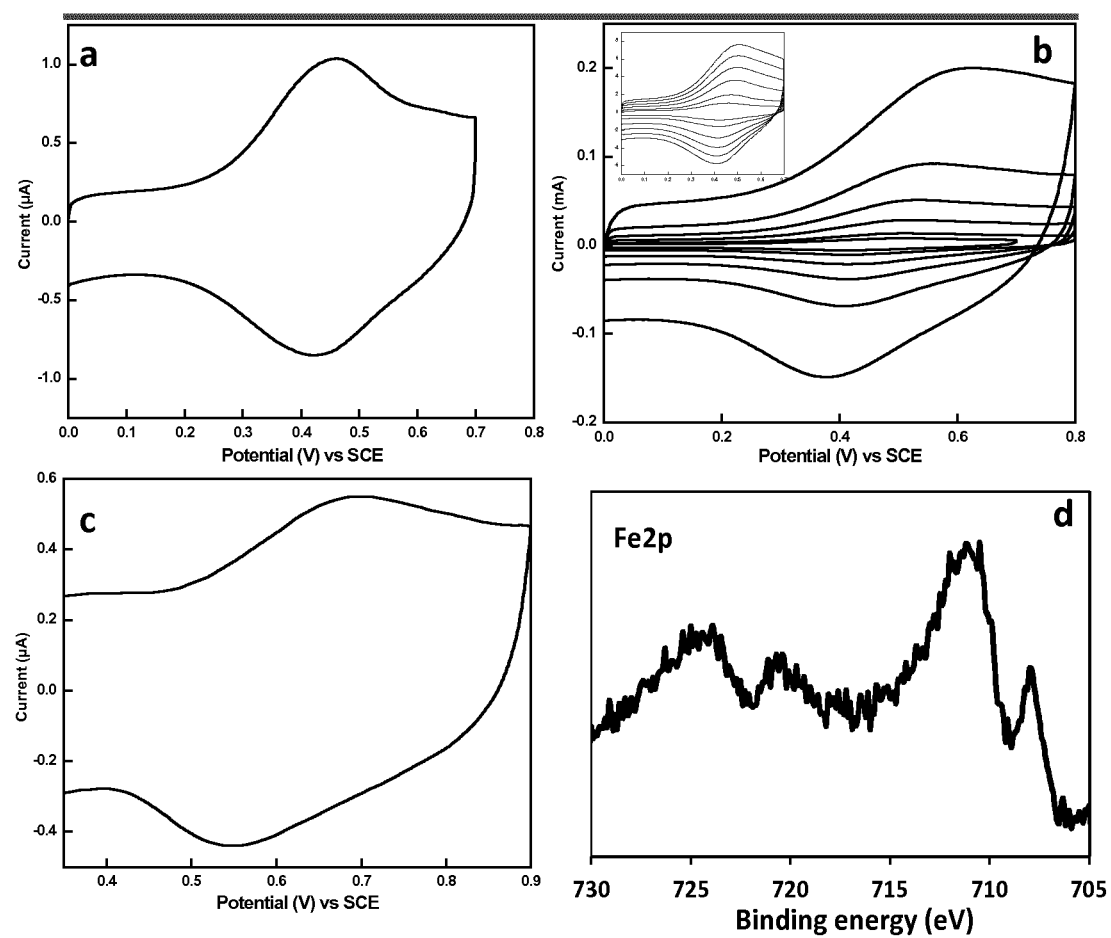
FIG. 21: (a) Cyclic voltammetry response of the attached polymer, Poly(FcIL) onto GC electrode in acetonitrile solution containing 0.1 M Bu$_4$NPF$_6$, 0.1 V/s. (b) CV's of the GC polymer electrode recorded at different scan rate from 1 to 50 V/s (the inset represents the CV's recorded between 0.1 and 1 V/s). (c) CV responses of the polymer In acetonitrile free of electrolyte. (d) Fe(2p) XPS high resolution spectrum recorded on the polymer (example 8.2).

After the SI-ATRP process, the electrode was rinsed, sonicated and then electrochemically characterized. FIG. 21 displays the electrochemical response of the poly(ferrocenyl) based quaternary ammonium, Poly(FcIL), deposited onto GC electrode in acetonitrile electrolytic solution. The curve shows the presence of a well-defined reversible redox system at 0.45 V vs SCE attributed to the redox couple $Fc^+/Fc$ within the polymer backbone. This electrochemical signal confirms the success of the SI-ATRP polymerization using Fc quaternary ammonium monomer. Furthermore, the electrochemical responses of the polymer was performed at different scan rates. This investigation clearly show a linear variation of the peak current versus the scan rate suggesting the presence of non-diffusive process. Besides that, for higher scan rate (above 1 V/s) the redox signal of ferrocene starts to deviate from fully reversible system indicating that the system is limited by the electron transfer rate. The linear dependency of the Ep vs Log(v) leads to determine the apparent electron transfer rate constant which is found to be around 120 $s^{-1}$ highlighting the presence of fast electron transfer of the attached ferrocenyl groups. Several parameters could explain the fast electron transfer rate including the structure of the polymer in the form of brushes, the short distance of the initiator and the composition of the polymer which includes a positive and negative charges. Indeed, the presence of ions within the film may enhance the electron hopping process and consequently the electron transfer rate.

Poly(ionic liquids) refer to a subclass of polyelectrolytes that contain an ionic liquid (IL) species in each monomer repeating unit, connected through a polymeric backbone to form a macromolecular structure. They are considered as interesting materials for electrochemical applications (batteries, supercapacitor, and solid electrolyte) thanks to the presence of ionic species inside the structure. Having these characteristics, the electrochemical responses of the generated polymer was performed in acetonitrile solution in the absence of supporting electrolyte (FIG. 21c). The curve shows clearly the presence of oxidation and reduction waves corresponding to the $Fc^+/Fc$ redox couple despite the absence of supporting electrolyte. Compared to the CV in FIG. 21a the peaks currents are slightly lowered and the peaks potentials are shifted to more positive potential. This result suggests that the generated polymer brushes act as self-supporting electrolyte thanks to the presence of cation and the anion within the film and that the oxidation/reduction of the Fc units is not limited by the rate of counter-ion migration into/out of the polymer.

Figure 22:
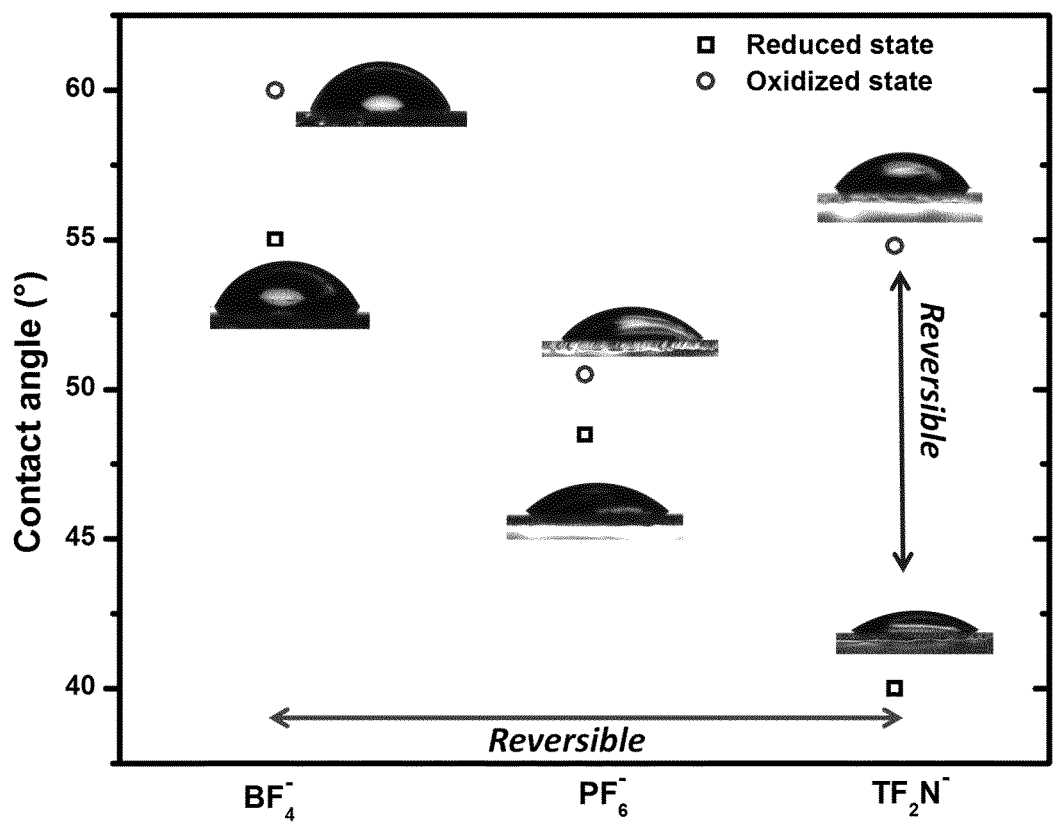
FIG. 22: Contact angles obtained for Poly(N-allyl-N,N-dimethyl-N-ferrocenylommonium) deposited onto ITO (indium tin oxide) substrate before and after electrochemical oxidation and anions exchanges (example 8.2).

The modulation of the properties of interfaces such as the variation of the wettability is of high interest. The best advantage of using electrochemistry as an external stimulus is its ability to switch the surface oxidation state in a few second or less. FIG. 22 shows the contact angle (=CA) for the polymer attached onto ITO (indium tin oxide) substrate before and after electrochemical oxidation. Interestingly, after electrochemical oxidation the CA decreases suggesting the presence of hydrophilic surface. Besides the electrochemical modulation of the CA, the latter could be also tuned by anion exchange. Both processes for contact angle variation are fully reversible. The combination of the electrochemical and anion exchange leads to drive the transition between hydrophobicity and hydrophilicity of the surfaces.

8.3. Electrochemical Characterization of the Ionic Liquid 1-allyll-1'-((N,N-dimethyl-N-ferrocenylmethylammonium)acetyl)-[4,4'-bipyridine]-1,1'-diium in Solution

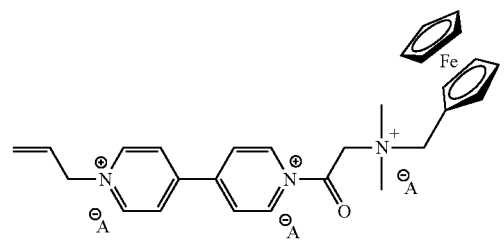

Figure 23:
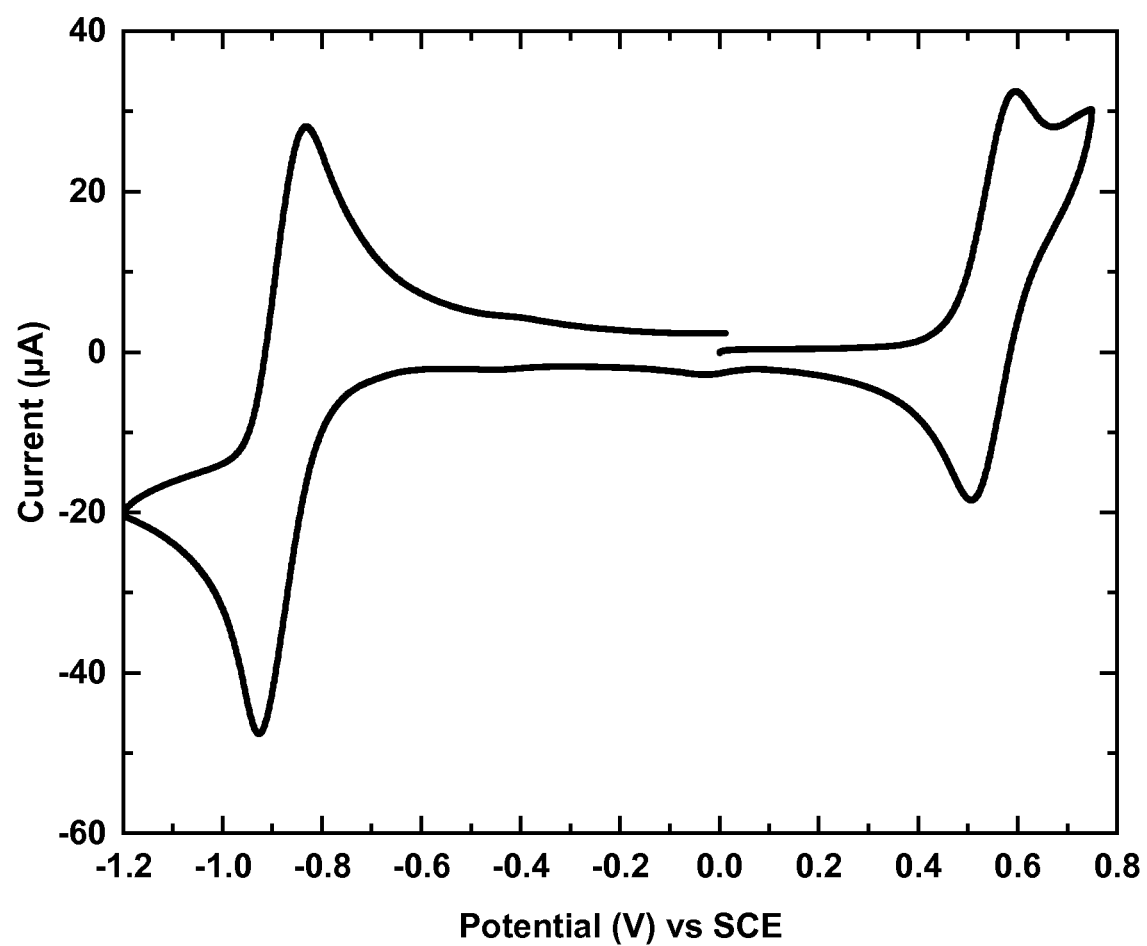
FIG. 23: Cyclic voltammetry response of 1 mM of 1-allyl-1'-((N,N-dimethyl-N-ferrocenylmethylammonium)-acetyl)-[4,4'-bipyridine]-1,1'-diium in MeCN containing 0.1 M of LiClO$_4$-GC electrode-quaternary ammonium based molecule in solution (example 8.3).

The results obtained are shown in FIG. 23.

Example 9. Further Examples of the Ionic Liquids of the Invention

Chemical

All the starting compounds were commercially purchased from Aldrich and used as received. LiTFSI, ferrocenylmethyl-trimethylammonium iodide, bromoethane, 4-methoxyphenol, tetrabutylammonium tetrafluoroborate (Bu4NBF4) were purchased from Alfa. Solvent such as N,N-dimethylformamide, acetonitrile, ethanol, dichloromethane, THF, ethanol, ethylacetate, diethylether, DMF were purchased from Aldrich. Ultrapure water (Millipore, resistivity 18.2 MΩ·cm) was obtained in the laboratory.

Apparatus

1H-NMR (400 MHz) and 19F-NMR (125.75 MHz) spectra have been recorded on a BRUKER AVANCE DRX 400 spectrometer.

Chemical shifts (d) are expressed in ppm related to the tetramethylsilane (TMS) signal. Coupling constants are expressed in Hz. 1H-NMR assignments are given as follows: d (multiplicity, coupling constant, number of protons involved, assignment).

Electrochemical Measurements

For the electrochemical experiments, a conventional three-electrode cell was used. Platinum wire was used as auxiliary electrode. Saturated calomel electrode, SCE, was used as reference electrode. Glassy carbon electrode GCE (3 mm diameter) was used as working electrode. Prior to use the working electrodes were polished using successively SiC-paper 5 μm (Struers) and DP-Nap paper 1 μm (Struers) with Al2O3 0.3 μm slurry (Struers). After polishing the electrode was thoroughly rinsed with ultrapure water (18.2 MΩ cm). Before any electrochemical measurements the solutions were deoxygenated by bubbling argon gas for 15 minutes. During the experiment the electrochemical cell remains under argon. The potentiostat used in this study was CHI 660C (CH Instruments, made in TX, USA).

General Protocol of Ion Exchange

The imidazolium derivative (1 equiv., 50 mmol) and the inorganic salt source of the cationic species (1.2 equiv., 60 mmol) dissolved in 20 ml of deionized water were mixed together in a round-bottom flask. Then, the reaction was stirred overnight at the indicated temperature. After return to room temperature, the two phases were separated. The ionic liquid is in the organic phase which was washed with water thrice, then mixed with dichloromethane and charcoal. This suspension was purified through aluminium oxide layer (3 cm thickness), then dried over magnesium sulphate. The solvent was removed by rotavapor and trace of water was taken off by vacuum pump overnight.

9.1. Nitrophenyl-imidazolium Based Ionic Liquid

N-(4-nitrophenylethyl)imidazole

Under argon, imidazole (26.08 mmol, 1.2 equiv., 1.77 g) was added to 100 ml of distilled THF. Sodium hydride 60% in oil (27.16 mmol, 1.25 equiv., 1.09 g) was then introduced to the solution. The reaction mixture was stirred for 1.5 hrs at room temperature. The solution of 1-(2-Bromoethyl)-4-nitrobenzene (27.73 mmol, 1 equiv., 5.0 g) in distilled THF (50 ml) was then added to the flask which was then heated at 50° C. Two phases had appeared after 5 hrs of reaction, and the heating was continued during 31 hr more. After return to room temperature, the reaction solution was hydrolyzed by 10 mL of distilled water. The solvent was removed and the crude product was dissolved in dichloromethane. The organic phase was washed with distilled water (100 mL×3 times) then dried over magnesium sulfate. The solvent was then evaporated. Intermediate 1 is obtained as a Yellow-brown crystalline powder in 83% yield (3.94 g).

$^1$H NMR (DMSO): 3.17 (t, 7.0 Hz, 2H, CH$_2$Ar), 4.26 (t, 7.0 Hz, 2H, CH$_2$N), 6.83 (s, 1H, NCH), 7.15 (s, 1H, NCH), 7.43 (d, 8.8 Hz, 2H, $C_{Ar}H_{metaNO2}$), 7.49 (s, 1H, NCHN), 8.14 (d, 8.8 Hz, 2H, $C_{Ar}H_{orthoNO2}$).

N-(4-nitrophenylethyl)-N-(2-aminoethyl)imidazolium Bromide

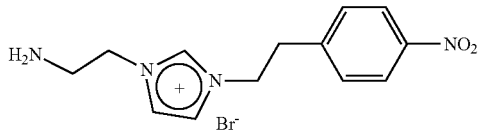

A two-neck flask containing dry ethanol (30 ml) was added N-(4-nitrophenylethyl) imidazole (18.2 mmol, 1 equiv., 3.94 g) under argon atmosphere. The mixture was stirred for 15 minutes then was added 2-bromoethylamine hydrobromide (18.2 mmol, 1 equiv., 3.72 g). After 24 hrs of reflux at 50° C. and return to room temperature, ethanol was evaporated to form crude ionic liquid in viscous oil. The crude ionic liquid was washed with ethylacetate (20 ml×5 times), then was dried under vacuum at 50° C. The purity of ionic liquid was checked by thin layer chromatography using dry ethanol. This ionic liquid is soluble in water and ethanol. The title compound is obtained as a viscous orange liquid in 61% yield (1.2 g).

$^1$H NMR (DMSO): 3.27 (m, 4H, CH$_2$—Ar and NH$_2$—CH$_2$CH$_2$—N), 3.66 (t, 6.0 Hz, 2H, —CH$_2$—NH$_2$), 4.44 (t, 7.2 Hz, 2H, ArCH$_2$CH$_2$—N), 7.36 (d, 1.2, 1H, NCH), 7.49 (d, 8.8 Hz, 2H, $C_{Ar}H_{metaNO2}$), 7.55 (d, 1.6 Hz, 1H, NCH), 8.17 (d, 8.8 Hz, 2H, $C_{Ar}H_{orthoNO2}$), 8.49 (s, 1H, NCHN).

Example 10. Monolayer of Nitrophenyl Containing Ionic Liquid of the Invention

10.1. Experimental Section

Tetrabutylammonium tetrafluoroborate (Bu$_4$NBF$_4$) and tetrabutylammonium bromide purchased from Aldrich (electrochemical analysis grade ≥99%) were used as supporting electrolyte at a concentration 0.1 M for each. Dry acetonitrile (ACN) was purchased from Fulka and stored over molecular sieves. 2-(4-aminophenyl)acetic acid, perchloric acid (HClO$_4$), sodium nitrite (NaNO$_2$), ferrocene and dopamine redox probes were purchased from Sigma-Aldrich. The electroactive ionic liquid, 1-ferrocenylethyl-3-methylimidazolium bis(trifluoromethylsulfonyl)imide ([FcEMIM][TFSI]), and N-(2-aminoethyl)-N-(4-nitrophenylethylimidazolium) bromide were synthesized following the process described in example 3.

For the electrochemical experiments, a conventional three-electrode cell was used. Platinum wire was used as auxiliary electrode, saturated calomel electrode SCE as reference electrode. Glassy carbon electrode GCE (3 mm diameter) and microelectrode carbon fiber (7 μm diameter) were used as working electrodes. Prior to use the working electrodes were polished using decreasing size of diamond pastes. The potentiostat used in this study was CHI 660C (CH Instruments, made in USA).

10.2. Results and Discussion

10.2.1. Redox Properties of Nitrophenyl-Imidazolium Based Ionic Liquid Modified Electrode, Immobilization of Nitrophenyl-Imidazolium Based Ionic Liquid In this example, surface modification with an imidazolium based-ionic liquid bearing redox functionality onto carbon electrodes has been investigated. The electrochemical oxidation of N-(2-aminoethyl)-N-(4-nitrophenylethyl-imidazolium) bromide onto glassy carbon electrode conduces to the immobilization of nitrophenyl-imidazolium layers. The presence of this layer was evidenced by electrochemical characterization that thanks to the presence of the redox active nitrophenyl moieties. Furthermore, the modified electrode was then characterized by electrochemical methods in the presence of various redox probes, from which it was concluded that the generated layer was very thin and/or less dense layer probably due to the specific arrangement of the positively charged imidazolium.

Figure 15:
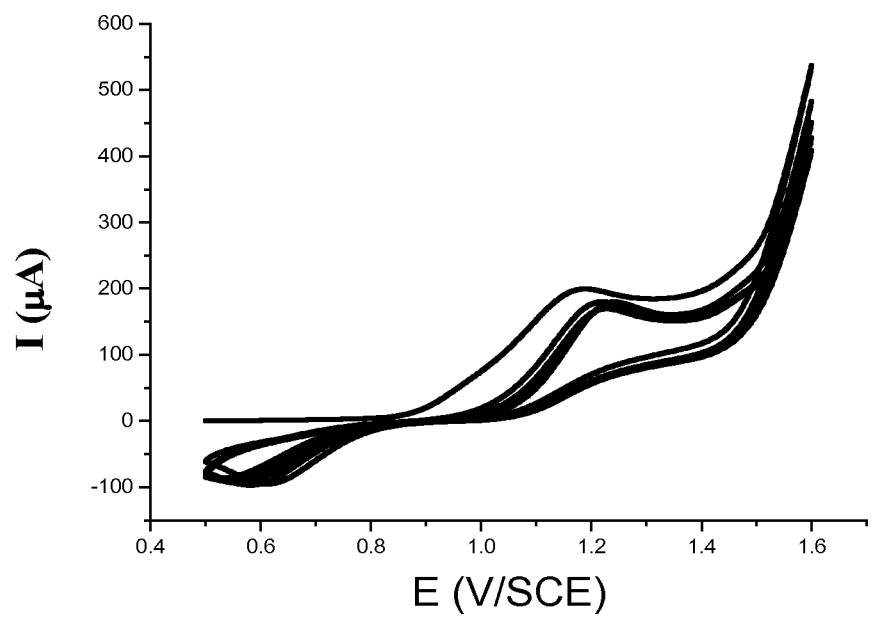
FIG. 15: Cyclic voltammetry response of oxidative grafting of N-2-aminoethyl)-N-(4-nitrophenylethylimidazolium) bromide onto glassy carbon electrode, scan rate 0.1 V/s (example 4).

The immobilization of the nitrophenyl containing ionic liquid of the invention onto the carbon electrode was obtained by the electrochemical grafting through the oxidation of the primary amine based on an ionic liquid derivative (see Scheme 4.1.). The voltammetry of GC electrode, in CAN (acetonitrile) solution containing 6×10$^{-3}$ M N-(2-aminoethyl)-N-(4-nitrophenylethylimidazolium) bromide and 0.1 M NBu$_4$Br, exhibits an irreversible oxidation wave at a potential around 1.2 V vs SCE (see FIG. 15). This anodic peak corresponds to the oxidation of the amine group leading to the formation of the corresponding radical. During the oxidation process, aminyl radicals were generated in the vicinity of the electrode and react rapidly with the electrode surface. The peak current becomes smaller after few cycles suggesting the formation of thin film attached onto the electrode surface. In this example, the grafting was realized by performing five cycles of CV (Cyclic Voltammetry).

Scheme 4.1.
Grafting of nitrophenyl-imidazolium nased ionic liquid

+

-continued

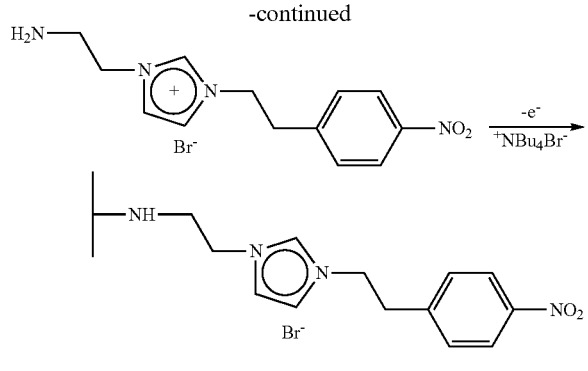

10.2.2. Electrochemical Response of Modified Electrode

After the oxidative grafting process, the electrode was rinsed and sonicated in acetonitrile solution and transferred to acidic solution. The CV recorded on modified carbon electrode in the de-aerated electrolytic solution is shown in FIG. 16.

The data show the presence of an irreversible reduction wave, at potential $E_p=-0.43$ V vs SCE, very close to that of the reduction wave in nitrobenzene solution. The presence of this signal indicates that nitrophenyl (NP) groups are immobilized onto the electrode surface. During the reverse scan an anodic wave at $E_p=0.25$ V vs CE is observed. Upon the second scan the first irreversible reduction wave disappears and new reversible system appears with standard redox potential $E°=0.24$ V vs SCE. The potential peak separation of this system is around 20 mV indicating the presence of immobilized system onto the electrode surface. This reversible system has been attributed to the redox couple NHOH/NO. The presence of this system and the drastic decrease of the reduction wave during the second scan indicate that the grafted $NO_2$ groups are totally reduced (see Scheme 4.2.). The presence of the electrochemical signal of NP suggests the occurrence of the grafting of nitrophenyl-imidazolium moieties onto the carbon electrode.

Figure 16:
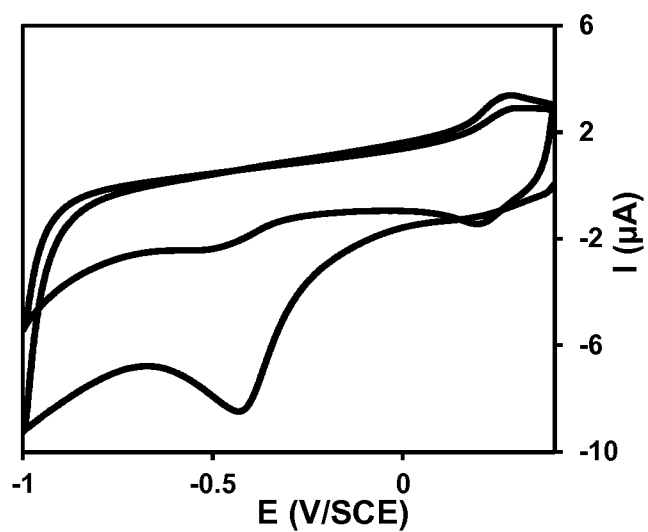
FIG. 16: Cyclic voltammetry response of carbon modified electrode in 0.1 M $H_2SO_4$. Scan rate 0.1 V·s⁻¹ (example 4).

The analysis of the electrochemical signal on FIG. 16 could provide estimation of the amount of the attached NP groups. The charge of the electroactive species could be measured and the surface concentration is calculated using the formula $\Gamma=Q/nFA$, where Q corresponds to the charge measured by integration of the two electrochemical signals, reduction wave at -0.43 and oxidation wave at 0.24 V vs SCE, n is the number of the electron, F is the faraday constant, and A represent the area of the electrode. As the reduction of NP groups in acidic media could exchange 4 or 6 electrons, corresponding to the formation of NHOH or $NH_2$, respectively, the surface concentration $\Gamma_{NP}$ was calculated by taking into account these two processes using the following equation:

$$\Gamma_{NP}=Q_{(NO2\rightarrow NH2)}/6FA+Q_{(NO2\rightarrow NHOH)}/4FA$$

Here, the average surface concentration of attached NP groups was found to be around $1.2\times10^{-10}$ mol·cm$^{-2}$. This value appears to be very close to the value reported in the literature, (from 1.4 to $6.4\times10^{-1}$ mol·cm$^{-2}$) or ($5\times10^{-10}$ mol·cm$^{-2}$) that suggests the formation of a dense monolayer onto the electrode surface.

Scheme 4.2.
Reaction in acidic medium of nitrophenyl group attached on carbon electrode surface

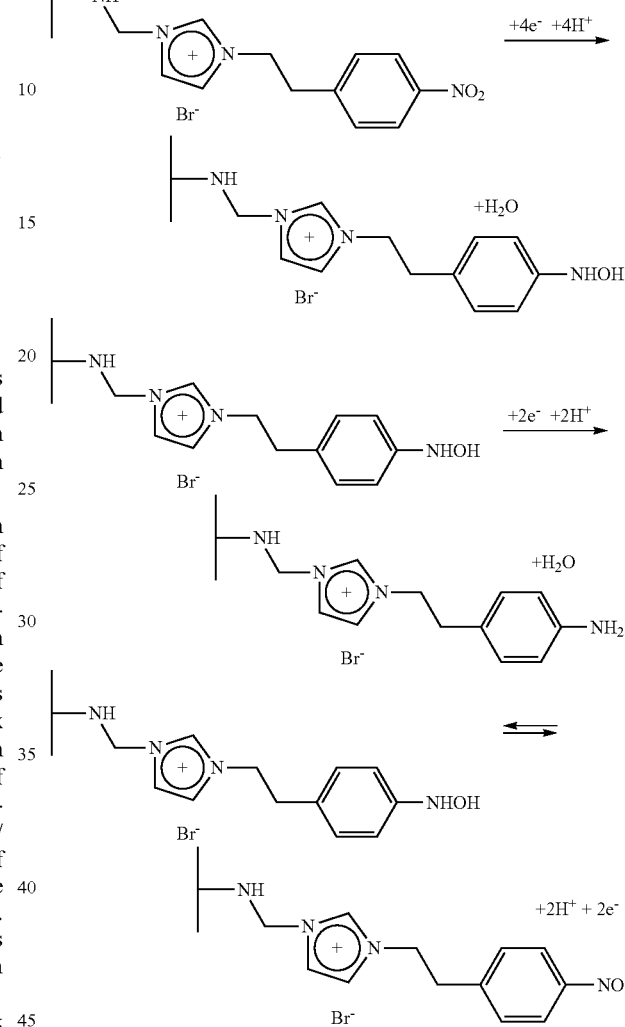

The invention claimed is:
1. An electro-active polymeric ionic liquid comprising imidazolium-based repeated units, each of said imidazolium-based repeated units comprising at least:
an imidazolium moiety associated with a negatively charged counter-ion,
a metallocene oxidizable group and/or a reducible group, the reducible group being selected from:
an anthraquinone derivative of formula (IV):

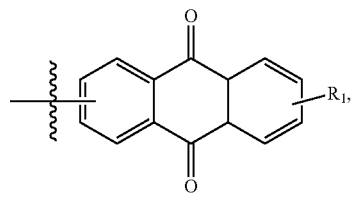

(IV)

with $R_1$ representing a hydrogen atom or a $C_1$-$C_6$-alkyl group, a viologen group of formula (V):

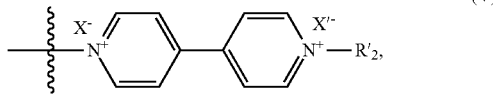

with $R'_2$ representing a hydrogen atom, a $C_1$-$C_8$ alkyl group or a $C_2$-$C_6$ alkenyl group, X and X' identical or different, and each independently representing a halogen group, or a metallocene reducible group.

2. The electro-active polymeric ionic liquid according to claim 1, wherein the polymeric ionic liquid presents:

imidazolium-based repeated units, each of said imidazolium-based repeated units comprising at least:

an imidazolium moiety associated with a negatively charged counter-ion, and a metallocene oxidizable group and imidazolium-based repeated units, each of said imidazolium-based repeated units comprising at least:

an imidazolium moiety associated with a negatively charged counter-ion, and a reducible group, the reducible group being selected from an anthraquinone derivative, a viologen group, or a metallocene reducible group.

3. The electro-active polymeric ionic liquid according to claim 1, wherein the imidazolium-based repeated units comprise:

an imidazolium moiety associated with a negatively charged counter ion, and a metallocene oxidizable group, and a reducible group selected from anthraquinone derivative, a viologen group, or a metallocene reducible group.

4. Electro-active polymeric ionic liquid of claim 1, wherein the polymeric ionic liquid is polymerized from an imidazolium-based molecule of formula (I):

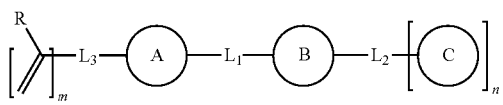

wherein m is 0 or 1;

n is equal to 0 or 1;

$L_1$ is selected from: a bond, a $C_1$-$C_6$ alkyl group where one or two carbon atoms are optionally replaced by an oxygen atom, a CO—(C1-C6)alkyl group, a (C1-C6)alkyl-CO— group, a CONH—($C_1$-$C_6$)alkyl group, a ($C_1$-$C_6$)alkyl-CONH— group, a COO—($C_1$-$C_6$)alkyl group, and a ($C_1$-$C_6$)alkyl-COO— group;

A and B are different and are selected from:
an imidazolium group of formula (IIa):

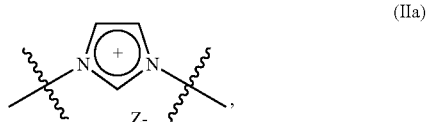

$Z^-$ being a negatively charged counter ion,
a metallocene oxidizable group of formula (III)

M being a transition metal ion, or
a reducible group selected from:
an anthraquinone derivative of formula (IV):

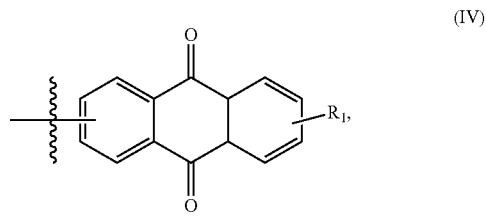

with $R_1$ representing a hydrogen atom or a $C_1$-$C_6$-alkyl group, or
a metallocene reducible group, or
a viologen group of formula (V):

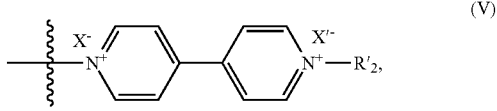

with R'2 representing a hydrogen atom, a $C_1$-$C_8$ alkyl group or a $C_2$-$C_6$ alkenyl group, and X and X' identical or different, and each independently representing a halogen group, provided that at least A or B is an imidazolium group of formula (IIa), when n is 1, then
  C is selected from:
    a metallocene oxidizable group of formula (III) as defined above, or
    a reducible group as defined above,
  provided that A, B and C are different;
  $L_2$ is selected from a bond, a $C_1$-$C_6$ alkyl group, a CONH—($C_1$-$C_6$)alkyl group, a ($C_1$-$C_6$)alkyl-CONH— group, a COO—($C_1$-$C_6$)alkyl group, and a ($C_1$-$C_6$)alkyl-COO— group, wherein one or two carbon atoms in the ($C_1$-$C_6$)-alkyl group are optionally replaced by an oxygen atom, a CO—($C_1$-$C_6$)alkyl group, a ($C_1$-$C_6$)alkyl-CO— group, when n is 0, then
A and B are different and are selected from an imidazolium group of formula (IIa) as defined above, and a reducible group as defined above $L_2$ is a $C_1$-$C_6$ alkyl group if B is an imidazolium group of formula (IIa)

when m is 1 then

A or B is an imidazolium group of formula (IIa),

A is not a viologen group of formula (V) as defined above, $L_3$ is selected from a bond, a $C_1$-$C_6$ alkyl group, a CONH—($C_1$-$C_6$)alkyl group, a ($C_1$-$C_6$)alkyl-CONH— group, a COO—($C_1$-$C_6$)alkyl group, and a ($C_1$-$C_6$)alkyl-COO— group, wherein one or two carbon atoms in the ($C_1$-$C_6$)-alkyl group are optionally replaced by an oxygen atom, and R is a hydrogen atom, a $C_1$-$C_6$ alkyl group or a $C_5$-$C_{10}$-aryl group;

when m is 0 then $L_3$ is a hydrogen atom if A is metallocene oxidizable group of formula (III) or a reducible group, $L_3$ is a $C_1$-$C_6$ alkyl group if A is an imidazolium group of formula (IIa), and one of A and C is a viologen group of formula (V) as defined above with $R'_2$ representing a $C_2$-$C_6$ alkenyl group.

5. The electro-active polymeric ionic liquid of claim 1, wherein the reducible group is an anthraquinone derivative of formula (IV) with $R_1$ representing a hydrogen atom.

6. The electro-active polymeric ionic liquid of claim 1, wherein the metallocene oxidizable group is a ferrocene group.

7. The electro-active polymeric ionic liquid of claim 1, wherein the negatively charged counter-ion is $PF_6^-$, $BF_4^-$, $Cl^-$, $Br^-$ or bis(trifluoromethanesulfonyl)imidate $CF_3SO_2NSO_2CF_3^-$.

8. The electro-active polymeric ionic liquid of claim 1, wherein said imidazolium-based molecule is selected from:

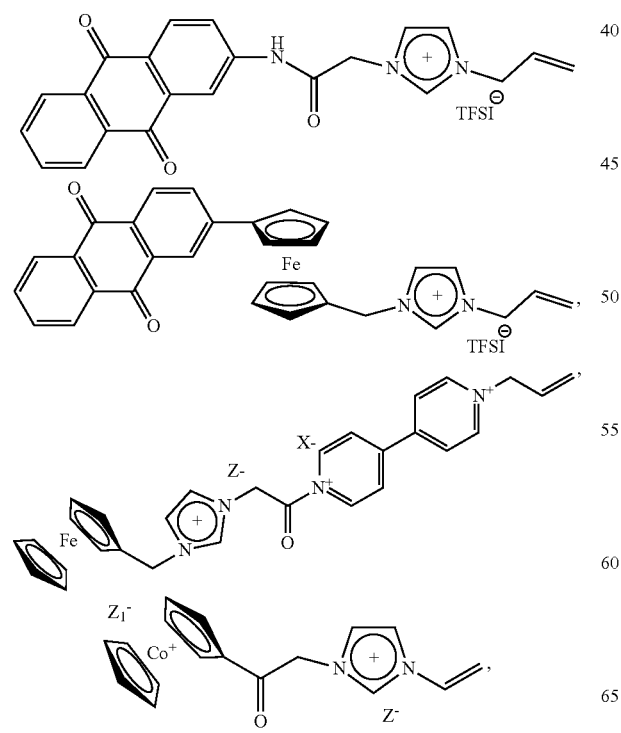

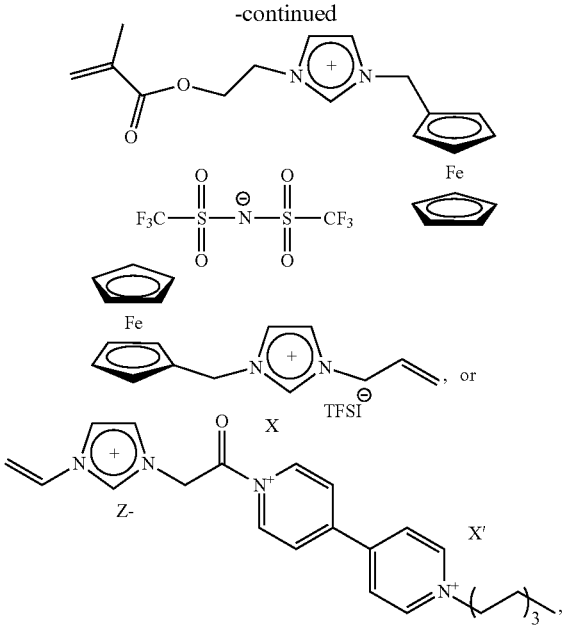

with $Z^-$, $Z_1^-$, $X^-$ and $X'^-$ as defined in claim 4.

9. The electro-active polymeric ionic liquid of claim 1, wherein said imidazolium-based molecule is:

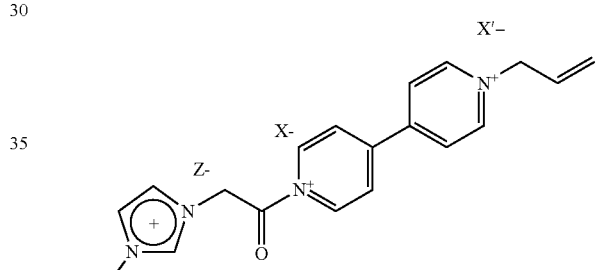

with $Z^-$ being a negatively charged counter ion, $X^-$ and $X'^-$ being identical or different, and each independently representing a halogen group.

10. Surface-modified substrate with an immobilized electro-active polymeric ionic liquid as defined in claim 1.

11. The surface-modified substrate of claim 10, wherein the substrate is a current collector of an electrode.

12. The surface-modified substrate of claim 10, wherein on the substrate is immobilized:

a combination of:

1) an electro-active polymeric ionic liquid comprising imidazolium-based repeated units comprising at least one imidazolium moiety, one negatively charged counter-ion and one metallocene oxidizable group, and 2) an electro-active polymeric ionic liquid comprising imidazolium-based repeated units comprising at least one imidazolium moiety, one negatively charged and one reducible group, or an electro-active polymeric ionic liquid comprising imidazolium-based repeated units comprising at least: 1) one imidazolium moiety associated with one negatively charged counter-ion, 2) one metallocene oxidizable group and 3) one reducible group.

13. An energy storage device comprising at least two surface-modified electrodes comprising a surface-modified substrate with an immobilized electro-active polymeric ionic liquid as defined in claim 1, wherein the substrate is a current collector of an electrode, and wherein the two surface-modified electrodes are different, and
the first electrode comprises a electro-active polymeric ionic liquid with imidazolium-based repeated units comprising at least:
one imidazolium moiety associated with one negatively charged counter-ion, and
one metallocene oxidizable group;
and the second electrode comprises an electro-active polymeric ionic liquid with imidazolium-based repeated units comprising at least:
one imidazolium moiety associated with one negatively charged counter-ion, and
one reducible group as defined in claim 1.

14. An energy storage device comprising at least two surface-modified electrodes comprising a surface-modified substrate with an immobilized electro-active polymeric ionic liquid as defined in claim 1, wherein the substrate is a current collector of an electrode, and wherein the two surface-modified electrodes are identical, and the first and second electrode comprise a electro-active polymeric ionic liquid with imidazolium-based repeated units comprising at least:
one imidazolium moiety associated with one negatively charged counter-ion,
one metallocene oxidizable group, and
one reducible group as defined in claim 1.

15. The energy storage device according to claim 14, wherein the surface of the surface-modified electrode is as follows:

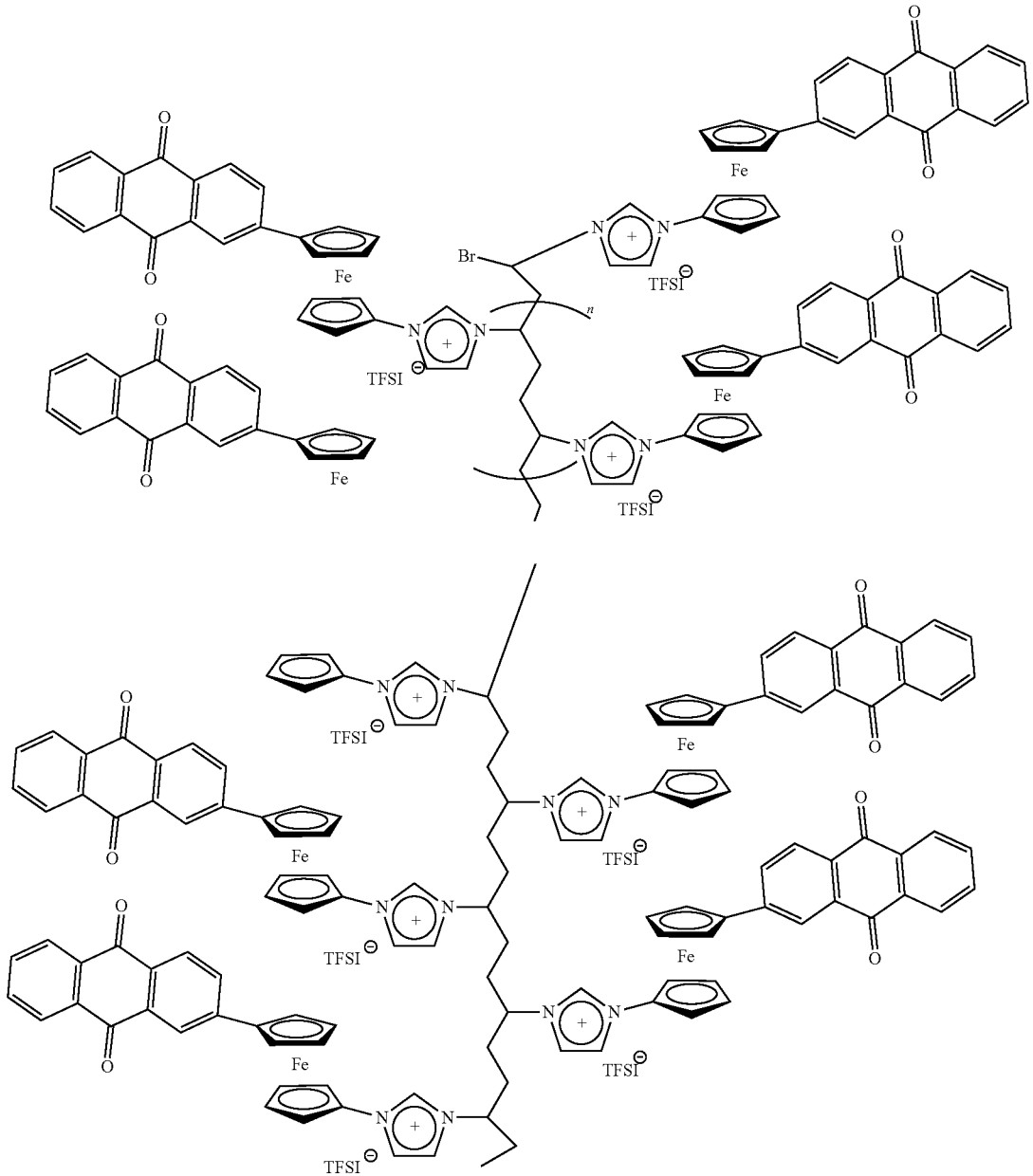

-continued
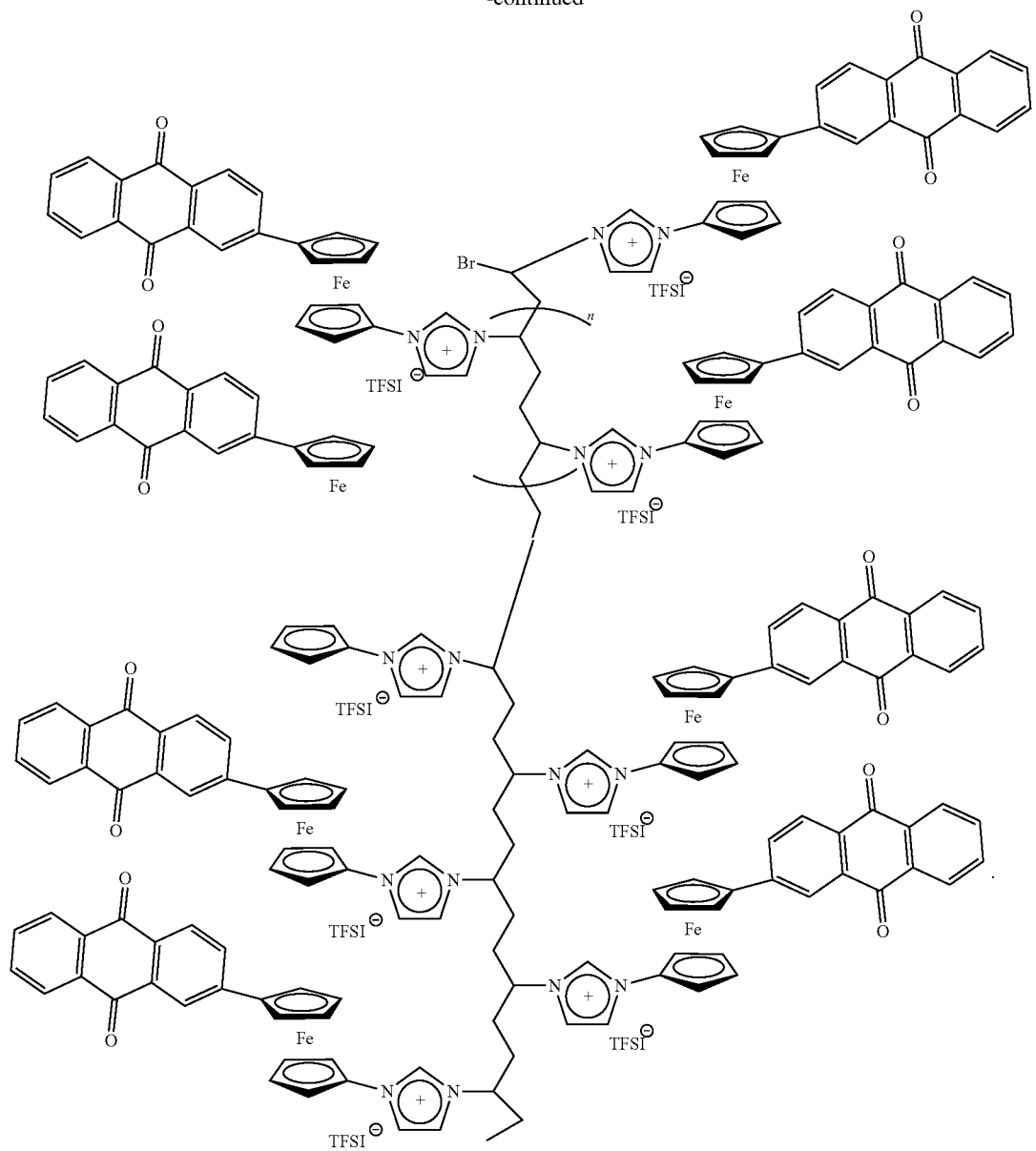
16. The energy storage device according to claim 15, wherein the surface-modified electrodes are planar, interdigitated and membraneless.
* * * * *